(12) United States Patent
Chong et al.

(10) Patent No.: US 9,807,598 B2
(45) Date of Patent: Oct. 31, 2017

(54) CIRCUITS AND SYSTEMS TO EXCHANGE SUBSCRIBER IDENTITY MODULE (SIM) INFORMATION OVER A DISTANCE

(71) Applicant: Pismo Labs Technology Limited, Hong Kong (HK)

(72) Inventors: Ming Pui Chong, Hong Kong (HK); Chi Kwong So, Hong Kong (HK); Louis Wai Hing Lam, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 14/396,748

(22) PCT Filed: Sep. 30, 2014

(86) PCT No.: PCT/IB2014/064950
§ 371 (c)(1),
(2) Date: Oct. 24, 2014

(87) PCT Pub. No.: WO2016/051231
PCT Pub. Date: Apr. 7, 2016

(65) Prior Publication Data
US 2016/0094985 A1    Mar. 31, 2016

(51) Int. Cl.
*H04B 1/38* (2015.01)
*H04M 1/00* (2006.01)
*H04W 8/20* (2009.01)

(52) U.S. Cl.
CPC .................... *H04W 8/205* (2013.01)

(58) Field of Classification Search
CPC .... H04W 4/003; H04W 8/205; H04L 63/0853
See application file for complete search history.

(56) References Cited

U.S. PATENT DOCUMENTS

2012/0275445 A1* 11/2012 Karlsson ............... H04W 8/183
370/338
2013/0322251 A1* 12/2013 Kotecha ............... H04W 28/24
370/236

FOREIGN PATENT DOCUMENTS

| CN | 102056341 A | 5/2011 |
| CN | 201830468 U | 5/2011 |
| EP | 1850607 A2 | 10/2007 |

OTHER PUBLICATIONS

International Search Report in International Application No. PCT/IB2014/064950, mailed on Jul. 6, 2015.

(Continued)

*Primary Examiner* — Nguyen Vo

(57) ABSTRACT

A circuitry and a wireless communication system for carrying SIM card data over a distance. The wireless communication system comprises a first network node and a second network node. A SIM card can be placed in the first network node. SIM card data can be retrieved from or written to the SIM card by a second node via a cable. Other data communications between the first network node and the second network node is carried by another cable. In one variant, the other capable also carry electricity from one of the network node to the other network node. In one variant, the circuitry for carrying SIM card data comprises a plurality of buffers, resistors, capacitors and bi-directional level shifters.

20 Claims, 37 Drawing Sheets

(56) References Cited

OTHER PUBLICATIONS

Written Opinion of the international Searching Authority in International Application No. PCT/IB2014/064950, mailed on Jul. 6, 2015.

* cited by examiner

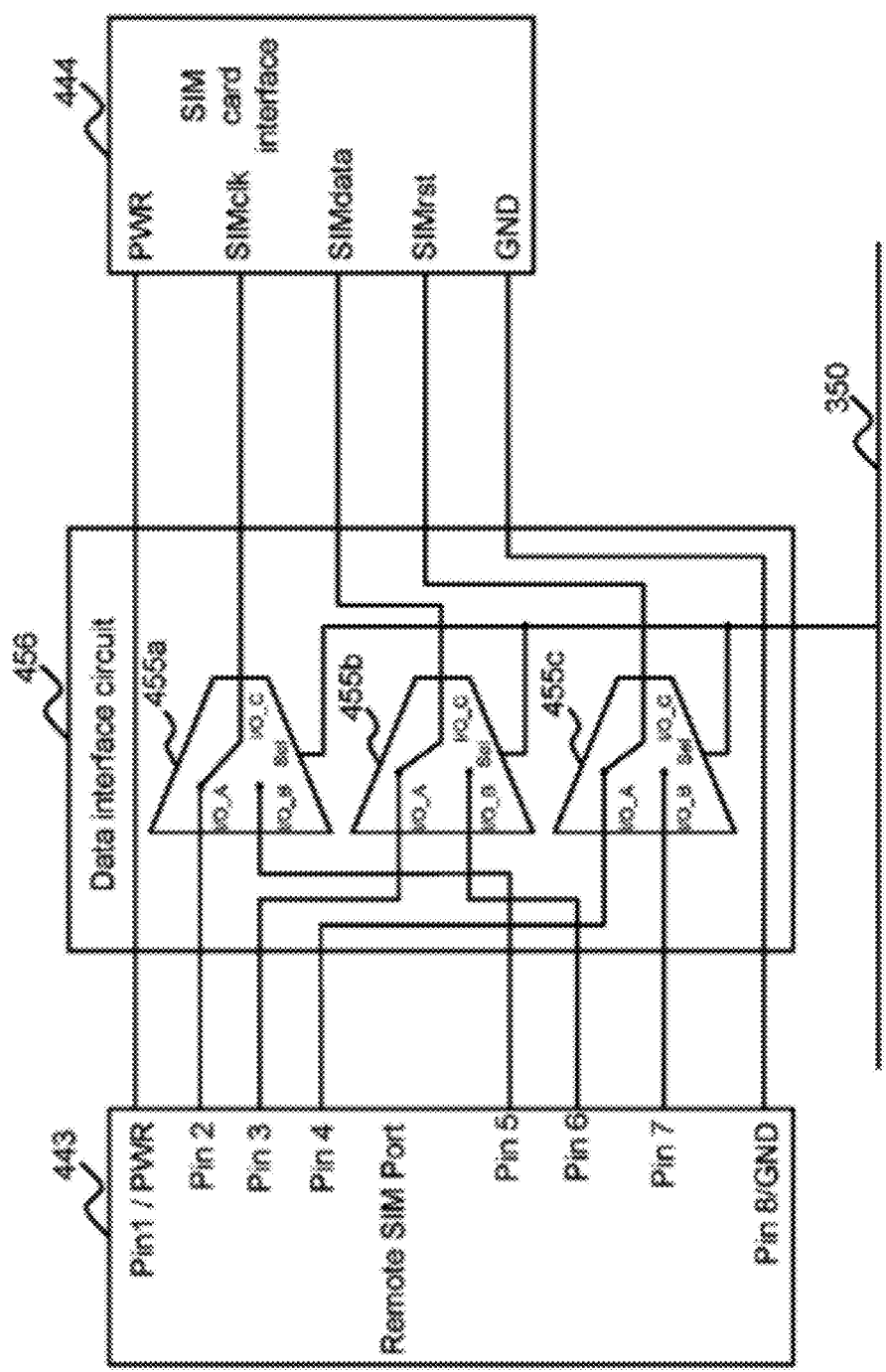
Fig. 4CCA

CIRCUITS AND SYSTEMS TO EXCHANGE SUBSCRIBER IDENTITY MODULE (SIM) INFORMATION OVER A DISTANCE

TECHNICAL FIELD

The present invention relates in general to the field of mobile networking apparatus. More particularly, the present invention relates to circuitries to carry SIM card data over a distance, especially using RS-485 standard and using a CAT-5 cable.

BACKGROUND ART

When a wireless communication apparatus is not able to receive good reception from a cellular network, it is common to move antenna position or move the wireless communication apparatus to a location where good reception is available. However, in many situations, it is not feasible to move the wireless communication apparatus. Therefore, some wireless communication apparatuses are capable of coupling to external antennas and the external antennas may be then moved to positions with good reception.

Antenna cable could be expensive and subject to signal loss. In addition, different antenna cable may be needed for different frequency bands. This also increases operational cost and capital cost. A solution is needed to allow the wireless communication apparatus to have good reception with a cellular network without moving the wireless communication apparatus or without using a long piece of antenna cable.

FIG. 9A shows a prior art that a SIM card emulator sold by implementa gmbh is used for connecting a SIM socket of a cellular phone. According to the website of implementa gmbh, http://www.implementa.com/products/sim-emulators/, the SIM card emulator can: "use off-the-shelf Mobile Terminals with SIM cards stored in remote SIM Storages", "fits most consumer phones and industrial modules" and "placed into the SIM Holder instead of a real SIM card Mobile Terminal is operated with Soft SIM while using any SIM card from a SIM Farm". FIG. 9B shows another prior art that another SIM card emulator sold by implementa gmbh is used for connecting a SIM socket of a mobile modem. The cables used in both SIM card emulators shown in FIG. 10A and FIG. 10B are USB cables.

DISCLOSURE OF INVENTION

Summary of the Invention

The present invention discloses a wireless communication system comprising a first network node and a second network node. The first network node comprises at least one subscriber identification module (SIM) socket, at least one local data port, and at least one local SIM port. The at least one SIM socket is connected to corresponding local SIM port. The second network node comprises at least one SIM card interface, at least one remote data port, and at least one remote SIM port. The at least one SIM card interface is connected to corresponding remote SIM port. The at least one local SIM port and the at least one remote SIM port are capable of being coupled to a cable and are used for exchanging SIM card information between the SIM socket and the SIM card interface. The at least one local data port and the at least one remote data port are used for exchanging data packets between the first network node and the second network node.

According to one of the embodiments of the present invention, the cable used for coupling the at least one local SIM port and the at least one remote SIM port comprises at least three wires. The cable may be a RF-45 cable. According to one of the embodiments of the present invention, the first network node and the second network node are at least ten centimeters apart from each other.

The present invention further discloses the first network node comprising at least one SIM socket, at least one local SIM port, at least one local data port, at least one processing unit, at least one memory, at least one storage unit and at least one local area network (LAN) interface. The at least one SIM socket is connected to corresponding local SIM port and the at least one local SIM port is capable of being coupled to a cable. According to one of the embodiments of the present invention, the first network node further comprises a data interface circuit. The at least one SIM socket and the corresponding local SIM port are connected via the data interface circuit. The data interface circuit may connect to a data pin of the at least one SIM socket.

The present invention further discloses the second network node comprising at least one SIM card interface, at least one remote SIM port, at least one processing unit, at least one memory, at least one storage unit, at least one RF transceiver, and at least one antenna. The at least one SIM card interface is connected to corresponding remote SIM port and the at least one remote SIM port is capable of being coupled to a cable. [9, 10]

The present invention further discloses a system for SIM card data communication between a SIM card interface and a SIM socket. The system comprises a first buffer, a second buffer, a first bi-directional level shifter, a third buffer, a fourth buffer, and a second bi-directional level shifter. The first buffer connects to a SIM card interface for stepping up voltage for transmitting SIM card clock signal. The second buffer connects to the SIM card interface for stepping up voltage for transmitting SIM card reset signal. The first bi-directional level shifter connects to the SIM card interface for stepping up voltage for carrying SIM card data signal and to step down voltage for receiving SIM card data signal. The third buffer connects to the SIM socket for stepping down voltage for receiving SIM card clock signal. The fourth buffer connects to the SIM socket for stepping down voltage for receiving SIM card reset signal. The second bi-directional level shifter connecting to the SIM socket for stepping up voltage when transmitting SIM card data signal and for stepping down voltage when receiving SIM card data signal.

According to one of the embodiments of the present invention, the system for SIM card data communication between a SIM card interface and a SIM socket further comprises a first jack and a second jack. The first jack has at least eight pins and the second jack also has at least eight pins. The first jack and the second jack are capable of allowing a category (CAT-5) cable to be coupled to. According to one of the embodiments, four of the at least eight pins of the first jack and four of the at least eight pins of the second jack may be used for data communications using Ethernet protocol. According to one of the embodiments, four of the at least eight pins of the first jack and four of the at least eight pins of the second jack may be used for Ethernet data communication, while three of the at least eight pins of the first jack and three of the at least eight pins of the second jack are used for SIM card data signal, SIM card reset signal and SIM card clock signal.

According to one of the embodiments of the present invention, a first pin of the first jack is connected to output of the first buffer, a second pin of the first jack is connected to output of the second buffer, a third pin of the first jack is connected to the bi-directional level shifter, a fourth pin of the first jack is connected to a power supply, and a fifth pin of the first jack is connected to a ground. Further, a first pin of the second jack is connected to input of the third buffer, a second pin of the second jack is connected to input of the fourth buffer, a third pin of the second jack is connected to the bi-directional level shifter, a fourth pin of the second jack is connected to input of a voltage regulator, and a fifth pin of the second jack is connected to a ground.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Embodiments, or portions thereof, may be embodied in program instructions operable upon a processing unit for performing functions and operations as described herein. The program instructions making up the various embodiments may be stored in a storage medium.

Information stored at a SIM card is referred to as SIM card information for easy reading. SIM card information includes network-specific information used to authenticate and identify subscribers on the network, such as unique serial number (ICCID), international mobile subscriber identity (IMSI), Authentication Key (Ki), ciphering information, Local Area Identity (LAI) and operator-specific emergency number. The SIM also stores other carrier-specific data such as the SMSC (Short Message Service Center) number, Service Provider Name (SPN), Service Dialing Numbers (SDN), Advice-Of-Charge parameters and Value Added Service (VAS) applications. SIM card information may also include messages and, contacts, such as Short Message Service (SMS) message and phone book contacts.

There is no limitation to the size of SIM cards inserted at a communication apparatus. For example, the SIM cards can be full-size, mini-SIM, or embedded SIM. Communication apparatus and cellular routers can act as a network node, a network host or a network element, depending on the setup of a network.

FIG. 1A illustrates one of the embodiments according to the present invention. Communication apparatus 101 is connected to two cellular routers 102a and 102b. For the present invention, there is no limit to the number of cellular routers that communication apparatus 101 can connect to. Communication apparatus 101 and cellular router 102a are connected by cables 104a and 105a. Cables 104a and 105a are used to transmit data and SIM card information between communication apparatus 101 and cellular router 102a respectively. Similarly, communication apparatus 101 and cellular router 102b are connected by cables 104b and 105b. Cables 104b and 105b are used to transmit data packets and SIM card information between communication apparatus 101 and cellular router 102b respectively.

One end of cable 104a is coupled to remote data port (RDP) 110a of cellular router 102a while the other end is coupled to local data port (LDP) 106a of communication apparatus 101. One end of cable 105a is coupled to remote SIM port (RSP) 111a of cellular router 102a while the other end is coupled to local SIM port (LSP) 107a of communication apparatus 101. One end of cable 104b is coupled to RDP 110b of cellular router 102b while the other end is coupled to LDP 106b of communication apparatus 101. One end of cable 105b is coupled to RSP 111b of cellular router 102b while the other end is coupled to LSP 107b of communication apparatus 101.

The present invention is not limited to use cables for transmitting and receiving data packets and SIM card information between cellular router 102a, 102b and communication apparatus 101. Other communication technologies can be used, such as a point to point communication, a local area network, WiFi, Bluetooth, USB, Zigbee, and infrared. It is preferred to use CAT-5 cable to transmit SIM card information between cellular routers 102a, 102b and communication apparatus 101 as CAT-5 cable and related circuitry are simpler and less expensive to be implemented compared to implementations in other communication technologies.

Cellular routers 102a and 102b are capable of connecting to base stations 112 wirelessly. Base stations 112a and 112b may be operated by the same or different wireless communication service operators. Wireless communication service operators provide wireless communication service to allow capable electronic devices to transmit and receive data with other hosts, such as host 114 through interconnected networks 113. Therefore, communication apparatus 101 can connect to host 114 via interconnected networks 113 and via one or both of cellular routers 102a and base station 112a and/or cellular routers 102b and base station 112b.

Cellular routers 102a, 102b are capable of making cellular connections by various cellular technologies such as Advance mobile phone system (AMPS), Time division multiple access (TDMA), Code division multiple access (CDMA), Global system for mobile communications (GSM), General packet radio service (GPRS), Long-term evolution (LTE) or Universal mobile telecommunications system (UMTS), etc. The cellular connections can be used as wide area network (WAN) connections. Cellular routers 102a, 102b may have networking interfaces such as Ethernet port, USB LAN port and WiFi interface for local area network (LAN). Cellular routers 102a, 102b may be equipped to draw power from a variety of sources. In one example, cellular routers 102a, 102b may draw power through cables 104a, 104b respectively from communication apparatus 101 using Power over Ethernet (PoE) techniques. In one example, cellular routers 102a, 102b may draw power through cables 105a, 105b respectively from communication apparatus 101. As cables 105a and 105b may use CAT-5 cables that are commonly used for Ethernet connection, power may be injected into CAT-5 cables that may be used for cables 105a and 105b. As there is no Ethernet data being carried in cables 105a and 105b, the techniques for injecting power in the CAT-5 cables does not need to follow PoE standards. Those who are skilled in the art would appreciate some of the techniques used by PoE can be used to inject power into cables 105*a* and 105*b*.

Antenna 103*a*, 103*b* are used by cellular routers 102*a*, 102*b* respectively to communicate with base stations.

When there are multiple SIM cards inserted into SIM sockets 108, SIM card information of the SIM cards can be exchanged with corresponding cellular router 102*a* or 102*b*. Communication apparatus 101 may then use cellular routers 102 to connect to interconnected networks 113. Therefore, for example, in case one of cellular routers 102 is out of order or one of the SIM cards cannot be used, communication apparatus 101 may still use another cellular router or another SIM card to connect to interconnected networks 113. As there is no limitation in the number of cellular routers 102 or in the number of SIM sockets 108 of the present invention, the more the number of cellular routers 102 or the more the number of SIM sockets 108 are, higher reliability and higher network throughput with interconnected networks 113 may be achieved.

Communication apparatus 101 has LAN interface 115 for connecting to one or more hosts and/or nodes. For example, hosts and nodes can form a LAN with communication apparatus 101 via LAN interface 115. Communication apparatus 101 may also perform as a Internet router or gateway for the hosts and/or nodes. The number of LAN interface 115 is not limited to one. For example, communication apparatus 101 may have two or more LAN interfaces 115. LAN interface 115 may be a wired LAN interface or a wireless LAN interface. For example, LAN interface 115 can be a wired Ethernet interface. In another example, LAN interface 115 can be an IEEE 802.11 based LAN interface.

Further, communication apparatus 101 has WAN interface 116 for connecting to interconnected networks 113. WAN interface 116 may be a wired WAN interface or a wireless WAN interface. For example, WAN interface 116 may be coupled to an optical fiber to connect to a network of an Internet Service Provider (ISP). In another example, WAN interface 116 may be coupled to a USB 3G modem for connecting to a network of a cellular service provider.

LDPs 106*a* and 106*b* may perform as additional WAN interfaces for communication apparatus 101. LDPs 106*a* and 106*b* may connected to RDPs 110*a* and 110*b* respectively. RDP 110*a* and 110*b* may perform as LAN interfaces for cellular routers 102*a* and 102*b* respectively such that data can be communicated between RDPs 110*a*, 110*b* and LDPs 106*a*, 106*b* respectively. Cellular routers 102*a* and 102*b* may perform as gateways for communication apparatus 101 such that communication apparatus 101 can communicate with interconnected networks 113 through LDPs 106*a*, 106*b* and WAN interface 116. In one variant, logical connections established via LDPs 106*a*, 106*b* and WAN interface 116 may be aggregated together to form an aggregated connection.

There are myriad choices of physical media and communication that can be used to connect LDP 106*a* and RDP 110*a* for data exchange. For example, LDP 106*a* may connect to RDP 110*a* using an Ethernet cable and Ethernet protocol. Therefore, communication apparatus 101 may transmit data packets to or received data packets from cellular router 102*a* through the Ethernet cable. As the length of the Ethernet cable may be more than ten meters, cellular router 102*a* can be placed at a location with good reception of signals. In another example, LDP 106*a* may connect to RDP 110*a* using WiFi and WiFi protocol. Then communication apparatus 101 may wirelessly transmit data packets to or wirelessly receive data packets from cellular router 102*a*. In one example, LDP 106*a* may connect to RDP 110*a* using a USB cable and USB protocol. Then communication apparatus 101 may transmit data packets to or receive data packets from cellular router 102*a* through a USB cable. The USB cable may have maximum length from two meters to five meters. So the distance between communication apparatus 101 and cellular router 102*a* may be limited by the length of the USB cable. In another example, LDP 106*a* may connect to RDP 110*a* using a RS-232 cable. Then data transmissions between communication apparatus 101 and cellular router 102*a* may be a RS-232 serial ports communication. Comparing with data communications using Ethernet cables, WiFi and USB cables, data communications using RS-232 cables may have lower transmission speed.

Further, communication apparatus 101 has SIM sockets 108*a*, 108*b* for holding SIM cards. SIM card information can be retrieved from and written to SIM cards through SIM sockets 108*a*, 108*b*. SIM card inserted in SIM socket 108*a* is for the use of cellular router 102*a* while SIM card inserted in SIM socket 108*b* is for the use of cellular router 102*b*. SIM sockets 108*a*, 108*b* are connected to LSP 107*a*, 107*b* respectively. The connections between SIM sockets 108 and LSPs 107 can be logical connections or electrical connection. For example, SIM socket 108*a* and LSP 107*a* can be connected directly through wires. In another example, SIM socket 108*a* and LSP 107*a* can be connected logically through a processing unit of communication apparatus 101, which is not shown in FIG. 1A. In a preferred embodiment, SIM socket 108*a* is connected to LSP 107*a* via a data interface circuit and SIM socket 108*b* is connected to LSP 107*b* via another data interface circuit. For readability, SIM socket 108*a* is considered as electrically connected to LSP 107*a* if there is no involvement of processing unit for storing and forwarding SIM card information between SIM socket 108*a* and LSP 107*a*. When there is involvement of processing unit for storing and forwarding SIM card information between SIM socket 108*a* and LSP 107*a*, SIM socket 108*a* is considered as logically connected to LSP 107*a*. The benefits of electrically connecting SIM socket 108*a* and LSP 107*a* includes faster response and reducing loading of the processing unit. The benefits of logically connecting SIM socket 108*a* and LSP 107*a* includes flexibility in using SIM card information by communication apparatus 101.

In one embodiment, when SIM socket 108*a* and LSP 107*a* are electronically connected, cable 105*a* carries SIM card information in electrical signal originated from the SIM card. Therefore, SIM card information can be retrieved by cellular router 102*a* from a SIM card inserted in SIM socket 108*a* via RSP 111*a*, cable 105*a*, LSP 107*a* and SIM socket 108*a*. Similarly, SIM card information can also be written by cellular router 102*a* to the SIM card inserted via RSP 111*a*, cable 105*a*, LSP 107*a* and SIM socket 108*a*.

In another embodiment, when SIM socket 108*a* and LSP 107*a* are logically connected, cable 105*a* carries data processed by processing unit of communication apparatus 101. The data processed is based on SIM card information retrieved from the SIM Card. Therefore, SIM card information can be retrieved by cellular router 102*a* from a SIM card inserted in SIM socket 108*a* via RSP 111*a*, cable 105*a*, LSP 107*a*, processing unit of communication apparatus 101, and SIM socket 108*a*. Similarly, SIM card information can also be written by cellular router 102*a* to the SIM card inserted via RSP 111*a*, cable 105*a*, LSP 107*a*, the processing unit and SIM socket 108*a*.

The descriptions above about cellular router 102*a*, RDP 110*a*, RSP 111*a*, cable 104*a*, cable 105*a*, LDP 106*a*, LSP 107*a* and SIM socket 108*a* are applicable to cellular router 102*b*, RDP 110*b*, RSP 111*b*, cable 104*b*, cable 105*b*, LDP 106*b*, LSP 107*b* and SIM socket 108*b* respectively.

FIG. 2A illustrates a block diagram of communication apparatus 101 according to one of the embodiments of the present invention. Communication apparatus 101 comprises processing unit 205, memory 206, storage unit 207, system bus 210, LDP 106*a* and 106*b*, LAN interface 115, WAN interface 116, LSPs 107*a* and 107*b*, data interface circuits 208*a* and 208*b*, and SIM sockets 108*a* and 108*b*. Processing unit 205 and memory 206 are connected with each other directly. LSPs 107 are connected to data interface circuits 208 respectively. Data interface circuits 208 are connected to SIM sockets 108 respectively.

Processing unit 205 executes program instructions or code segments for implementing embodiments of the communication apparatus of the present invention. A Processing unit may be a microprocessor, a microcontroller, a digital signal processor (DSP), any combination of those devices, or any other circuitry configured to process information.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, hard disk, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges and various other mediums capable of storing, containing or carrying instruction(s) and/or data.

Memory 206 and storage unit 207 are storage medium. The storage medium may include a number of software modules that may be implemented as software code to be executed by the processing unit using any suitable computer instruction type. The software code may be stored as a series of instructions or commands, or as a program in the storage medium.

In one embodiment, memory 206 may be configured as a volatile storage. A volatile storage may be used for storing temporary variables or other intermediate information during execution of instructions by processor/processing unit. Processing unit 205 uses memory 206 to store data and program instructions. The program instructions may control the operation of the communication apparatus. The memory 206 may also be configured to store received frames, bindings, Keep-Alive states, periodicity information for monitored session frames, Flow-Through and/or Flow-Around configurations, etc.

In another embodiment, the storage unit 207 may be configured as a non-volatile storage. A non-volatile storage or static storage may be used for storing static information and instructions for processor, as well as various system configuration parameters. Storage unit 207 may be configured to store a firmware. A firmware can be an operating system of the communication apparatus.

System bus 210 connects processing unit 205 directly or indirectly to storage unit 207, LDPs 106*a* and 106*b*, LAN interface 115 and WAN interface 116. Using system bus 210 allows communication apparatus 101 to have increased modularity. System bus 210 can be any of several types of bus structures including a memory bus, a peripheral bus, and a local bus using any of a variety of bus architectures.

FIG. 3A illustrates one of the embodiments of cellular routers 102 according to the present invention.

For readability, discussion below about cellular router 102*a* also applies to cellular router 102*b*. Cellular router 102*a* comprises processing unit 301, memory 303, storage unit 304, bus 310, RDP 110*a*, RSP 111*a*, data interface circuit 307, SIM card interface 308, RF transceiver 302 and antenna 103*a*. Processing unit 301 and memory 303 are connected with each other directly. Data interface circuit 307 is connected to RSP 111*a* and SIM card interface 308.

RF transceiver 302 is connected to bus 310, SIM card interface 308 and antenna 103*a*. RF transceiver 302 is capable of transmitting data received via bus 310 to a base station through antenna 103*a*. Further RF transceiver 302 is connected to SIM card interface 308, which is connected to RSP 111*a* through data interface circuit 307. Therefore, RF transceiver 302 is able to write and retrieve SIM card information to and from a SIM card inserted to SIM socket 108*a* through cable 105*a* and RSP 111*a*.

There are myriad RF transceivers available on the market that can be used as RF transceiver 302. For example, Sierra Wireless MC7710 embedded modem and Qualcomm Gobi 3000 modem can be used as RF transceiver 302. Using Sierra Wireless MC7710 embedded modem as an example, it has both RF transceiver and SIM card interface.

Processing unit 301 executes program instructions or code segments for implementing embodiments of the communication apparatus of the present invention.

Memory 303 and storage unit 304 are storage medium. The storage medium may include a number of software modules that may be implemented as software code to be executed by processing unit 301 using any suitable computer instruction type. The software code may be stored as a series of instructions or commands, or as a program in the storage medium.

Antenna 103*a* is connected directly to RF transceiver 302. Antenna 103 is used to transmit and receive electrical signal to and from a base station.

RDP 110*a* is used to transmit and receive data packets to and from communication apparatus 101. RDP 110*a* may perform as a LAN interface for cellular router 102*a*.

Based on the SIM card information retrieved from RSP 111*a*, cellular router 102*a* is able to authenticate with a cellular network and communicate with the cellular network via base station 112*a*. Both RSP 111*a* and LSP 107*a* may be implemented using RJ-45 ports. Therefore, Ethernet cable, which is generally less expensive than an antenna cable, can be used to connect RSP 111*a* to LSP 107*a* of communication apparatus 101.

Bus 310 connects processing unit 301 directly or indirectly to storage unit 304, RDP 110*a* and RF transceiver 302. Using bus 310 allows cellular router 102*a* to have increased modularity. Bus 310 couples processing unit 301 to storage unit 304, RDP 110*a* and RF transceiver 302. Bus 310 can be any of several types of bus structures including a memory bus, a peripheral bus, and a local bus using any of a variety of bus architectures.

Data interface circuits 208 are placed between SIM sockets 108 and LSPs 107 and used for allowing SIM card information being transmitted over a longer distance, particularly more than ten centimeters. As signals traveling via wire are vulnerable to degradation, data interface circuits 208 are used to overcome the degradation. It is preferred that data interface circuits have enough power to transmit data between a SIM socket in communication apparatus and a SIM card interface in a cellular router in order to maintain the data integrity to overcome the degradation within a tolerable threshold. As the amount of SIM card information that needs to be communicated between communication apparatus 101 and a cellular router, such as cellular router 102a or 102b, is in general below 5 Mbps, there are myriads methods to implement data interface circuits 208. In one variant, the selection of implementation of data interface circuits 208 also depends on expected distance between communication apparatus 101 and the cellular router.

In one embodiment, when the distance between communication apparatus 101 and cellular router 102a is less than ten centimeters, data interface circuit 208a can be implemented by soldering wires directly between SIM socket 108a and LSP 107a. Similarly, in cellular router 102a, data interface circuit 307 can be implemented by soldering wires directly between SIM card interface 308 and RSP port 111a. For instance, the SIM card interface pins for a cellular router that uses Sierra Wireless MC7710 embedded modem are pin 8, 10, 12, and 14. Pin 8, 10, 12 and 14 are connected to power pin, input/output pin, clock signal pin and reset pin of RSP port 111a through four wires respectively. The ground pin of RSP port 111a can be connected to the ground of cellular router 102a or any of ground pins of the Sierra Wireless MC7710 embedded modem, such as pin 4 or pin 9.

In another embodiment, when the distance between communication apparatus 101 and cellular router 102a is more than ten centimeters or is not known before deployment, soldering wires directly between SIM socket 108a and LSP 107a may not be suitable for overcoming the potential degradation. Data interface circuit 208a may be implemented by using a signal amplifier as illustrated in FIG. 5.

FIG. 6A illustrates an embodiment of using circuits capable of providing RS-485 transmission as data interface circuit 208a.

FIG. 4AA illustrates connection between a SIM card interface and a SIM socket according to one of the embodiments. LSP 401, SIM socket 402, RSP 403 and SIM card interface 404 are more detailed illustrations of LSP 107a, SIM socket 108a, RSP 111a and SIM card interface 308 respectively. LSP 401 and RSP 403 both have eight pins as both are implemented by RJ-45 in this embodiment. There is no limit that LSP 401 and RSP 403 must have eight pins. PWR, SIMclk, SIMdata, SIMrst and GND of SIM socket 402 are connected to Pin 1/PWR, Pin 2, Pin 3, Pin 4 and Pin 8/GND of LSP 401 respectively. Pin 1/PWR, Pin 2, Pin 3, Pin 4 and Pin 8/GND of LSP 401 are connected to Pin 1/PWR, Pin 2, Pin 3, Pin 4 and Pin 8/GND of RSP 403 respectively. PWR, SIMclk, SIMdata, SIMrst and GND of SIM card interface 404 are connected to Pin 1/PWR, Pin 2, Pin 3, Pin 4 and Pin 8/GND of RSP 403 respectively.

PWR of SIM socket 402 receives power from PWR pin of SIM card interface 404 via Pin 1/PWR of RSP 403 and via Pin 1/PWR of LSP 401. SIM socket 402 is grounded via its GND pin, Pin 8/GND of LSP 401, Pin8/GND of RSP 403 and GND pin of SIM card interface 404. Pin 5, Pin 6 and Pin 7 of LSP 401 may be left open or grounded. SIMclk of SIM socket 402 provides a clock signal, originating from SIMclk of SIM card interface 404 and via Pin 2 of LSP 401 and Pin 2 of RSP 403, to a SIM card to be inserted into SIM socket 402. SIMdata of SIM socket 402 is used for transmitting and receiving serial data to and from SIMdata of SIM card interface 404 via Pin 3 of RSP 403 and Pin 3 of LSP 401. SIMrst of SIM socket 402 is used to provide a reset signal originating from SIMrst of SIM card interface 404 to the SIM card and via Pin 4 of LSP 401 and Pin 4 of RSP 403. The reset signal may be used to reset the SIM card. As long as PWR, SIMclk, SIMdata, SIMrst, and GND of SIM card interface 404 can be electrically connected to PWR, SIMclk, SIMdata, SIMrst, and GND of SIM socket 402 respectively, there is no limitation on the arrangement how pins of SIM card interface 404, RSP 403, LSP 401 and SIM socket 402 must be connected. For example, SLMclk of SIM card interface 404 may be connected to SIMclk of SIM socket 402 via Pin 5 of RSP 403 and Pin 5 LSP 401 rather than via Pin 2 of RSP 403 and Pin 2 of LSP 401.

FIG. 4AB illustrates one of the embodiments of the present invention for implementing data interface circuit for the system FIG. 1A. FIG. 4AB is similar to FIG. 4AA but data interface circuits 435a-e are inserted to connect LSP 401 to SIM socket 402. Data interface circuits 436a-e are inserted to connect RSP 403 to SIM card interface 404. Data interface circuits 435 and 436 may be more detailed illustrations of data interface circuits 208a and 307 respectively. For example, when the distance between communication apparatus 101 and cellular router 102a is more than ten centimeters, the degradation of electrical signals between communication apparatus 101 and cellular router 102a may be too high. Data interface circuits 435a-e may amplify the signal to SIM socket 402 in order to reduce the degradation. Data interface circuits 436 may be implemented by using amplifiers, circuits of RS-232, RS-485 or other circuits that can reduce signal degradation.

FIG. 5 illustrates one of the embodiments of the present invention for implementing data interface circuit. Data interface circuit 436a may be implemented by an amplifier, such as amplifier 501. As bandwidth of writing to and reading from a SIM card is about 5 Mbps, many amplifiers, such as operation amplifier, transistor amplifier and differential amplifiers may be used for implementing amplifier 501. The specification of amplifier 501 is in the range of 1.8V to 5V. Depending on the cable(s) used and the distance between RSP 403 and LSP 401, different specification of amplifier can be used as amplifier 501. Descriptions for 436a also applies to 436c-d.

In one variant, amplifier 502 may be the same as amplifier 501 and is used for boosting signal to SIM socket 402. In one variant, there is no need for data interface circuits 435a-435e as data interface circuits 436a-e are adequate to overcome signal degradation. In one variant, there is no need for data interface circuits 435a, 435b, 435d and 435e as data interface circuits 436a-e are adequate to overcome signal degradation for power, clock, reset and ground, which are originated from SIM card interface 404. Data interface circuit 435c is required to reduce signal degradation when data is sent from SIM socket 402.

In one variant, as data interface circuits 435c and 436c are used for bi-directional data communications between SIM socket 402 and SIM card interface 404, amplifiers 503 and 504 may be used to implement a bi-directional amplifier in data interface circuit 435c. Similarly amplifiers 505 and 506 may be used to implement a bi-directional amplifier in data interface circuit 436c.

FIG. 4AC illustrates one of the embodiments of the connection between a SIM card interface and a SIM socket. FIG. 4AC is similar to FIG. 4AB but data interface circuits 436a-e are replaced by data interface circuit 423 and data interface circuits 435a-e are replaced by data interface circuit 422. Data interface circuits 422 and 423 may comprise a plurality of amplifiers to reduce degradation of electrical signals. Data interface circuits 422 or 423 may be in the form of one single semiconductor package or in one integrated circuit.

FIG. 4AD illustrates one of the embodiments of the connection between a SIM card interface and a SIM socket. SIM socket 402 and SIM card interface 404 are connected using RS-485, also known as TIA-485-A, ANSI/TIA/EIA-485, TIA/EIA-485 or EIA-485 in order to maintain data integrity over a distance. The distance may be between a few centimeters to about two hundred meters, depending on the power of the signals. Pin 1 of LSP 405 is connected to PWR of SIM socket 402 via data interface circuit 427*a*. Pin 2 and Pin 3 of LSP 405 are connected to SIMclk of SIM socket 402 via data interface circuit 427*b*. Pin 4, Pin 5, Pin 6 and Pin 7 of LSP 405 are connected to SIMdata of SIM socket 402 via data interface circuit 427*c*. Pin 8 and Pin 9 of LSP 405 are connected to SIMrst of SIM socket 402 via data interface circuit 427*d*. Pin 10 of LSP 405 is connected to GND of SIM socket 402 via data interface circuit 427*e*. Similarly, Pin 1 of RSP 407 is connected to PWR of SIM card interface 404 via data interface circuit 428*a*. Pin 2 and Pin 3 of RSP 407 are connected to SIMclk of SIM card interface 404 via data interface circuit 428*b*. Pin 4, Pin 5, Pin 6 and Pin 7 of RSP 407 are connected to SIMdata of SIM card interface 404 via data interface circuit 428*c*. Pin 8 and Pin 9 of RSP 407 are connected to SIMrst of SIM card interface 404 via data interface circuit 428*d*. Pin 10 of RSP 407 is connected to GND of SIM card interface 404 via data interface circuit 428*e*. As a result, LSP 405 is connected to RSP 407 via ten pins. Data interface circuits 427*b-d* and 428*b-d* are further illustrated in FIG. 6A.

FIG. 6A illustrates a detailed embodiment of the present invention for data interface circuits 427 *b-d* and 428*b-d* as illustrated in FIG. 4AD and FIG. 4AE. As, under RS-485, a signal is being carried by differential balanced line over twisted pair between SIM card interface 404 and SIM socket 402, two cables are used to carry clock signal from SIMclk of SIM card interface 404 to SIMclk of SIM socket 402; two cables are used to carry reset signal from SIMrst of SIM card interface 404 to SIMrst of SIM socket 402; four cables are used to carry bi-directional data signal from/to SIMdata of SIM card interface 404 to/from SIMdata of SIM socket 402. For power and ground, each can be carried by one cable. Therefore, altogether ten cables are used to connect RSP port 407 and LSP 405. In this particular embodiment, RJ-45 port does not have adequate number of cables and cannot be used to implement RSP 407 or LSP 405. Further, RJ-45 cables cannot be used to connect RSP port 407 and LSP 405.

In this particular embodiment, data interface circuit 428*b* is implemented by using amplifier 601. Two wires, which may be implemented by a pair of twisted cable, is used to carry the clock signal as differential signal from SIMclk of SIM card interface 404. At the receiving side, data interface circuit 427*b*, comprising amplifier 603 converts the differential signal back to the clock signal for SIMclk of SIM socket 402.

The descriptions for data interface circuits 436*b* and 435*b* are also applicable for data interface circuits 436*d* and 435*d* as reset signal is unidirectional from SIMrst of SIM card interface 404 to SIMrst of SIM socket 402.

Data interface circuit 428*c* is implemented by using amplifier 605, amplifier 606 and selector 607. When data is sent from SIMdata of SIM card interface 404 to SIMdata of SIM socket 402, enable line of selector 607 is enabled to select to connect to amplifier 605 and therefore data is being carried over a pair of twisted cables connecting to amplifier 605. The enable line is used to select whether a data interface circuit is at receiving mode or sending mode. At the receiving side, data interface circuit 427*c*, comprising amplifier 608, amplifier 609 and selector 610, receives the data via amplifier 608 and selector 610. When data is sent from SIMdata of SIM socket 402 to SIMdata of SIM card interface 404, enable line of selector 610 is enabled to select to connect to amplifier 609. At the receiving side, SIMdata of SIM card interface 404 receives the data via amplifier 606 and selector 607. Therefore, there are altogether two pairs of twisted cables used.

In one variant, selectors 607 and 610 may be implemented by a multiplexer and a demultiplexer respectively.

In one variant, data interface circuits 427 may be implemented by using Linear Technology LTC 1334 to realize the data transmission using RS-485.

FIG. 6B illustrates an alternative embodiment for data interface circuits 436*c* or 428*c* and data interface circuits 435*c* or 427*c*. For readability, data interface circuits 436*c* and 435*c* are referred but the descriptions are applicable to data interface circuits 428*c* and 427*c*. In this particular embodiment, only one pair of twisted cables is used instead of using two pairs of twisted cables as illustrated in the embodiment of FIG. 6A. The benefits of using only one pair of twisted pair includes saving the use of one pair of twisted cables as illustrated in the embodiment of FIG. 6A.

Data interface circuit 436*c* is implemented by using amplifiers 611, 612 and data interface circuit 435*c* is implemented by using amplifiers 613, 614. When data is sent from SIMdata of SIM card interface 404 to SIMdata of SIM socket 402, enable line of 436*c* is enabled to enable amplifier 611 and disable amplifier 612, and therefore data is being carried over a pair of twisted cables connecting to amplifier 611. At the receiving side, enable line of data interface circuit 435*c*, which has amplifiers 613 and 614, is disabled to enable amplifier 613 and disable amplifier 614. Therefore SIMdata of SIM socket 402 is able to receive the data via amplifier 613. When data is sent from SIMdata of SIM socket 402 to SIMdata of SIM card interface 404, enable line of data interface circuit 435*c* is enabled to enable amplifier 614 and disable amplifier 613, and therefore data is being carried over a pair of twisted cables connecting to amplifier 614. At the receiving side, enable line of data interface circuit 436*c* is disabled to enable amplifier 612 and disable amplifier 611. Therefore SIMdata of SIM card interface 404 is able to receive the data via amplifier 612.

For both embodiments illustrated in FIGS. 6A and 6B, enable line is required for data interface circuits 435*c*, 436*c*, 427*c* and 428*c*. As there is no enable line in a SIM card and most RF transceiver for selecting a data interface circuit of SIMdata to be in sending mode or receiving mode, processing unit of a cellular router has to provide the signal for the enable line. If there is a suitable the application programming interface (API) provided by the vendor of the RF transceiver, processing unit of the cellular router may be able to determine whether the data interface circuit of SIMdata should be in receiving mode or sending mode, and then set the enable line accordingly. In the case, there is no suitable API, processing unit of the cellular router may not be able to use the enable line and the embodiments illustrated in FIG. 6A and FIG. 6B may become not usable.

FIG. 4AE illustrates one of the embodiments of the connection between a SIM card interface and a SIM socket. FIG. 4AE is similar to FIG. 4AD such that SIM socket 402 and SIM card interface 404 are also connected using RS-485, but data interface circuits 427*a*, 427*e*, 428*a* and 428*e* are removed in FIG. 4AE. PWR of SIM socket 402 is connected to a power source and SIM socket 402 is grounded via its GND pin. Similarly, PWR of SIM card interface 404 is connected to ground and SIM card interface 404 is grounded via its GND pin.

Comparing to the embodiment illustrated in FIG. 4AE with the embodiment illustrated in FIG. 4AD, LSP 405 is connected to RSP 407 via eight pins only in FIG. 4AE, instead of ten pins in FIG. 4AD. Therefore, a CAT-5 cable may be used to connect LSP 405 to RSP 407 if LSP 405 and RSP 407 are both implemented by using RJ-45 interface.

FIG. 1B illustrates one of the embodiments of the present invention. Communication apparatus 121 is similar to communication apparatus 101 but communication apparatus 121 is capable of providing SIM card information from two SIM cards to one cellular router through LSPs 127a and 127b. Cellular router 122 is similar to cellular routers 102a and 102b but cellular routers 122 is capable of retrieving and writing SIM card information to and from two SIM cards via RSPs 131a and 131b respectively for connecting to cellular networks corresponding to the SIM cards. The two SIM cards can be inserted into SIM sockets 128a and 128b. Therefore, communication apparatus 121 may be able to connect to an interconnected network through cellular router 122.

Communication apparatus 121 is connected to cellular router 122. For the present invention, there is no limitation to the number of cellular routers that communication apparatus 121 can connect to. Communication apparatus 121 and cellular router 122 are connected by cables 124 and 125. Cable 124 is used to transmit data between communication apparatus 121 and cellular router 122. Cables 125 are used to transmit SIM card information between communication apparatus 121 and cellular router 122.

One end of cable 124 is coupled to RDP 130 of cellular router 122 while the other end is coupled to LDP 126 of communication apparatus 121. One end of cable 125a is coupled to RSP 131a of cellular router 122 while other end is coupled to LSP 127a of communication apparatus 121. One end of cable 125b is coupled to RSP 131b of cellular router 122 while other end is coupled to LSP 127b of communication apparatus 121.

Cellular router 122 is capable of making cellular connections by various cellular technologies. The cellular connections can be used as WAN interfaces. Cellular router 122 may have networking interfaces such as Ethernet port, USB LAN port and WiFi interface for LAN. Cellular router 122 may be equipped to draw power from a variety of sources. In one example, cellular router 122 may draw power through cable 124 from communication apparatus 121 using PoE techniques.

Antenna 123 is used by cellular router 122 to communicate with base stations.

Communication apparatus 121 has LAN interface 135 for connecting to one or more hosts and/or nodes. Communication apparatus 121 may also perform as a Internet router or gateway for the hosts and/or nodes. The number of LAN interface 135 is not limited to one. Further, communication apparatus 121 has WAN interface 136 for connecting to an interconnected network. WAN interface 136 may be a wired WAN interface or a wireless WAN interface.

SIM sockets 128a and 128b are connected to LSP 127a, 127b respectively. The connections between SIM sockets 128 and LSPs 127 can be logical connections or electrical connection. In a preferred embodiment, SIM socket 128a is connected to LSP 127a via a data interface circuit and SIM socket 128b is connected to LSP 127b via a data interface circuit.

Although communication apparatus 121 is illustrated with two SIM sockets and two LSPs while cellular router 122 is illustrated with two RSPs, the number of SIM sockets, LSPs and RSPs are not limited to two. For example, communication apparatus 121 may be modified to have four SIM sockets and four LSPs to allow four SIM cards be used. Also, cellular router 122 may be modified to have four RSPs to write and retrieve information from SIM cards inserted into SIM sockets of the modified communication apparatus 121. The number of cables connecting cellular router will become five as one cable is for connecting RDP 131 and LDP 126 and four cables are for connecting the four LSPs and the four corresponding RSPs.

FIG. 2B illustrates a block diagram of communication apparatus 121 according to one of the embodiments of the present invention.

As communication apparatus 121 is similar to communication apparatus 101, the blocks of communication apparatus 121 are also similar to the blocks of communication apparatus 101. As communication apparatus 121 is capable of sending and receiving SIM card information from two SIM cards to cellular router 122, two data interface circuits 228a and 228b are used for connecting SIM sockets 128a and 128b with LSP 127a and LSP 127b respectively.

Communication apparatus 121 comprises processing unit 225, memory 226, storage unit 227, system bus 230, LDP 126, LAN interface 135, WAN interface 136, LSPs 127a and 127b, data interface circuits 228a and 228b, and SIM sockets 128a and 128b. Processing unit 225 and memory 226 are connected with each other directly. LSPs 127 are connected to data interface circuits 228 respectively. Data interface circuits 228 are connected to SIM sockets 128 respectively.

Processing unit 225, memory 226, storage unit 227, system bus 230, LDP 126, LAN interface 135, WAN interface 136, LSPs 127, data interface circuits 228, and SIM sockets 128 perform functions similar to processing unit 205, memory 206, storage unit 207, system bus 210, LDP 106a, LAN interface 115, WAN interface 116, LSPs 107, data interface circuits 208, and SIM sockets 108 respectively.

Memory 226 and storage unit 227 are storage medium. System bus 230 connects processing unit 225 directly or indirectly to storage unit 227, LDPs 126, LAN interface 135 and WAN interface 136.

Data interface circuits 228 are placed between SIM sockets 128 and LSPs 127 and used for allowing SIM card information being transmitted over a longer distance, particularly more than ten centimeters. As the amount of SIM card information needs to be communicated between communication apparatus 121 and cellular router 122, is in general below 5 Mbps, there are myriads methods to implement data interface circuits 228. In one variant, the selection of implementation of data interface circuits 228 also depends on expected distance between communication apparatus 121 and cellular router 122.

FIG. 3B illustrates one of the embodiments of cellular router 122 according to the present invention. Cellular router 122 comprises processing unit 321, memory 323, storage unit 324, bus 330, RDP 130, RSPs 131, data interface circuits 327, SIM card interfaces 328, RF transceiver 322 and antenna 123. Processing unit 321 and memory 323 may connect to each other directly. Memory 323 and storage unit 324 are storage medium.

RDP 130 is used to transmit and receive data packets to and from communication apparatus 121.

Bus 330 connects processing unit 321 directly or indirectly to storage unit 324, RDP 130 and RF transceiver 322.

Antenna 123 is connected to RF transceiver 322 and antenna 123 is used to transmit and receive electrical signal to and from base stations.

RF transceiver 322 is connected to bus 330, SIM card interfaces 328a, 328b and antenna 123. RF transceiver 322 is capable of transmitting data received via bus 330 to a base station and receive data from the base station through antenna 123. SIM card interface 328*a* is connected to RSP 131*a* through data interface circuit 327*a*. Similarly, SIM card interface 328*b* is connected to RSP 131*b* through data interface circuit 327*b*. Therefore, RF transceiver 322 is able to write and retrieve SIM card information to and from a SIM card inserted to SIM sockets 128*a* and 128*b* through cable 125*a*, 125*b* and RSP 131*a*, 131*b* respectively. As there are many RF transceivers from different manufacturers can be used for implementing RF transceiver 322, not all of these RF transceivers are capable of using multiple SIM cards. Therefore, for those that are not able to use multiple SIM cards, additional circuitries may be required to select SIM card interfaces 328*a* or 328*b*. Alternatively, SIM card interfaces 328*a* and 328*b* may have a multiplexer/demultiplexer for selecting SIM card interface. For example, a multiplexer/demultiplexer is used for selecting data to/from SIM card interfaces 328*a* or 328*b*. The multiplexer/demultiplexer is placed between SIM card interfaces 328*a*, 328*b* and RF transceiver 322. The multiplexer/demultiplexer may also be connected to bus 330. The multiplexer/demultiplexer may be controlled by processing unit 321 through bus 330. Alternatively, the multiplexer/demultiplexer may be connected to processing unit 321 directly without using bus 330.

In an embodiment, as illustrated in FIG. 3BC, SIM card interfaces 328*a* and 328*b* are replaced by SIM card interface 328*c*. SIM card interface 328*c* is capable of receiving instructions from processing unit 321 through bus 330 to select SIM card information from/to data interface circuits 327*a* or 327*b* to/from RF transceiver 322. SIM card interface 328*c* may have a multiplexer/demultiplexer for selecting data interface circuits 327*a* or 327*b*. Comparing to the embodiment illustrated in FIG. 3B, this embodiment allows processing unit 321 to select SIM card information.

FIG. 4BA illustrates one of the embodiments of the connection between two SIM card interfaces to two SIM sockets using two RSPs. LSPs 421, SIM sockets 422, RSPs 423 and SIM card interfaces 424 are more detailed illustrations of LSPs 127, SIM sockets 128, RSPs 131 and SIM card interfaces 327 respectively. LSPs 421 and RSP 423 have eight pins as they are implemented by RJ-45 in this embodiment. There is no limit that LSPs 421 and RSPs 423 must have eight pins.

For readability, discussion below about SIM socket 422*a*, LSP 421*a*, RSP 423*a* and SIM card interface 424*a* apply to SIM socket 422*b*, LSP 421*b*, RSP 423*b* and SIM card interface 424*b* respectively.

PWR, SIMclk, SIMdata, SIMrst and GND of SIM socket 422*a* are connected to Pin 1/PWR, Pin 2, Pin 3, Pin 4 and Pin 8/GND of LSP 421*a* respectively. Pin 1/PWR, Pin 2, Pin 3, Pin 4 and Pin 8/GND of LSP 421*a* are connected to Pin 1/PWR, Pin 2, Pin 3, Pin 4 and Pin 8/GND of RSP 423*a* respectively. PWR, SIMclk, SIMdata, SIMrst and GND of SIM card interface 424*a* are connected to Pin 1/PWR, Pin 2, Pin 3, Pin 4 and Pin 8/GND of RSP 423*a*.

PWR of SIM socket 422*a* receives power from PWR pin of SIM card interface 424*a* via Pin 1/PWR of RSP 423*a* and Pin 1/PWR of LSP 421*a*. SIM socket 422*a* is grounded via its GND pin, Pin 8/GND of LSP 421*a*, Pin 8/GND of RSP 423*a* and GND pin of SIM card interface 424*a*. SIMclk of SIM socket 422*a* provides a clock signal, originating from SIMclk of SIM card interface 424*a* and via Pin 2 of LSP 421*a* and Pin 2 of RSP 423*a*, to a SIM card to be inserted into SIM socket 422*a*. SIMdata of SIM socket 422*a* is used for transmitting and receiving serial data to and from SIMdata of SIM card interface 424*a* via Pin 3 of RSP 423*a* and Pin 3 of LSP 421*a*. SIMrst of SIM socket 422*a* is used to provide a reset signal originating from SIMrst of SIM card interface 424*a* to the SIM card via Pin 4 of LSP 421*a* and Pin 4 of RSP 423*a*. The reset signal may be used to reset the SIM card.

As five pins of LSP 421*a* are connected with five pins of RSP 423*a*, a CAT-5 cable, having eight wires, may be used to connect LSP 421*a* to RSP 423*a* if LSP 421*a* and RSP 423*a* are both implemented by using RJ-45 interface.

FIG. 4BB illustrates one of the embodiments of the connection between two SIM card interfaces and two SIM sockets using two RSPs. FIG. 4BB is similar to FIG. 4BA but data interface circuits are inserted between a SIM socket and LSP, and between a RSP and SIM card interface. Data interface circuits 430*a-e* are inserted to connect LSP 421*a* and SIM socket 422*a*. Data interface circuits 430*f-j* are inserted to connect LSP 421*b* and SIM socket 422*b*. Data interface circuits 431*a-e* are inserted to connect RSP 423*a* and SIM card interface 424*a*. Data interface circuits 431*f-j* are inserted to connect RSP 423*b* and SIM card interface 424*b*. Data interface circuits 431*a-e* and 431*f-j* may amplify the signal originating from SIM card interfaces 424*a* and 424*b* to reduce signal degradation. Data interface circuits 430*a-e* and 430*f-j* may amplify the signal to SIM sockets 422*a* and 422*b* in order to reduce signal degradation.

In one variant, data interface circuits 430*a*, 430*b*, 430*d* and 430*e* are not needed and only data interface circuits 431*a-e* and 430*c* are needed when SIM socket 422*a* receives signals from SIM card interface 424*a* and data interface circuits 431*a-e* may provide enough power to transmit signals from SIM card interface 424*a* to SIM socket 422*a*. Further, data interface circuit 430*c* is needed to amplify SIMdata signals as communications between SIM card interface 424*a* and SIM socket 422*a* can be bi-directional. For readability, the descriptions above about data interface circuits 430*a-e*, 431*a-e*, SIM card interface 424*a* and SIM socket 422*a* are applicable to data interface 430*f-j*, 431*f-j*, SIM card interface 424*b* and SIM socket 422*b*.

FIG. 4BC illustrates one of the embodiments of the connection between one SIM card interface and two SIM sockets using two RSPs. FIG. 4BC is similar to FIG. 4BB but data interface circuits 430*a-e* and 430*f-j* are replaced by data interface circuits 432*a* and 432*b* respectively. Data interface circuits 431*a-e* and 431*f-j* are replaced by data interface circuits 433*a* and 433*b* respectively. Further, SIM card interfaces 424*a* and 424*b* are replaced by one SIM card interface, namely SIM card interface 425.

SIM card interface 425 is a more detailed illustration of SIM card interface 328*c* in FIG. 3BC. SIM card interface 425 is connected to data interface circuits 433*a*, 433*b* and bus 330. As SIM card interface 425 is connected to bus 330, SIM card interface 425 is capable of receiving instructions from processing unit 321 through bus 330 to select SIM card information from/to data interface circuits 433*a* or 433*b* to/from RF transceiver 322. SIM card interface 425 may have a multiplexer/demultiplexer for selecting data to/from data interface circuits 327*a* or 327*b*.

FIG. 1C illustrates one of the embodiments according to the present invention. Communication apparatus 141 is similar to communication apparatus 121 but communication apparatus 141 is capable of providing and receiving SIM card information to and from two SIM cards to a cellular router through only one LSP port, namely LSP port 147. Cellular router 142 is similar to cellular router 122 but cellular router 142 is capable of retrieving and writing SIM card information to and from two SIM cards via one RSP only, namely RSP 151, for connecting to cellular networks corresponding to the SIM cards. The two SIM cards can be inserted into SIM sockets 148a and 148b. Therefore, communication apparatus 141 may be able to connect an interconnected network through cellular router 142.

When two SIM cards are inserted into SIM sockets 148a and 148b, communication apparatus 141 is able to provide and receive two SIM card information. These SIM card information can be retrieved by or written from cellular router 142 using cable 145 instead of cable 125a and cable 125b. In one embodiment, SIM card information to/from a plurality of SIM cards are combined together in the form of packets and the packets are transmitted/received through cable 145. For example, viewing in conjunction with FIG. 2C, a first set of packets corresponding to SIM card information retrieved from a SIM card inserted into SIM socket 148a are created by data interface circuit 248 and then transmitted to cellular router 142 through LSP 147, cable 145 and RSP 151. A second set of packets corresponding to SIM card information created by cellular router 142 are transmitted to a SIM card inserted into SIM socket 148b through RSP 151, cable 145, LSP 147, data interface circuit 248 and SIM socket 148b. In another embodiment, SIM card information are transmitted/received using time-division multiplexing (TDM) technique. For example, during a first period of time, SIM card information retrieved from a SIM card inserted into SIM socket 148a are created by data interface circuit 248 and then transmitted to cellular router 142 through LSP 147, cable 145 and RSP 151. During a second period of time, SIM card information created by cellular router 142 are transmitted to a SIM card inserted into SIM socket 148b through RSP 151, cable 145, LSP 147, data interface circuit 248 and SIM socket 148b. By using TDM technique, SIM card information from/to a plurality of SIM cards can then be communicated between cellular router 142 and communication apparatus 141. Those skilled in the art would appreciate that synchronization between cellular router 142 and communication apparatus 141 may be required for performing TDM. In another embodiment, frequency division multiplexing (FDM) technique may be used to allow SIM card information from/to a plurality of SIM cards to be communicated between cellular router 142 and communication apparatus 141. In another embodiment, code division multiplexing (CDM) technique may be used to allow SIM card information received from/sent to a plurality of SIM cards between cellular router 142 and communication apparatus 141.

Communication apparatus 141 is connected to cellular router 142. For the present invention, there is no limitation to the number of cellular routers that communication apparatus 141 can connect to. Communication apparatus 141 and cellular router 142 are connected by cables 144 and 145. Cable 144 is used to transmit data between communication apparatus 141 and cellular router 142. Cable 145 is used to transmit SIM card information between communication apparatus 141 and cellular router 142.

One end of cable 144 is coupled to RDP 150 of cellular router 142 while the other end is coupled to LDP 146 of communication apparatus 141. One end of cable 145 is coupled to RSP 151 of cellular router 142 while other end is coupled to LSP 147 of communication apparatus 141.

Antenna 143 is used by cellular router 142 to communicate with base stations.

Communication apparatus 141 has LAN interface 155 for connecting to one or more hosts and/or nodes. Communication apparatus 141 may also perform as an Internet router or a gateway for the hosts and/or nodes. The number of LAN interface 155 is not limited to one. Further, communication apparatus 141 has WAN interface 156 for connecting to an interconnected network. WAN interface 156 may be a wired WAN interface or a wireless WAN interface.

SIM sockets 148a and 148b are connected to LSP 147. The connections between SIM sockets 148 and LSP 147 can be logical connections or electrical connections. In a preferred embodiment, SIM socket 148a and 148b are connected to LSP 147 via a data interface circuit.

FIG. 2C illustrates communication apparatus 141 according to one of the embodiments of the present invention.

Communication apparatus 141 comprises processing unit 245, memory 246, storage unit 247, system bus 250, LDP 146, LSP 147, data interface circuit 248, SIM sockets 148, LAN interface 155 and WAN interface 156. Processing unit 245 and memory 246 are connected with each other directly. Data interface circuit 248 is connected to LSP 147 and SIM sockets 148. System bus 250 connects processing unit 245 directly or indirectly to storage unit 247, LDP 146, LAN interface 155 and WAN interface 156. Using system bus 250 allows communication apparatus 141 to have increased modularity. System bus 250 can be any of several types of bus structures including a memory bus, a peripheral bus, and a local bus using any of a variety of bus architectures.

Processing unit 245, memory 246, storage unit 247, system bus 250, LDP 146, LAN interface 155 and WAN interface 156 perform functions similar to processing unit 225, memory 226, storage unit 227, system bus 230, LDP 126, LAN interface 135 and WAN interface 136 respectively.

FIG. 3C illustrates one of the embodiments of cellular routers 142 according to the present invention.

Cellular router 142 comprises processing unit 341, memory 343, storage unit 344, bus 350, RDP 150, RSP 151, data interface circuits 347, SIM card interfaces 348, RF transceiver 342a and antenna 143. Processing unit 341 and memory 343 may connect to each other directly. Memory 343 and storage unit 344 are storage medium.

RDP 150 is used to transmit and receive data packets to and from communication apparatus 141.

Bus 350 connects processing unit 341 directly or indirectly to storage unit 344, RDP 150 and RF transceiver 342a.

Antenna 143 is connected to RF transceiver 342a and antenna 143 is used to transmit and receive electrical signal to and from base stations.

RF transceiver 342a is connected to bus 350, SIM card interfaces 348a, 348b and antenna 143. RF transceiver 342a is capable of transmitting data received via bus 350 to a base station through antenna 143. SIM card interfaces 348a, 348b are connected to RSP 151 through data interface circuit 347a. Therefore, RF transceiver 342a is able to write and retrieve SIM card information to and from a SIM card inserted to SIM sockets 128a, 128b through cable 145 and RSP 151 respectively.

As there are many RF transceivers from different manufacturers can be used for implementing RF transceiver 342, not all of these RF transceivers are capable of using multiple SIM cards. Therefore, for those RF transceivers that are not able to use multiple SIM cards, additional circuitries may be required to select SIM card interfaces 328a or 328b. In one embodiment, an alternative portion of FIG. 3C is illustrated by FIG. 3CC. SIM card interface 348c replaces SIM card interfaces 348a and 348b in FIG. 3C and data interface circuit 347c replaces data interface circuit 347a. Data interface circuit 347c has circuitries to allow processing unit 341 to control SIM card information from/to SIM cards inserted at SIM sockets 148a or 148b to pass through a SIM card interface. Therefore, only one SIM card interface is required, namely SIM card interface 348c. SIM card interface 348c is directly connected to RF transceiver 342c. In one embodiment, an alternative portion of FIG. 3C illustrated by FIG. 3CD. SIM card interface 348d replaces SIM card interfaces 348a and 348b in FIG. 3C. SIM card interface 348d has additional circuitries for selecting SIM card interface. For example, SIM card interface 348d may have a demultiplexer for selecting SIM card information from/to SIM cards inserted at SIM sockets 148a or 148b. SIM card interface 348d is also connected bus 350 and may be controlled by processing unit 341 through bus 350.

Alternatively, the multiplexer or demultiplexer may be connected to processing unit 341 directly without using bus 350.

FIG. 4CA illustrates one of the embodiments of the connection between two SIM card interfaces to two SIM sockets using one RSP. LSP 441, SIM sockets 442a and 442b, RSP 443, SIM card interfaces 444a and 444b are more detailed illustrations of LSP 147, SIM sockets 148a and 148b, RSP 151, SIM card interfaces 348a and 348b respectively. LSP 441 and RSP 443 both have eight pins as both are implemented by RJ-45 in this embodiment. There is no limitation that LSP 441 and RSP 443 must have eight pins. PWR, SIMclk, SIMdata, SIMrst and GND of SIM socket 442a are connected to Pin 1/PWR, Pin 2, Pin 3, Pin 4 and Pin 8/GND of LSP 441 respectively. PWR, SIMclk, SIMdata, SIMrst and GND of SIM socket 442b are connected to Pin 1/PWR, Pin 5, Pin 6, Pin 7 and Pin 8/GND of LSP 441 respectively. Pin 1/PWR, Pin 2, Pin 3, Pin 4, Pin 5, Pin 6, Pin 7 and Pin 8/GND of LSP 441 are connected to Pin 1/PWR, Pin 2, Pin 3, Pin 4, Pin 5, Pin 6, Pin 7 and Pin 8/GND of RSP 443 respectively. PWR, SIMclk, SIMdata, SIMrst and GND of SIM card interface 444a are connected to Pin 1/PWR, Pin 2, Pin 3, Pin 4 and Pin 8/GND of RSP 443 respectively. PWR, SIMclk, SIMdata, SIMrst and GND of SIM card interface 444b are connected to Pin 1/PWR, Pin 5, Pin 6, Pin 7 and Pin 8/GND of RSP 443 respectively.

PWR of SIM socket 442a receives power from PWR pin of SIM card interface 444a via Pin 1/PWR of RSP 443 and Pin 1/PWR of LSP 441. SIM socket 442a is grounded via its GND pin, Pin 8/GND of LSP 441, Pin 8/GND of RSP 443 and GND pin of SIM card interface 444a. SIMclk of SIM socket 442a provides a clock signal, originating from SIMclk of SIM card interface 444a and via Pin 2 of LSP 441 and Pin 2 of RSP 443, to a SIM card to be inserted into SIM socket 442a. SIMdata of SIM socket 442a is used for transmitting and receiving serial data to and from SIMdata of SIM card interface 444a via Pin 3 of RSP 443 and Pin 3 of LSP 441. SIMrst of SIM socket 442a is used to provide a reset signal originating from SIMrst of SIM card interface 444a to the SIM card via Pin 4 of LSP 441 and Pin 4 of RSP 443. The reset signal may be used to reset the SIM card.

PWR of SIM socket 442b receives power from PWR pin of SIM card interface 444b via Pin 1/PWR of RSP 443 and Pin 1/PWR of LSP 441. SIM socket 442b is grounded via its GND pin, Pin 8/GND of LSP 441, Pin 8/GND of RSP 443 and GND pin of SIM card interface 444b. SIMclk of SIM socket 442b provides a clock signal, originating from SIMclk of SIM card interface 444b and via Pin 5 of LSP 441 and Pin 5 of RSP 443, to a SIM card to be inserted into SIM socket 442b. SIMdata of SIM socket 442b is used for transmitting and receiving serial data to and from SIMdata of SIM card interface 444b via Pin 6 of RSP 443 and Pin 6 of LSP 441. SIMrst of SIM socket 442b is used to provide a reset signal to the SIM card originating from SIMrst of SIM card interface 444b via Pin 7 of LSP 441 and Pin 7 of RSP 443.

As LSP 441 and RSP 443 are connected via eight pins, LSP 441 and RSP 443 may be implemented by using RJ-45 ports and a CAT-5 cable may be used to connect LSP 441 to RSP 443.

FIG. 4CB illustrates one of the embodiments of the connection between two SIM sockets and one SIM card interface using one RSP, as RF transceiver is capable of having only one SIM card. Data interface circuit 456 and SIM card interface 444 are more detailed illustrations of data interface circuit 347c and SIM card interface 348c respectively. Data interface circuit 456 is connected to bus 350 which allows processing unit 341 to send/receive SIM card information to/from SIM cards inserted into SIM sockets 148a or 148b.

FIG. 4CCA illustrates one of the embodiments of the present invention for implementing data interface circuit 456 for the system in FIG. 4CC. Data interface circuit 456 comprises three selectors 455a, 455b and 455c. Each of selectors 455 has four pins, I/O_A, I/O_B, I/O_C and Sel. According to the signal in Sel, either I/O_A or I/O_B is connected to I/O_C. For illustration purpose only, if Sel is 0, I/O_A is connected to I/O_C. If Sel is 1, I/O_B is connected to I/O_C.

Further, selectors 455 may function as demultiplexers connecting between SIM card interface 444 and RSP 443. As SIM card information originating from SIM card interface 444 can be written to one SIM card only, selectors 455 take a single input signal (I/O_C) and selecting one of the two outputs (I/O_A and I/O_B), and switch the selected output to the single input.

Similarly, only one SIM card information originating from SIM cards inserted into SIM sockets 148a and 148b can be retrieved by SIM card interface 444, selectors 455 take single output signal (I/O_C) and selecting one of the two inputs (I/O_A and I/O_B), and switch the selected input to the single output. Under this condition, selectors 455 may function as multiplexers connecting between SIM card interface 444 and RSP 443.

Selectors 455 may be controlled by processing unit 341 via Sel pin and bus 350.

Data interface circuit 456 is connected to SIM card interface 444, RSP 443 and bus 350. PWR and GND of SIM card interface 444 are connected to Pin 1/PWR and Pin 8/GND of RSP 443 respectively via data interface circuit 456. I/O_C of selectors 455a, 455b and 455c are connected to SIMclk, SIMdata and SIMrst of SIM card interface 444 respectively. Pin 2 and Pin 5 of RSP 443 are connected to I/O_A and I/O_B of selector 455a respectively. Pin 3 and Pin 6 of RSP 443 are connected to I/O_A and I/O_B of selector 455b respectively. Pin 4 and Pin 7 of RSP 443 are connected to I/O_A and I/O_B of selector 455c respectively.

In one embodiment, a SIM card information corresponding to one of the plurality of SIM cards can be selected for sending to/retrieving from one SIM card interface. For example, two SIM cards are inserted into SIM sockets 148a and 148b respectively. Signals of Pin 2, Pin 3 and Pin 4 of RSP 443 are originated from a SIM card A. Signals of Pin 4, Pin 5 and Pin 6 of RSP 443 are originated from SIM card B. As RF transceiver 342c is not capable of using multiple SIM cards, either SIM card A or SIM card B is selected. If SIM card A is selected, the selectors 455 will switch I/O_C to I/O_A. As a result, SIM card information of SIM card A is retrieved from SIM card interface 444 via data interface circuit 456, Pin 2, Pin 3 and Pin 4 of RSP 443. Similarly, if SIM card B is selected, the selectors 455 will switch I/O_C to I/O_B. Then SIM card information of SIM card B is retrieved from SIM card interface 444.

FIG. 4CD illustrates one of the embodiments of the connection between two SIM sockets and one SIM card interface using one RSP. Data interface circuit 458 and SIM card interface 445 are more detailed illustrations of data interface circuit 347*d* and SIM card interface 348*d* respectively. Unlike a common SIM card interface which has five pins, SIM card interface 445 has nine pins.

Pin 1/PWR and Pin 8/GND of SIM card interface 445 are connected to Pin 1/PWR and Pin 8/GND pin of data interface circuit 458 respectively. Pin 2, Pin 3 and Pin 4 of SIM card interface 445 may be used to transmit/receive SIMclk, SIMdata and SIMrst signals originating from a SIM card inserted into SIM socket 442*a* respectively. Pin 5, Pin 6 and Pin 7 may be used transmit/receive SIMclk, SIMdata and SIMrst signals originating from another SIM card inserted into SIM socket 442*b* respectively. As SIM card interface 445 may have selectors, Sel pin may be used to control inputs and outputs of the selectors.

Comparing to the embodiment illustrated in FIG. 4CC, selections of SIM card information are performed through SIM card interface 445 instead of data interface circuit 458. For example, if Sel is 0, Pin 2, Pin 3 and Pin 4 of SIM card interface 445 are selected. Thus SIM card information originating from a SIM card inserted into SIM socket 442*a* is allowed to pass through RF transceiver 342*d*.

FIG. 1D illustrates one of the embodiments according to the present invention. Communication apparatus 161 is connected to two cellular routers 102*a* and 102*b*. Cable 164*a* is used to transmit data packets between communication apparatus 161 and cellular router 102*a*. Similarly, cable 164*b* is used to transmit data packets between communication apparatus 161 and cellular router 102*b*. For the present invention, there is no limit to the number of cellular routers that communication apparatus 161 can connect to.

Communication apparatus 161 is similar to communication apparatus 101 but communication apparatus 161 is capable of providing SIM card information from two SIM cards to two cellular routers through only one LSP port, namely 167. Communication apparatus 161 is able to combine SIM card information together. When two SIM cards are inserted into sockets 168*a* and 168*b*, communication apparatus 161 may be able to connect to an interconnected network through cellular router 102*a* and/or cellular router 102*b*.

One end of cable 164*a* is coupled to RDP 110*a* of cellular router 102*a* while the other end is coupled to LDP 166*a* of communication apparatus 161. One end of cable 164*b* is coupled to RDP 110*b* of cellular router 102*b* while the other end is coupled to LDP 166*b* of communication apparatus 161. One end of cable 165 is coupled to a data interface circuit 178 while the other end is coupled to LSP 167 of communication apparatus 161. RSP 111*a* of cellular router 102*a* and LSP 167 of communication apparatus 161 are connected via cable 177*a*, data interface circuit 178 and cable 165. RSP 111*b* of cellular router 102*b* and LSP 167 of cellular router 162*b* are connected via cable 177*b*, data interface circuit 178 and cable 165.

Communication apparatus 161 has LAN interface 175 for connecting to one or more hosts and/or nodes. Communication apparatus 161 may also perform as an Internet router or gateway for the hosts and/or nodes. The number of LAN interface 175 is not limited to one.

Communication apparatus 161 has WAN interface 176 for connecting to an interconnected network. WAN interface 176 may be a wired WAN interface or a wireless WAN interface. Further, LDPs 166*a* and 166*b* may perform as additional WAN interfaces for communication 161.

SIM sockets 168*a* and 168*b* are connected to LSP 167. The connections between SIM sockets 168 and LSP 167 can be logical connections or electrical connection. In a preferred embodiment, SIM sockets 168*a* and 168*b* are connected to LSP 167 via a data interface circuit.

FIG. 2D illustrates one of the embodiments of communication apparatus 161 according to the present invention.

Communication apparatus 161 comprises processing unit 265, memory 266, storage unit 267, system bus 270, LDPs 166*a* and 166*b*, LSP 167, data interface circuit 268, SIM sockets 168*a* and 168*b*, LAN interface 175 and WAN interface 176. Processing unit 265 and memory 266 are connected with each other directly. Data interface circuit 268 is connected to LSP 167 and SIM sockets 168*a* and 168*b*. System bus 270 connects processing unit 265 directly or indirectly to storage unit 267, LDPa 166*a* and 166*b*, LAN interface 175 and WAN interface 176.

Communication apparatus 161 is similar to communication apparatus 141 but communication apparatus 161 has two LDPs. LDPs 166*a* and 166*b* may perform as additional LAN interfaces for communication apparatus 161. Processing unit 265, memory 266, storage unit 267, system bus 270, LAN interface 175 and WAN interface 176 perform functions similar to processing unit 245, memory 246, storage unit 247, system bus 250, LAN interface 155 and WAN interface 156 respectively.

FIG. 1E illustrates one of the embodiments according to the present invention. FIG. 1E is similar to FIG. 1C but cellular router 182 has two RF transceivers. Therefore cellular router 182 is capable of wirelessly communicating with two base stations concurrently.

Communication apparatus 141 is connected to one cellular router 182. For the present invention, there is no limitation to the number of cellular routers that communication apparatus 141 can connect to. Communication apparatus 141 and cellular router 182 are connected by cables 184 and 185. Cable 184 is used to transmit data between communication apparatus 141 and cellular router 182. Cable 185 is used to transmit SIM card information between communication apparatus 141 and cellular router 182.

One end of cable 184 is coupled to RDP 190 of cellular router 182 while the other end is coupled to LDP 146 of communication apparatus 141. One end of cable 185 is coupled to RSP 191 of cellular router 182 while other end is coupled to LSP 147 of communication apparatus 141.

Antennas 183 are used by cellular router 182 to communicate with base stations.

FIG. 3E illustrates a block diagram of cellular routers 182 according to the present invention.

Cellular router 182 comprises processing unit 381, memory 383, storage unit 384, bus 390, RDP 190, RSP 191, data interface circuits 387, SIM card interfaces 388, RF transceivers 382 and antennas 183. Processing unit 381 and memory 383 may connect to each other directly. Memory 383 and storage unit 384 are storage medium. RDP 190 is used to transmit and receive data packets to and from communication apparatus 141. Bus 390 connects processing unit 381 directly or indirectly to storage unit 384, RDP 190 and RF transceivers 382.

SIM card interface 388*a* is connected to data interface circuit 387 and RF transceiver 382*a*. Similarly, SIM card interface 388*b* is connected to data interface 387 and RF transceiver 382*b*.

RF transceivers 382 are connected to bus 390, SIM card interfaces 388 and antennas 183. Antennas 183 are used to transmit and receive electrical signal to and from base stations. RF transceiver 382*a* and 382*b* are capable of transmitting data received via bus 390 to a base station through antenna 183a and 183b respectively.

In one embodiment, a cellular router may have a plurality of RF transceivers but use only one RSP to transmit/receive SIM card informations to/from a communication apparatus. As illustrated in FIG. 3E, cellular router 182 have two RF transceivers 382a, 382b and one RSP namely RSP 191.

RF transceiver 382a is capable of writing and retrieving SIM card information to and from a SIM card inserted SIM socket 148a through RSP 191, SIM card interface 388a and data interface circuit 387. Similarly, RF transceiver 382b is capable of writing and retrieving SIM card information to and from another SIM card inserted to SIM socket 148b through RSP 191, SIM card interface 388b and data interface circuit 387. As there is only one RSP in cellular router 182, SIM card information to/from two SIM cards are then demultiplexed/multiplexed in form of packets so that the packets can be transmitted/received through RSP 191. In this embodiment, the number of RF transceiver in a cellular router is not limited to two.

FIG. 4E illustrates one of the embodiments of the connection between two SIM card interfaces and two SIM sockets using one RSP. SIM card interfaces 484a and 484b, data interface circuit 496 are more detailed illustration of SIM card interfaces 388a, 388b and data interface circuit 387 respectively. Data interface circuit 495 is placed between SIM sockets 482 and LSP 481. Pin1/PWR, Pin 2, Pin 3, Pin 4, Pin 5, Pin 6, Pin 7 and Pin 8/GND of LSP 481 is connected to Pin 1/PWR, Pin 2, Pin 3, Pin 4, Pin 5, Pin 6, Pin 7, Pin 8/GND of RSP 483. RF transceivers 382a and 382b are connected to SIM card interface 484a and 484b respectively.

RF transceivers 382a and 382b are capable of communicating with two base stations concurrently using two SIM card information originating from two SIM cards inserted into SIM sockets 482a and 482b. In one variant, if one of the base stations cannot be reached by RF transceiver 382a, cellular router 182 may still be capable of connecting to an interconnected network through RF transceiver 382b.

FIG. 10 and FIG. 11 together illustrate one of the embodiments of the present invention for implementing the circuits illustrated in FIG. 4AB. FIG. 10 illustrates a detailed circuit for data interface circuits 436b, 436c and 436d and FIG. 11 illustrates a detailed circuit for data interface circuit 435a, 435b, 435c, and 435d. Data interface circuits 436e and 435e are also not needed as the ground can be directly connected. In order to allow SIMclk, SIMdata and SIMrst signals to be carried more than 50 meters using a CAT-5 cable, voltage higher than 1.8V or 3.3V is preferred to be used for transmitting the signals to reduce degradation. For example, 5V or 12 V may be used. Therefore, circuits are deployed to raise the voltage. When the signals reach the receiving side, the voltage of the signals need to be lowered back to 1.8V or 3.3V for SIM socket or SIM card interface. For illustration purpose, 1.8V represents one and zero volt represents zero in a digital communication between SIM card interface 404 and a SIM socket 402. Data interface circuits 436 and 435 need to raise voltage to 5V from 1.8V for transmitting one and then lowering the voltage back to 1.8V. For transmitting zero, there is no need to raise and then lower voltage as zero volt represents zero.

Data interface circuit 436b is mainly comprised of capacitors C2, C3, resistors R1, R3 and buffer U2A. Data interface circuit 436c is mainly comprised of capacitors C4, C5, C6, resistors R2, R4, R5, R6 and FET Q1. Data interface circuit 436d is mainly comprised of capacitor C7, resistor R7 and buffer U2B.

Data interface circuit 435a is mainly comprised of capacitors C10, C11, and regulator U4. Data interface circuit 435b is mainly comprised of capacitors C14, C15, resistors R13, R15, R16, R17 and buffer U3B. Data interface circuit 435c is mainly comprised of capacitor C12, resistors R9, R10, R11 and FET Q2. Data interface circuit 435d is mainly comprised of resistor R8, R12, and buffer U3A.

Jacks J1 at a cellular router and J3 at a communication apparatus are used for the CAT-5 cable coupling. Jacks J1 and J3 may be RJ-45 jacks. There are myriad choices of jacks that can be used for jacks J1 and J3. Jacks that have LED lights built in are preferred because the LED lights may be used to indicate status of the connection between SIM socket 402 and SIM card interface 404. For example, a LED light can be used to indicate whether there is power supplied to SIM socket 402. In another example, a LED light can be used to indicate whether SIMrst is set to low. In another example, a fast blinking LED can be used to indicate that data is being transmitted over SIMdata. However, there is no limitation that LED lights must be built-in.

The following table [Table 0001] shows the arrangement of pins used in jack J1 according to a preferred embodiment.

TABLE 0001

| Pin number | Connection |
| --- | --- |
| Pin 1 | Used for SIMrst and connects to the output of buffer U2A |
| Pin 2 | Grounded |
| Pin 3 | Power supply |
| Pin 4 | Used for SIMdata and connects to the drain of field-effect transistor (FET) Q1 |
| Pin 5 | Grounded |
| Pin 6 | Grounded |
| Pin 7 | Use for SIMclk and connects to the output of buffer U2B |
| Pin 8 | Grounded |
| Pin 13 | Grounded |
| Pin 14 | Grounded |
| Pin 15 | Grounded |
| Pin 16 | Grounded |

The following table [Table 0002] shows the arrangement of pins used in jack J3 according to a preferred embodiment.

TABLE 0002

| Pin 1 | Used for SIMrst and connects to the input of buffer U3A |
| --- | --- |
| Pin 2 | Grounded |
| Pin 3 | Used of powering SIM card interface 404 and the VCC_RX is the voltage level |
| Pin 4 | Used for SIMdata and connects to the drain of FET Q2 |
| Pin 5 | Grounded |
| Pin 6 | Grounded |
| Pin 7 | Used for SIMclk and connects to the input of buffer U3B |
| Pin 8 | Grounded |
| Pin 9 | Grounded |
| Pin 10 | Used for powering a LED light of jack J3 |
| Pin 13 | Grounded |
| Pin 14 | Grounded |
| Pin 15 | Grounded |
| Pin 16 | Grounded |

There is no limitation that the arrangements of pins must follow the above arrangements. As there are four pairs of twisted wires in a CAT-5 cable and three signals (SIMclk, SIMrst and SIMdata), one power supply and one ground, there are three wires not used. It is preferred to ground these three wires in order to reduce noise.

The following table [Table 0003] shows the arrangement of pins to connect to SIM socket 402 according to a preferred embodiment.

TABLE 0003

| | |
|---|---|
| Pin 1 | Providing power to the SIM card and connects to output of regulator U4 |
| Pin 2 | Used for SIMrst and connects to the output of buffer U3A |
| Pin 3 | Used for SIMclk and connects to the output of buffer U3B |
| Pin 4 | Not connected |
| Pin 5 | Grounded |
| Pin 6 | Not connected |
| Pin 7 | Used for SIMdata and connects to the source of FET Q2 |
| Pin 8 | Not connected |
| Pin 9 | Grounded |
| Pin 10 | Grounded |

The following table [Table 0004] shows the arrangement of pins to connect to SIM card interface 404 according to a preferred embodiment.

TABLE 0004

| | |
|---|---|
| Pin 1 | Not connected |
| Pin 2 | Uses for SIMrst and connects to the input of buffer U2A |
| Pin 3 | Used for SIMclk and connects to the input of buffer U2B |
| Pin 4 | Not connected |
| Pin 5 | Grounded |
| Pin 6 | Not connected |
| Pin 7 | Used for SIMdata and connects to the source of FET Q1 |
| Pin 8 | Not connected |
| Pin 9 | Not connected |
| Pin 10 | Grounded |

For readability, VCC is the input voltage supplied to buffer U2A, FET Q1 and buffer U2B; VCC_RX is the voltage of supply power at the receiving end of the CAT 5 cable; and VCC_SIM is the voltage of supply power at the SIM socket. VCC_RX is likely to be lowered than the power supplied by SIM card interface because of power lost in the CAT 5 cable. Further VS, VG and VD are the voltages at the source, gain and drain of a transistor respectively.

For illustration purpose, signal voltage is raised to 5 volt when the signal is being transmitted. Therefore when one is being transmitted in SIMclk, SIMrst and/or SIMdata, the transmitted signal voltage should be at about 5V.

SIM socket 402 receives power from cellular router 102*a*. In order to have a higher voltage being carried in the CAT-5 cable than the voltage supplied to SIM card interface 404, pin 3 of jack J1 may directly be connected to the power supply of cellular router 102*a* as the power supply may have higher voltage. If the voltage of the power supply of cellular router 102*a* is not desirable, the voltage can be regulated through a voltage regulator. The voltage regulator is then considered as data interface circuit 436*a*. At communication router 101, voltage of the power supplied by CAT-5 cable is first regulated to the operation voltage of SIM card. Therefore, a voltage divider or a voltage regulator, such as regulator U4, is placed in between pin 3 of jack J3 and pin 1 of SIM socket 402. In one variant, in order to adjust the voltage supplied to be carried in the CAT-5 cable, a voltage divider or a voltage regulator is placed between the power supply and pin 3.

In FIG. 10, SIMclk of SIM card interface 404 is connected to a buffer U2B. Buffer U2B is preferred to have an open drain output, such as NL27WZ07 manufactured by ON Semiconductor. As SIMclk is generated by or transmitted via SIM card interface 404, SIMclk is unidirectional. SIMclk of SIM socket 402 is the receiver of the clock signal. Buffer U2B may be considered as a voltage comparator. Resistor R7 and capacitor C7 are used together to reduce noise in the connection between buffer U2B input and SIMclk of SIM card interface 404. When input voltage of buffer U2B is less than half of its VCC power, the output voltage is about zero volt. When input voltage of buffer U2B is more than half of the VCC voltage, its output is a high impedance output. At the termination of the clock signal at the input of buffer U3B at SIM socket 402, the voltage at the input of buffer U3B is pulled up to about VCC_RX via resistors R15 and R16. The pull up is mainly to compensate for interference due to capacitance and inductance in the CAT-5 cable, especially SIMclk signal can be as high as 4 MHz. The use of R17 is to connect the input of buffer U3B to the ground in order to reduce noise and to reduce current flow from VCC_RX to the ground via R15, R16 and R17. There is no limitation that there must be two resistors R15 and R16. The two resistors may be combined to one. The use of two resistors may be to reduce the time to find the correct resistance value by allowing a skilled person to calibrate for a desirable resistance value easier than using one resistor. C14 and C15 are used to reduce noise in the clock signal. When the input of buffer U3B is pulled up to VCC_RX, output of U3B becomes high impedance and is pulled up to VCC_SIM via resistor R13.

SIMrst of SIM card interface 404 is connected to a buffer U2A. Buffer U2A is preferred to have an open drain output, such as NL27WZ07 manufactured by ON Semiconductor. As SIMrst is generated by or transmitted via SIM card interface, SIMrst is unidirectional. SIMrst of SIM socket 402 is the receiver of the reset signal. When input voltage of buffer U2A is less than half of its VCC power, the output voltage is zero volt. When input voltage is more than half of the VCC voltage, the output is a high impedance output. As the output is connected to a 5V power supply via resistor R1 and capacitor C3, the voltage is pulled up to about 5V. Unlike SIMclk, for SIMrst the voltage pull-up operation may be performed at the transmission end or termination end of SIMrst because of relative low frequency of changing SIMrst signal. Therefore, there is no limitation that resistor R1 and capacitor C3 has to be connected to the output of buffer U2A. For example, in one variant, resistor R1 and capacitor C3 may be connected to VCC_RX and input of buffer U3A.

At the receiving end at SIMrst of SIM socket 402, SIMrst connects to input of U3A. R8 is used to ground SIMrst if SIMrst is set to zero. When the input is a zero, the output of U3A is grounded. When the input is one, the output of 3A is pulled to VCC_SIM via resistor R12.

SIMdata of SIM card interface 404 is connected to FET Q1. FET Q1 may be considered as a bi-directional voltage shifter as SIMdata is bi-directional, such that data may be transmitted and received via SIMdata. BSS138 N-Channel enhancement mode field effect transistor manufactured by Fairchild may be used for FET Q1. However there is no limitation that BSS138 must be used. Four of the reasons why FET Q1 can be used a bi-directional voltage shifter for SIMdata are as follows:

(a) When SIM card interface 404 transmits a signal in SIMdata and if the signal is a zero, SIMdata is set to grounded to zero volt. Therefore gate-source of FET Q1 becomes forward biased, the channel between drain and source becomes open and then VD approaches VS. As resistor R6 has a relatively large resistance, the amount of current that flows through resistor R6 should be small and consume not much power. The voltage value at Pin 4 of jack J1 should then approach zero volt.

(b) When SIM card interface 404 transmits a signal in SIMdata and if the signal is a one, pin 3 of SIM card interface is set to high and has about 1.8 volt. Therefore gate-source of FET Q1 is not forward biased, the channel between drain and source is closed. Drain then has high impedance. The voltage value at Pin 4 of jack J1 is then pulled to about 5 volt, which is supplied via resistor R1.

(c) When SIM card interface 404 receives a signal in SIMdata and if the signal is a zero, voltage at pin 4 of jack J1 should be at about zero volt or slightly above zero volt because of the voltage drop across resistor R6. If VS of FET Q1 is at about 1.8V, the protection diode built inside FET Q1 becomes forward-biased and current flows from source to drain. Then VS of FET Q1 will fall to about VD of FET Q1, which is about zero volt or slightly above zero volt, and maintained at that voltage level. Therefore, SIM card interface 404 can receive the zero via SIMdata. If VS is already at about zero volt, VS will maintain at about zero volt.

(d) When SIM card interface 404 receives a signal in SIMdata and if the signal is a one, voltage at pin 4 of jack J1 should be at about 5 volt or slightly below 5 volt due to voltage drop via the CAT-5 cable. As VG of FET Q1 is lower than VD, FET Q1 is not conducting and source becomes floating. Then VS of FET Q1 is pulled up to the voltage of SIMRst as SIMRst is connected to VS via the resistor-capacitor circuit comprising of resistor R2, resistor R4 and capacitor C4. Those skilled in the art would appreciate that there is small voltage drop across R2 and R4.

As SIMrst is set to one when SIM card at SIM socket 402 is set to normal operation and set to zero when SIM card is set to reset mode, data communication between SIM card interface 404 and SIM card should only be performed when SIMrst is set to one. Therefore, another benefit of having SIMrst and SIMdata of SIM card interface 404 connected via resistor R2, resistor R4 and capacitor C4 is to reduce transient response when an one is coming from SIM socket 402 in SIMdata.

In FIG. 11, SIMdata of SIM socket 402 is connected to the input of regulator U4 via resistor R10 and the drain of FET Q2. Four of the reasons why FET Q2 can be used a bi-directional voltage shifter for SIMdata are as follows:

(a) When SIM card inserted at SIM socket 402 transmits a signal zero in SIMdata and if the signal is a zero, SIMdata is set to grounded to zero volt. Therefore gate-source of FET Q2 becomes forward biased, the channel between drain and source becomes open and then VD approaches VS. As resistor R10 has a relative large resistance, the amount of current flows through resistor R10 should be small and consume not much power. The voltage value at Pin 4 of jack J3 should then approach zero volt.

(b) When SIM card transmits a one signal in SIMdata, pin 7 of SIM socket 402 is set to set to high by the SIM card and has about 1.8 volt. Therefore gate-source of FET Q1 is not forward biased, the channel between drain and source is closed. Drain then has high impedance. The voltage value at Pin 4 of jack J3 is pulled to about VCC_RX via resistor R10.

(c) When SIM card at SIM socket 402 receives a signal zero in SIMdata, voltage at jack J3 pin 4 should be at about zero volt or slightly above zero volt because of the voltage drop across R10. If VS of FET Q2 is at about 1.8V, the protection diode built inside FET Q2 becomes forward-biased and current flows from source to drain. Then VS will fall to about VD of FET Q2, which is about zero volt or slightly above zero volt, and maintained at that voltage level. Therefore, SIM card at SIM socket 402 can receive the zero via SIMdata. If VS is already at about zero volt, VS will maintain at about zero volt.

(d) When SIM card at SIM socket 402 receives a signal one in SIMdata, voltage at pin 4 of jack J3 should be at about 5 volt or slightly below 5 volt due to voltage drop via the CAT-5 cable. As VG is lower than VD, FET Q2 is not conducting and source becomes floating. Then VS is pulled up to about the voltage of VCC_SIM via resistor R11. Those who skilled in the art would appreciate that there is small voltage drop across R11.

In one variant, electricity supply are combined with Ethernet data using PoE technique. Such that only three pins of jacks J1 and J3 are used for SIM data communication. Four of the remaining pins are used by Ethernet data communications and power.

According to one of the embodiments of the present invention, one CAT-5 cable is used for SIM card data communications as well as Ethernet data communications between cellular router 102a and communication apparatus 101. In this embodiment, RDP 110a and RSP 111a are combined together to form an integrated remote port at cellular router 102a and LDP 106a and LSP 107a are combined together to form an integrated local port at communication apparatus 101. Therefore, cellular router 102a and communication apparatus 101 are connected through one CAT-5 cable, instead of two CAT-5 cables. Three of the eight wires in the CAT-5 cable is used for SIMclk, SIMrst and SIMdata. Another four wires are for Power over Ethernet (PoE) use. Those who are skilled in the art would appreciate that 10/100 base Ethernet only uses four wires. The four wires can also be used to carry power when under PoE use. The use of PoE allows cellular router 102a to be powered by communication apparatus 101 while communicating with communication apparatus 101 using Ethernet protocol. Therefore, seven of eight wires in a CAT-5 cable are used for SIMclk, SIMrst and SIMdata and PoE. The remaining one wire can be used for other purposes or can be grounded for reducing interference. One of the benefits for using PoE is to simplify the task of powering cellular router 102a.

FIG. 12 is a more detailed illustration of using one CAT-5 cable, namely cable 1203 to carry electricity from communication apparatus 101 to cellular router 102a. Module 1201 is part of communication apparatus 101 and module 1202 is apart of cellular router 102a. Other parts of communication apparatus 101 and cellular router 102a are not shown in FIG. 12. Cable 1203 is also used for Ethernet data and SIM card data communication between module 1201 and module 1202. Module 1201 has power supply 1208 providing power to module 1201. Power supply 1208 may receive power from mains electricity, a battery, a converter or other power supplies. Power supply 1208 provides power to power injector 1205 through connection 1214 and to voltage regulator 1209. Power injector 1205 is used to inject power to an Ethernet cable through jack 1204. One of the power injection technique is the Power of Ethernet (PoE) standard. Ethernet data is received from or sent to data module 1206. Data module 1206 is a circuitry module that is able to send and receive Ethernet data. Data module 1206 can be an Ethernet chip set. Power injector 1205 is connected to jack 1204 through four wires, 1211a-1211d. Voltage regulator 1213 changes the voltage of the power supplied by power supply 1208 to SIM socket 1207 for SIM card use as voltage required by the SIM card could be different from the voltage of power supply 1208. SIM socket 1207 has three connections 1212a-1212c with jack 1204 for SIM card clock signal, data signal and reset signal. SIM socket 1207 is also connected to a ground. Therefore, SIM socket 1207 has power, ground, SIMclk, SIMdata and SIMrst for SIM card use.

Module 1201 has jack 1216 for coupling to cable 1203. Three wires that carry SIM card clock signal, data signal and reset signal from jack 1216 are connected to SIM card interface 1218. Another four wires that carry Ethernet data and electricity are connected to power receiver 1217. Power receiver 1217 is used to provide power to cellular router 102a. Power receiver 1217 is used to combine and extract from the four wires for data module 1219. Similar to data module 1206, data module 1219 is a circuitry module that is able to send and receive Ethernet data. Two wires, 1224a and 1224b from power receiver 1217 are used to provide power and ground to SIM card interface 1218. If the voltage of the power from power receiver 1217 is different from the voltage required by SIM card interface 1218, a voltage regulator or converter can be used to change the voltage level.

There is no limitation to the number of cellular routers 102 that can be powered by communication apparatus 101. For example, if communication apparatus 101 has ten SIM sockets for ten SIM cards, has ten integrated local ports and has adequate power supply, it can connect to up to 10 cellular routers through ten CAT-5 cables. SIM card data communications, data communications and electrical power can be carried over in a CAT-5 cable that is coupled between one of the integrated local ports at communication apparatus 101 and the remote local port at a cellular router 102. Therefore the 10 cellular routers do not need to be inserted with SIM card and do not need to receive power from electrical sockets. This reduces the complexity of deploying the cellular routers.

BRIEF DESCRIPTION OF DRAWINGS

FIG. 3BC is a block diagram illustrating connections between two remote SIM ports, two data interface circuits, one SIM card interface and one RF transceiver.

FIG. 3CC is a block diagram illustrating connections between one remote SIM port, one data interface circuit, one SIM card interface and one RF transceiver in which the SIM card interface is not connected to a bus.

FIG. 3CD is a block diagram illustrating connections between one remote SIM port, one data interface circuit, one SIM card interface and one RF transceiver in which the SIM card interface is connected to a bus.

FIG. 4AB is a diagram illustrating connections between one SIM socket and one SIM card interface with ten data interface circuits using five wires.

FIG. 4AC is a diagram illustrating connections between one SIM socket and one SIM card interface with two data interface circuits using five wires.

FIG. 4AD is a diagram illustrating connections between one SIM socket and one SIM card interface with ten data interface circuits using ten wires.

FIG. 4AE is a diagram illustrating connections between one SIM socket and one SIM card interface with six data interface circuits using eight wires.

FIG. 4BB is a diagram illustrating connections between two SIM sockets and two SIM card interfaces with twenty data interface circuits using ten wires.

FIG. 4BC is a diagram illustrating connections between two SIM sockets and one SIM card interface with four data interface circuits using ten wires.

FIG. 4CB is a diagram illustrating connections between two SIM sockets and one SIM card interface in which the SIM card interface is not connected to a bus.

FIG. 4CCA is diagram illustrating the architecture and operation of a data interface circuit as shown in FIG. 4CB.

FIG. 4CD is a diagram illustrating connections between two SIM sockets and one SIM card interface in which the SIM card interface is connected to a bus.

Figure 1A:
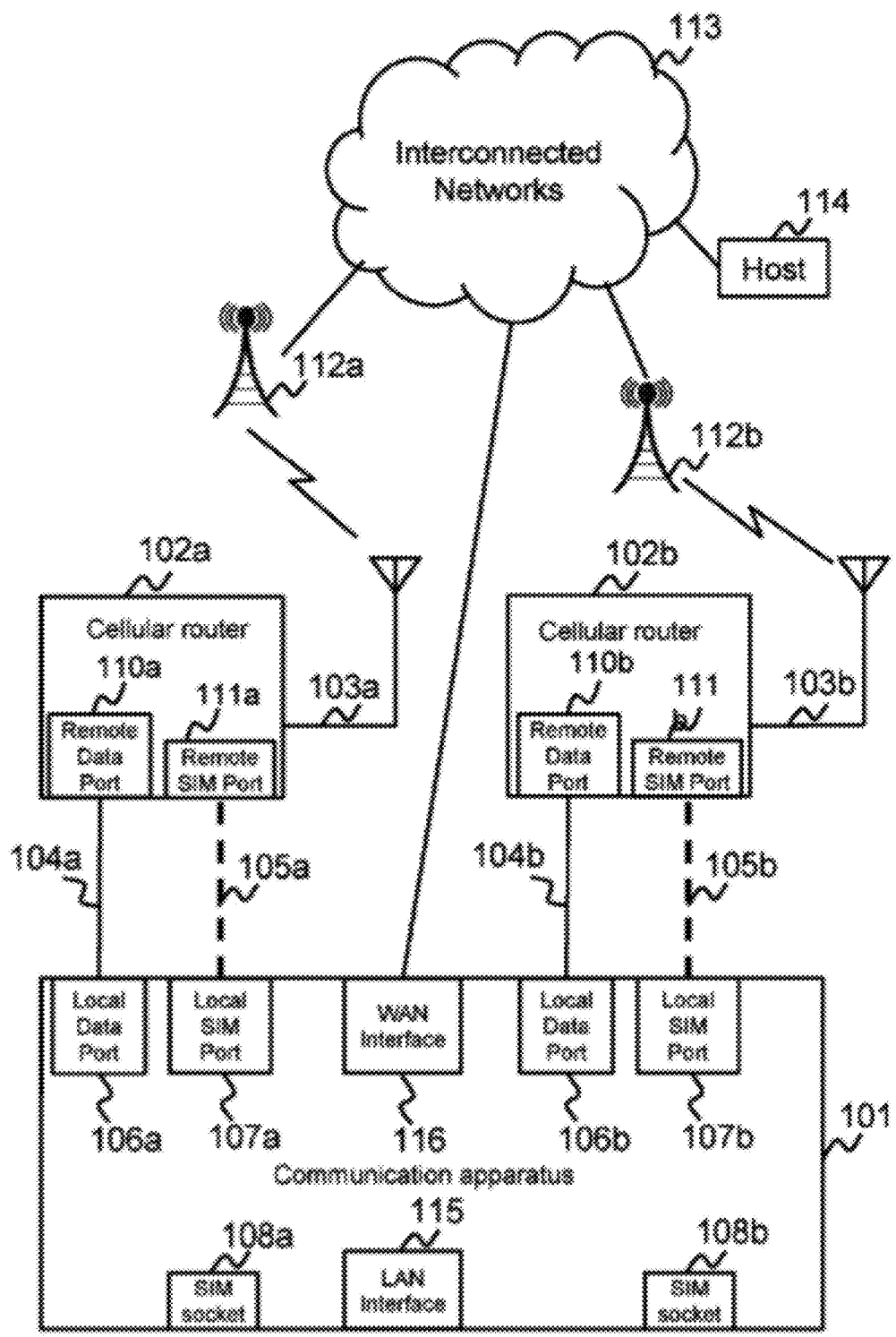
FIG. 1A illustrates a network environment according to various embodiments of the present invention.
Figure 1B:
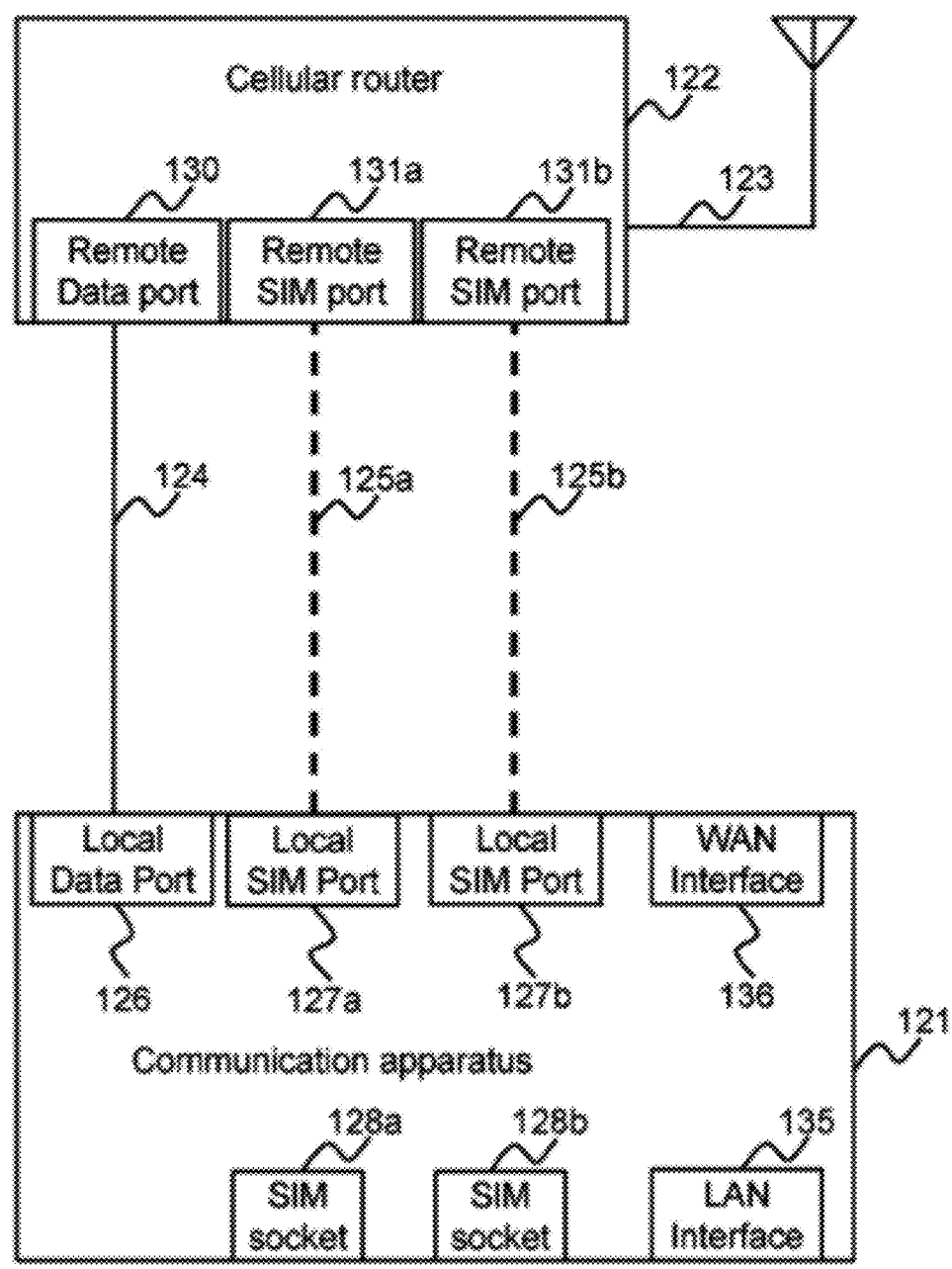
FIG. 1B is a network diagram illustrating connections between one communication apparatus and one cellular router.
Figure 1C:
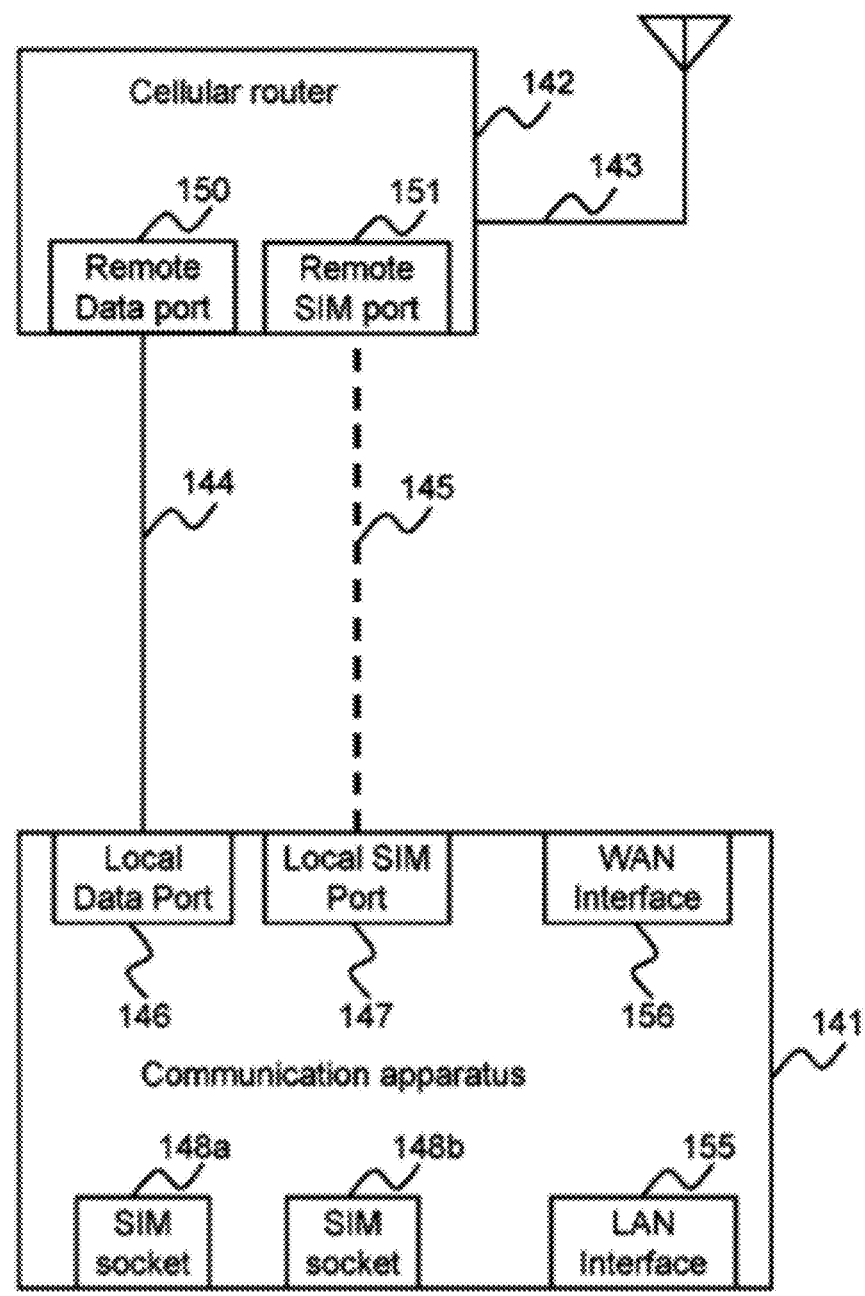
FIG. 1C is a network diagram illustrating connections between one communication apparatus and one cellular router.
Figure 1D:
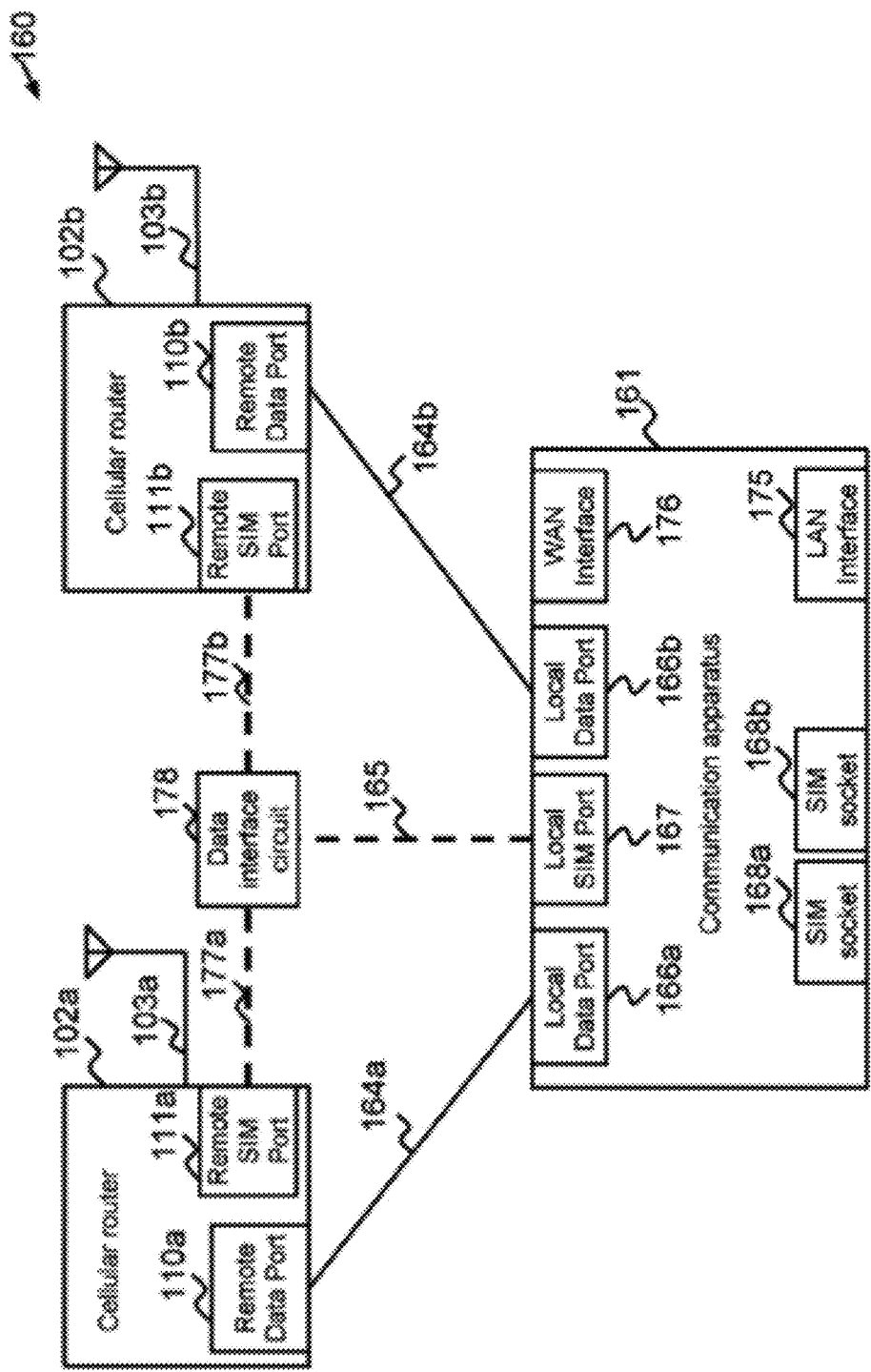
FIG. 1D is a network diagram illustrating network connections between one communication apparatus and two cellular routers.
Figure 1E:
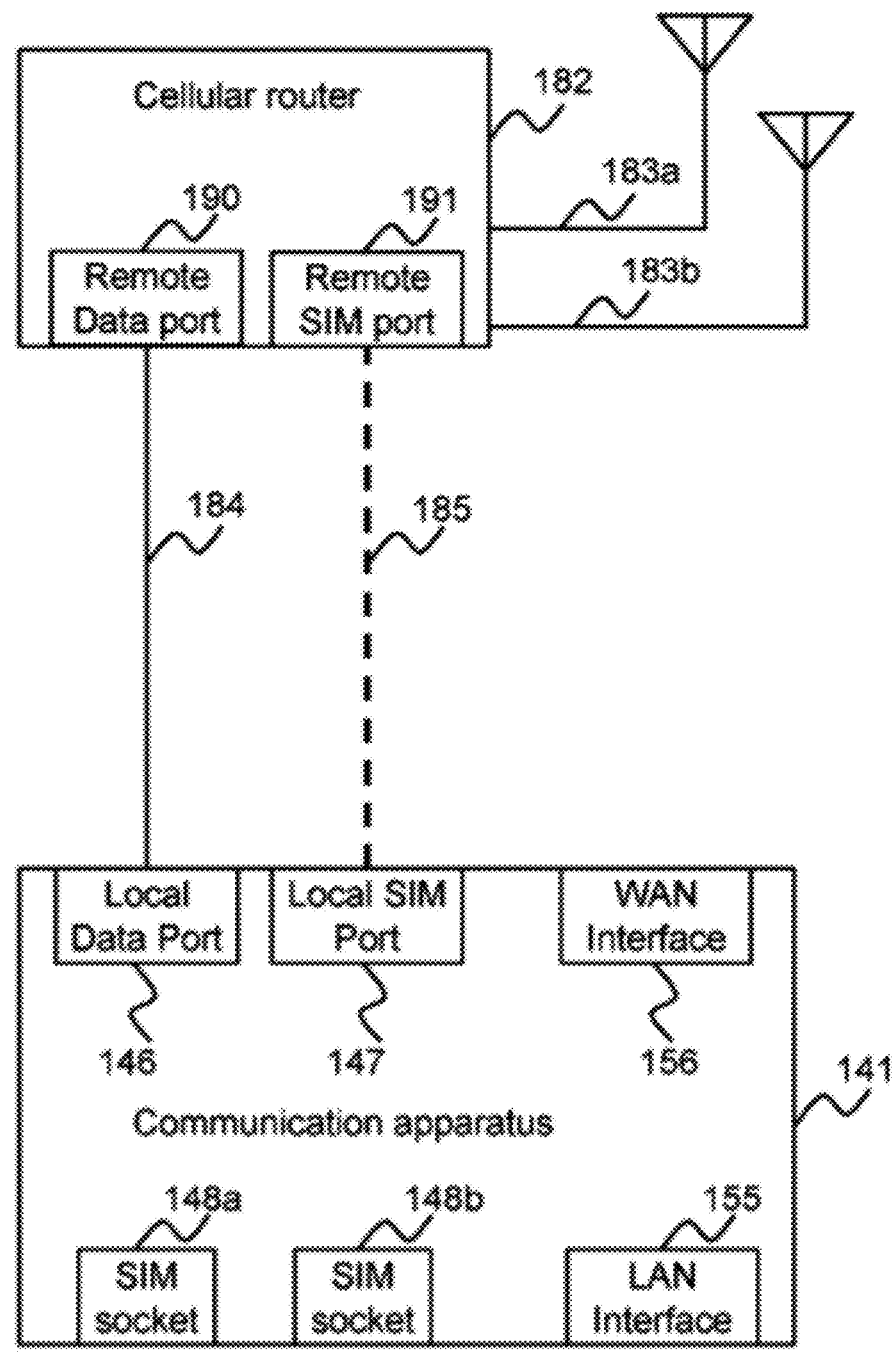
FIG. 1E is a network diagram illustrating network connections between one communication apparatus and one cellular router.
Figure 2A:
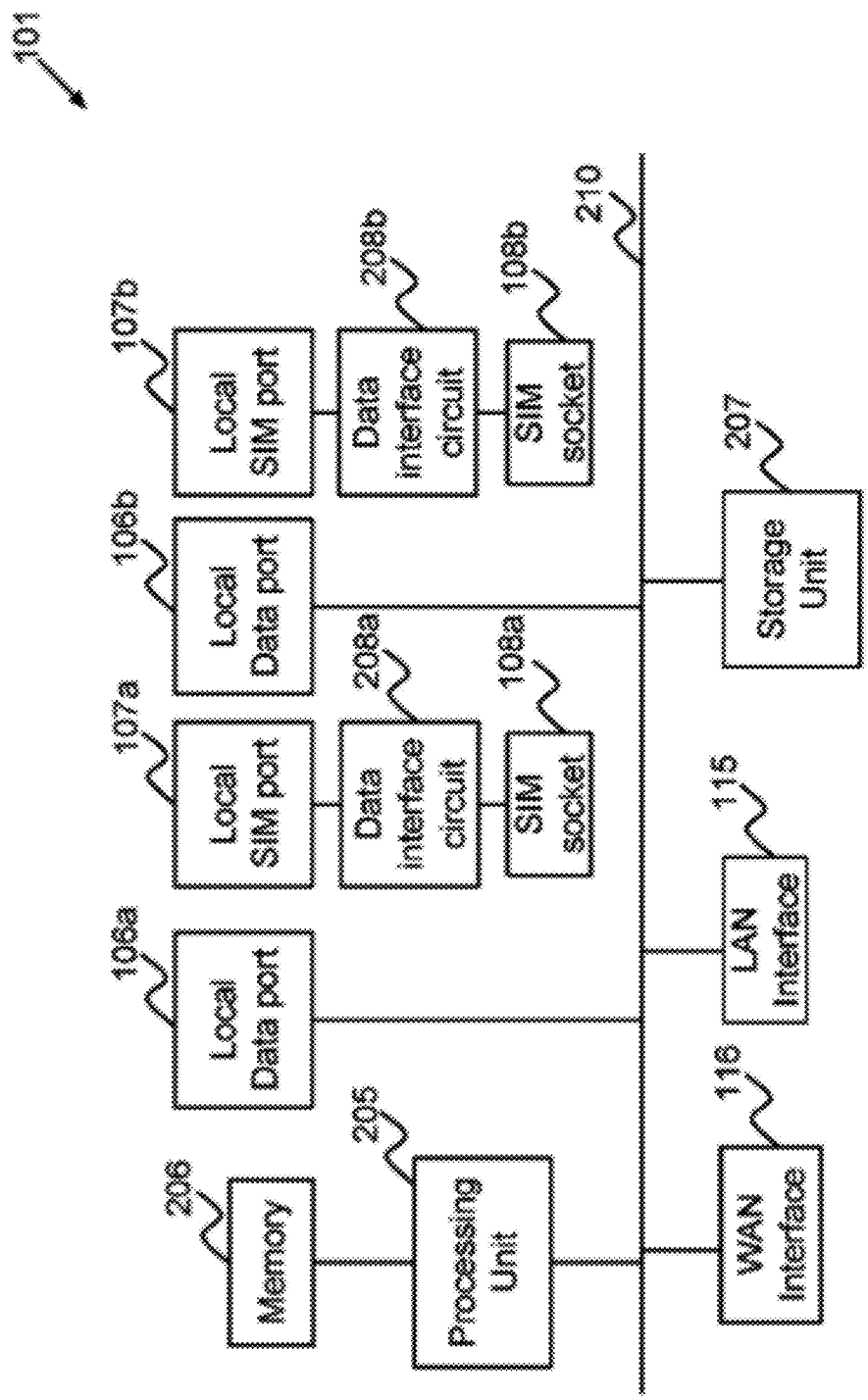
FIGS. 2A-2D are illustrative block diagrams of a communication apparatus according to the embodiments of the present invention.
Figure 2B:
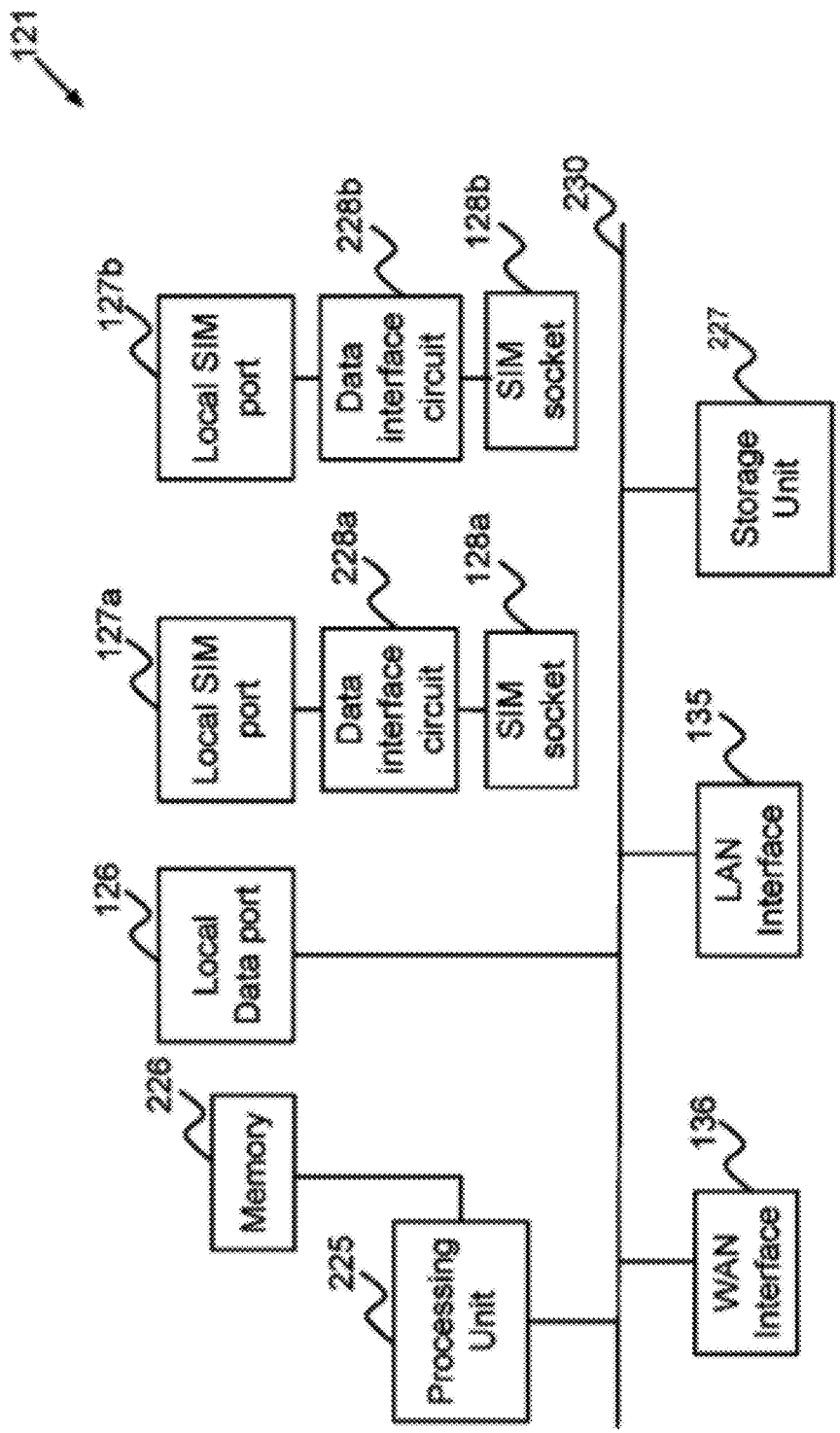
Figure 2C:
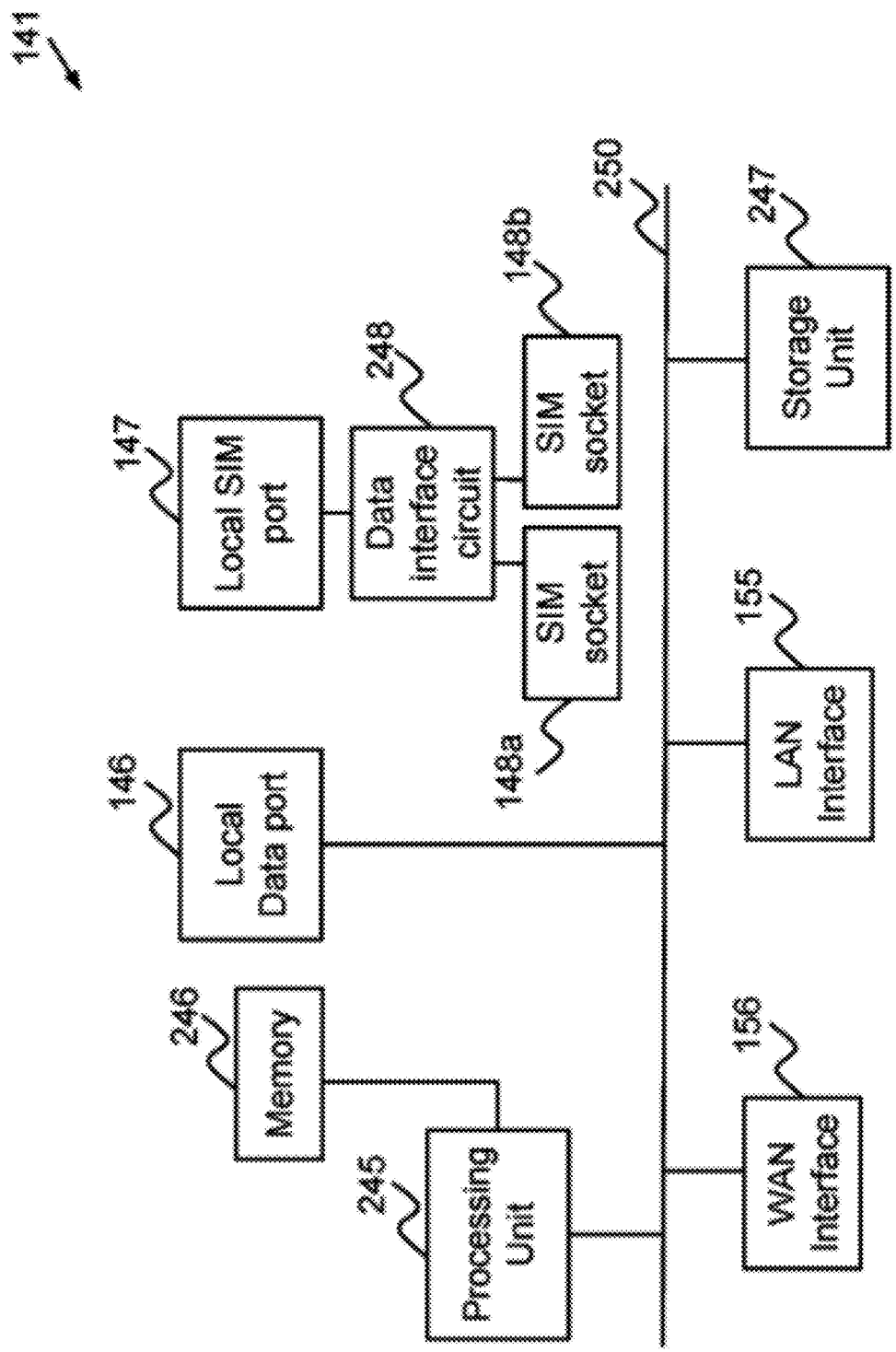
Figure 2D:
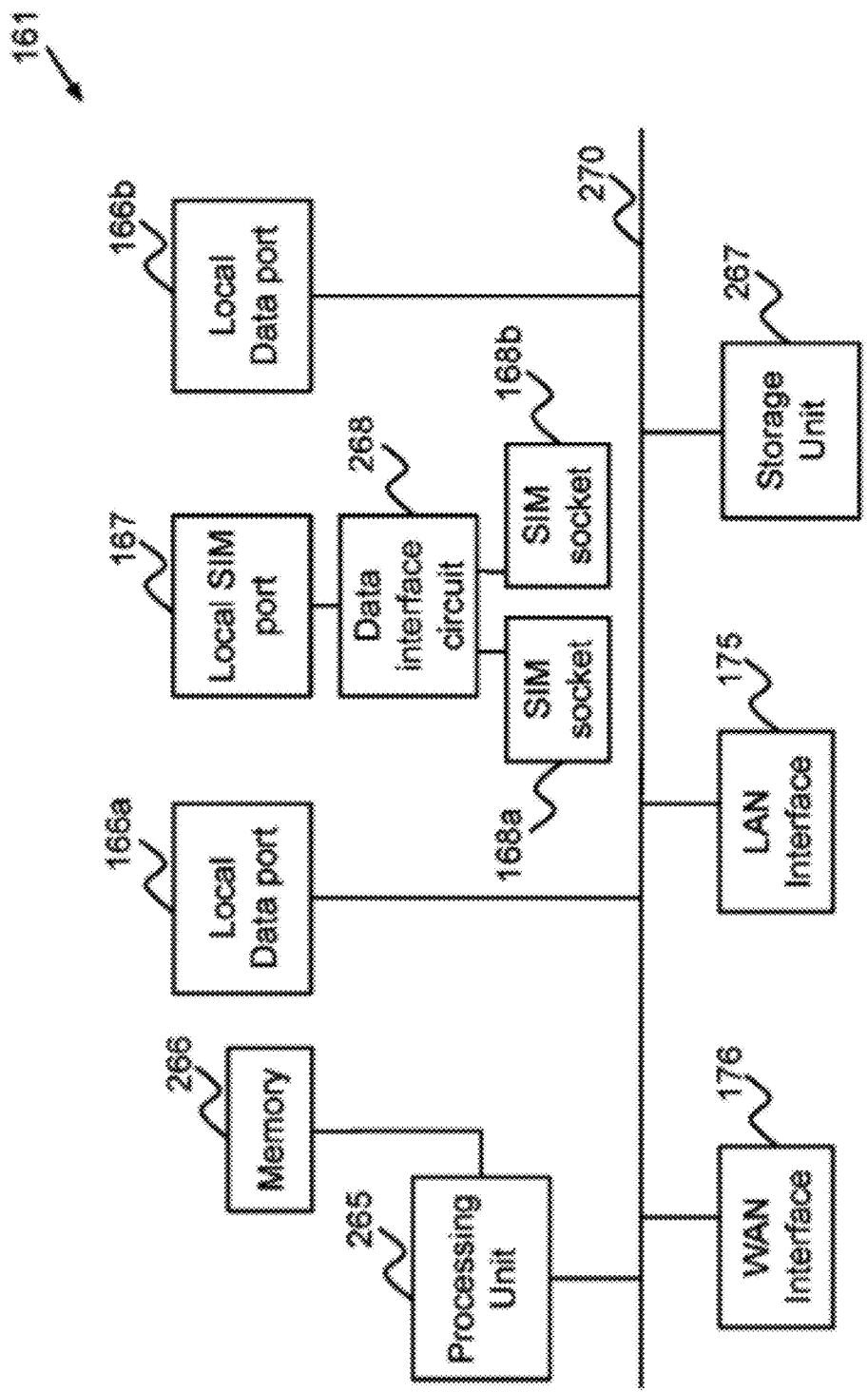
Figure 3A:
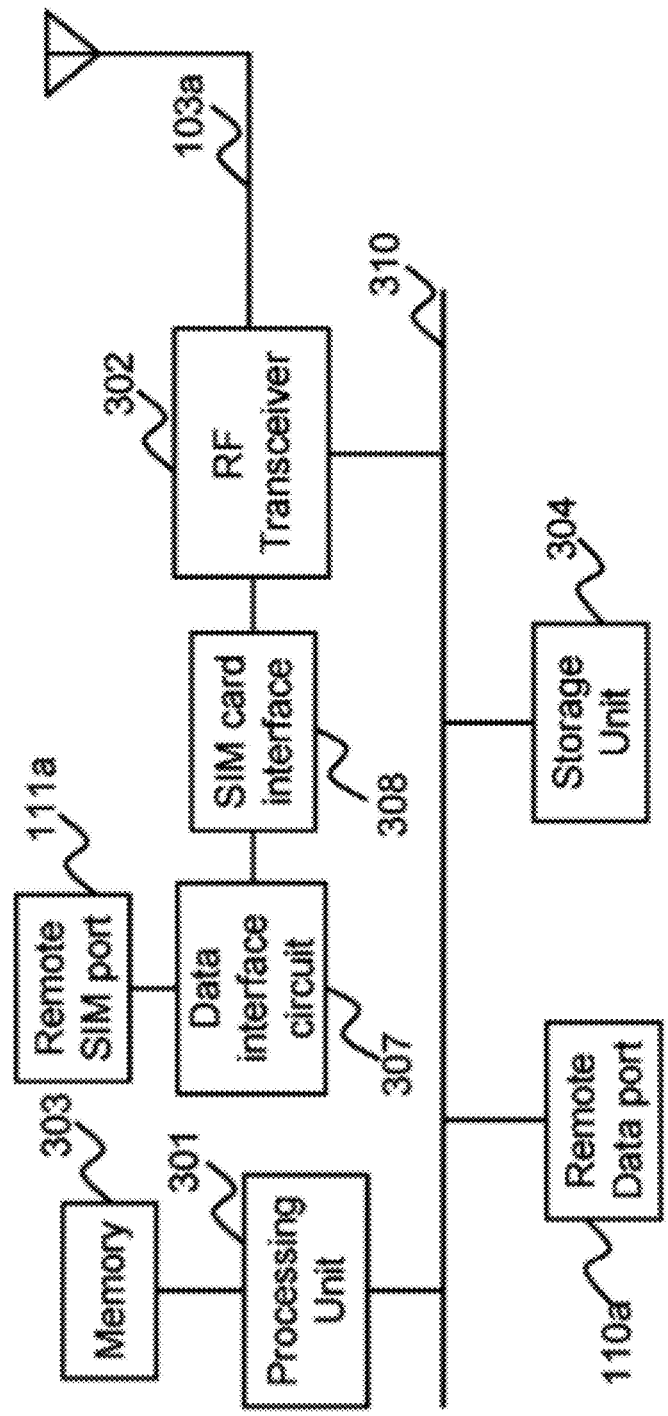
FIG. 3A is an illustrative block diagram of a cellular router with one remote SIM port, one SIM card interface and one antenna according to one of the embodiments of the present invention.
Figure 3B:
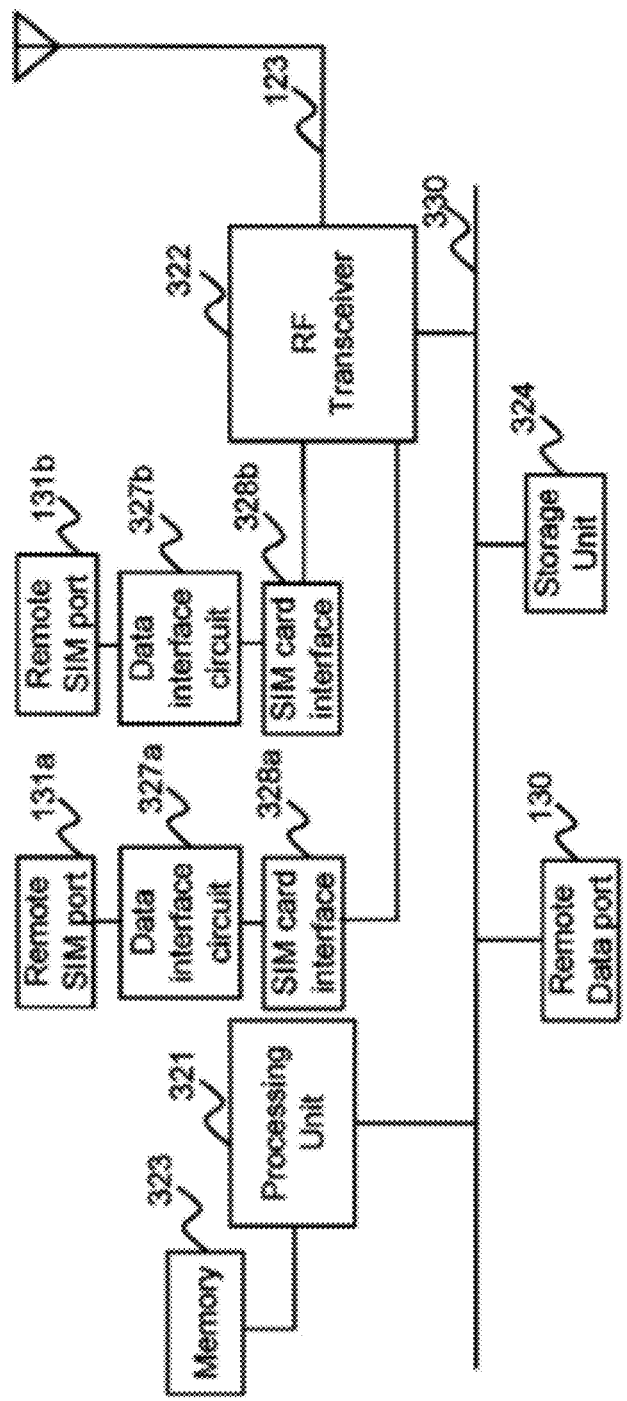
FIG. 3B is an illustrative block diagram of a cellular router with two remote SIM ports, two SIM card interfaces and one antenna according to one of the embodiments of the present invention.
Figure 3B:
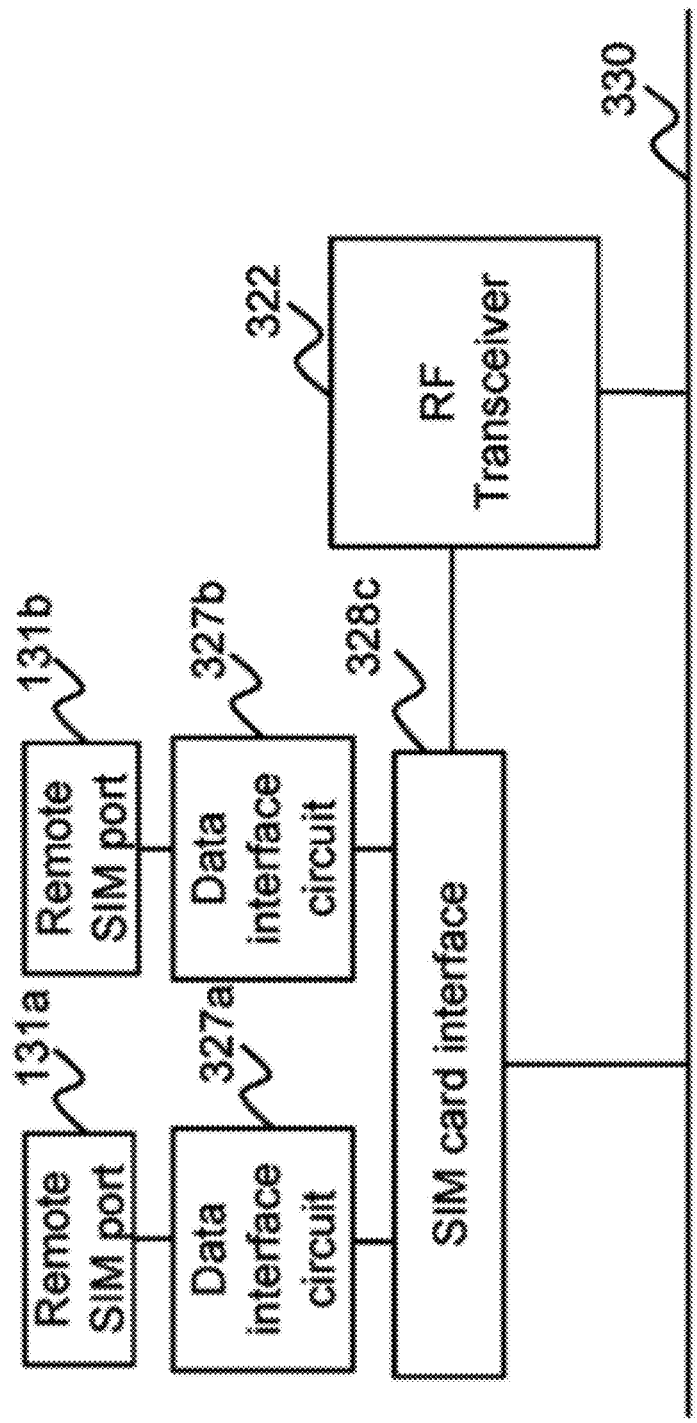
Figure 3C:
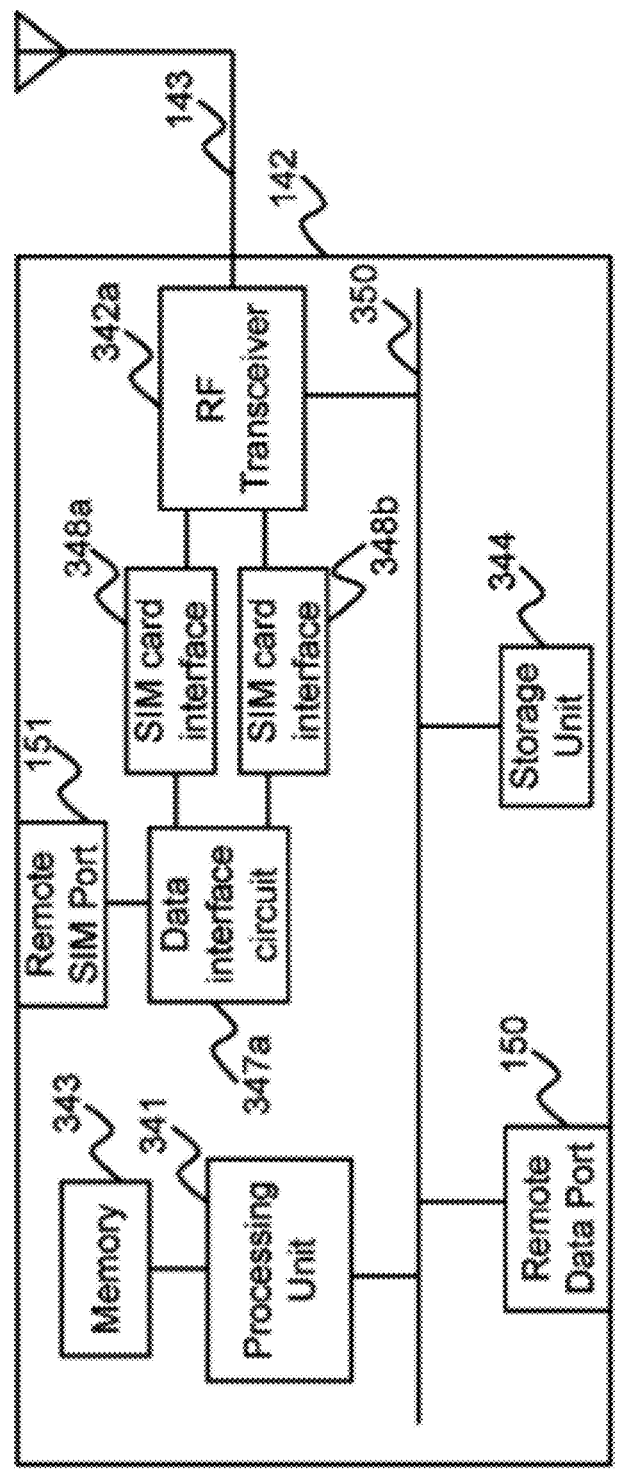
FIG. 3C is an illustrative block diagram of a cellular router with one remote SIM port, two SIM card interfaces and one antenna according to one of the embodiments of the present invention.
Figure 3C:
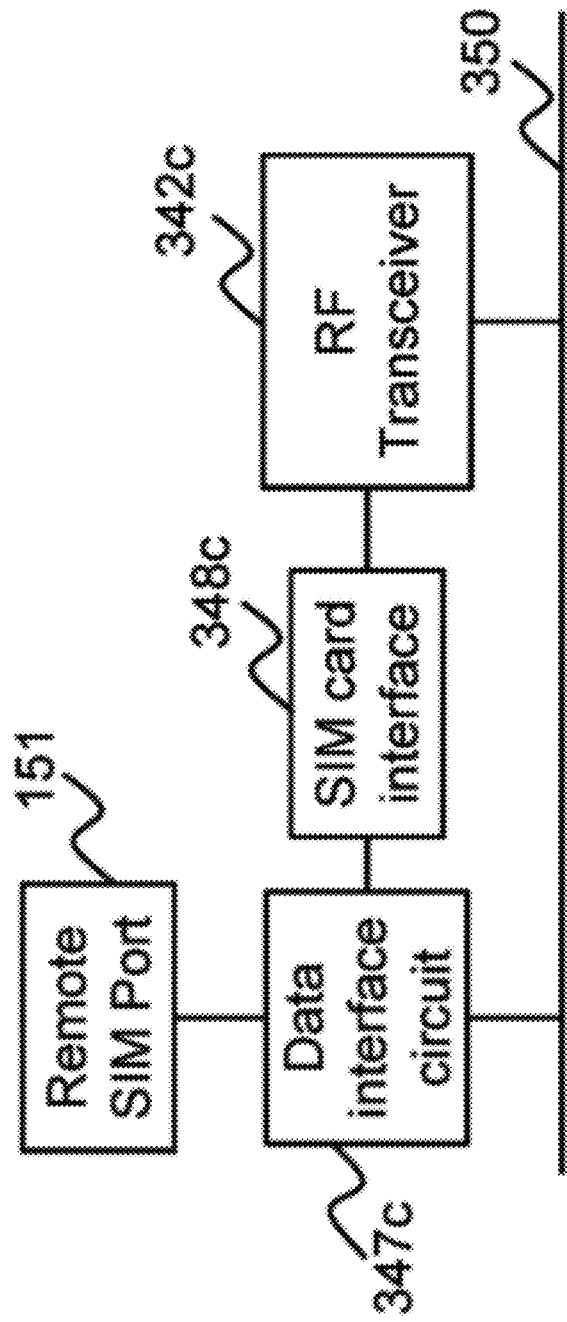
Figure 3C:
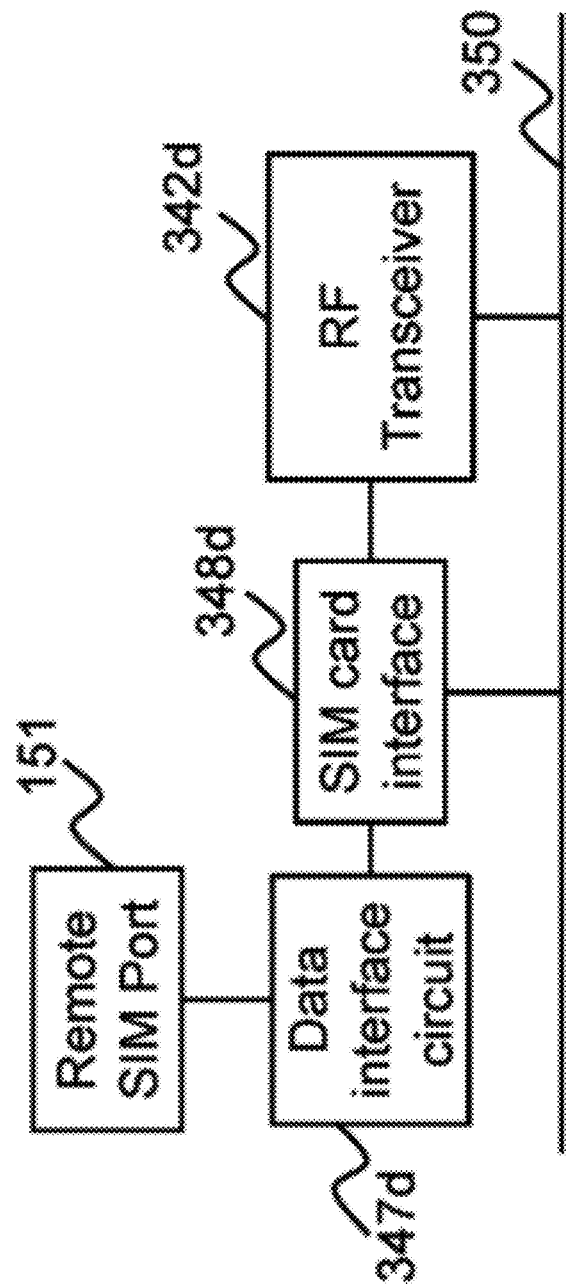
Figure 3E:
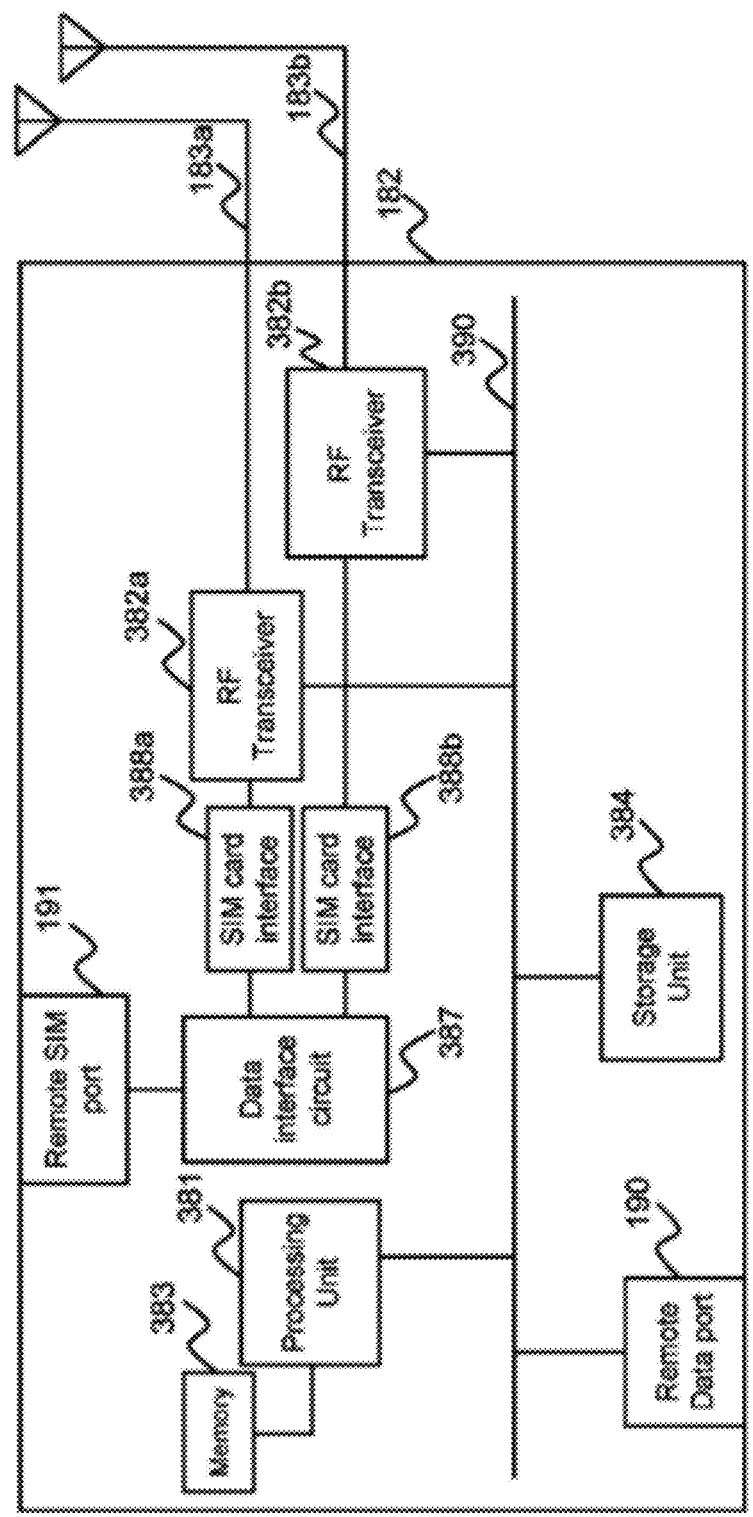
FIG. 3E is an illustrative block diagram of a cellular router with one remote SIM port, two SIM card interfaces and two antennas according to one of the embodiments of the present invention.
Figure 4A:
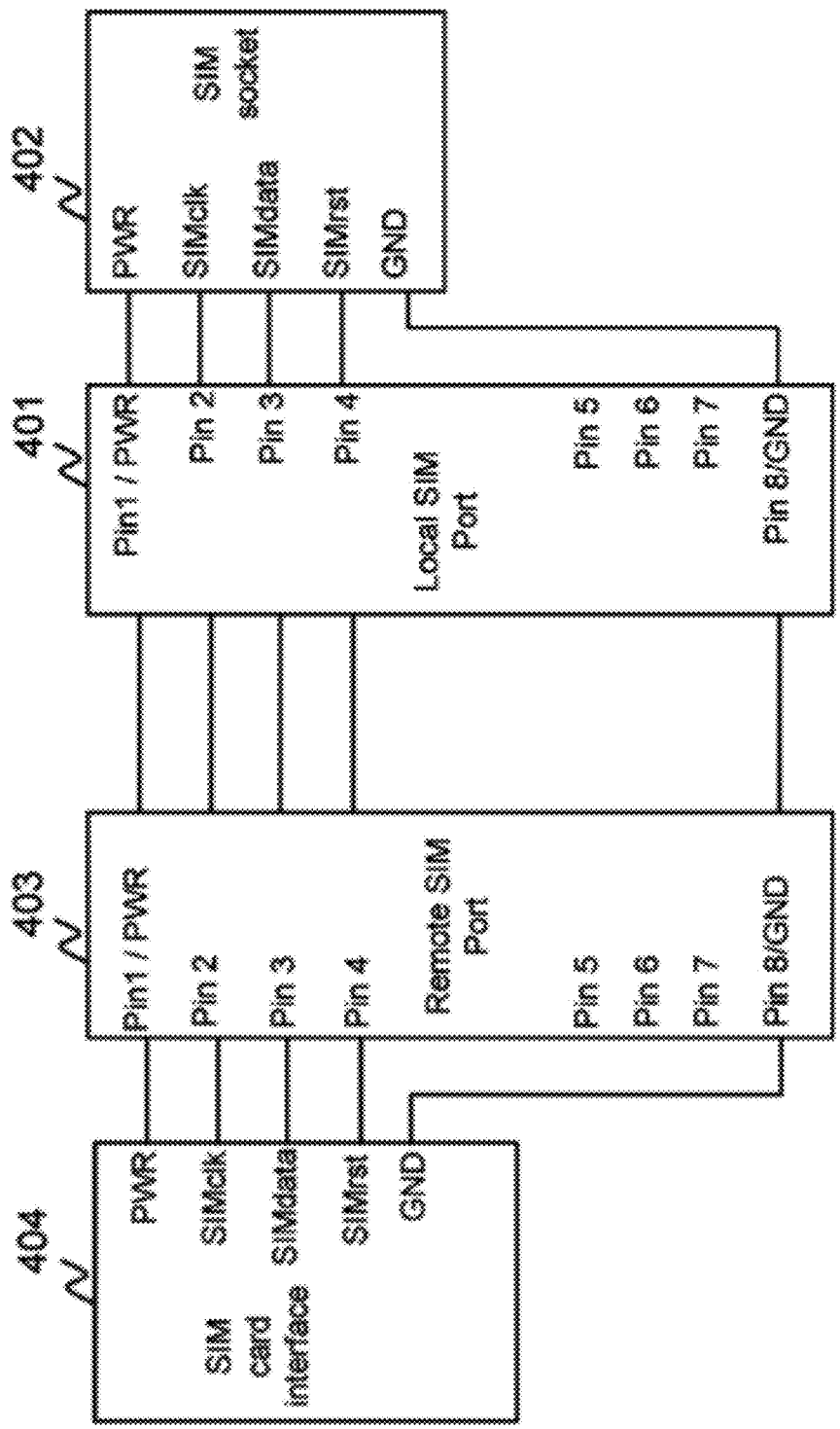
FIG. 4AA is a diagram illustrating connections between one SIM socket and one SIM card interface without data interface circuit using five wires.
Figure 4A:
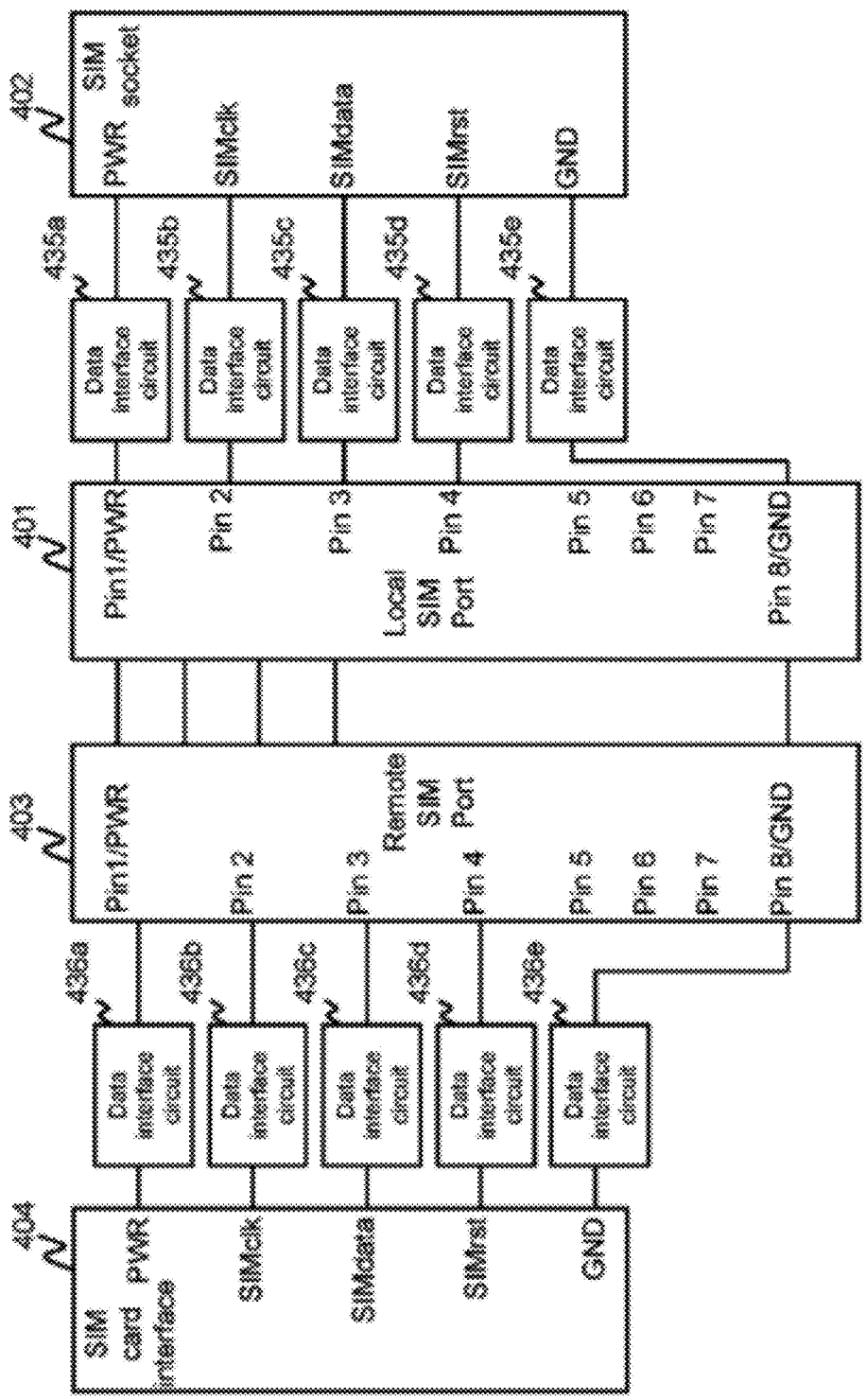
Figure 4A:
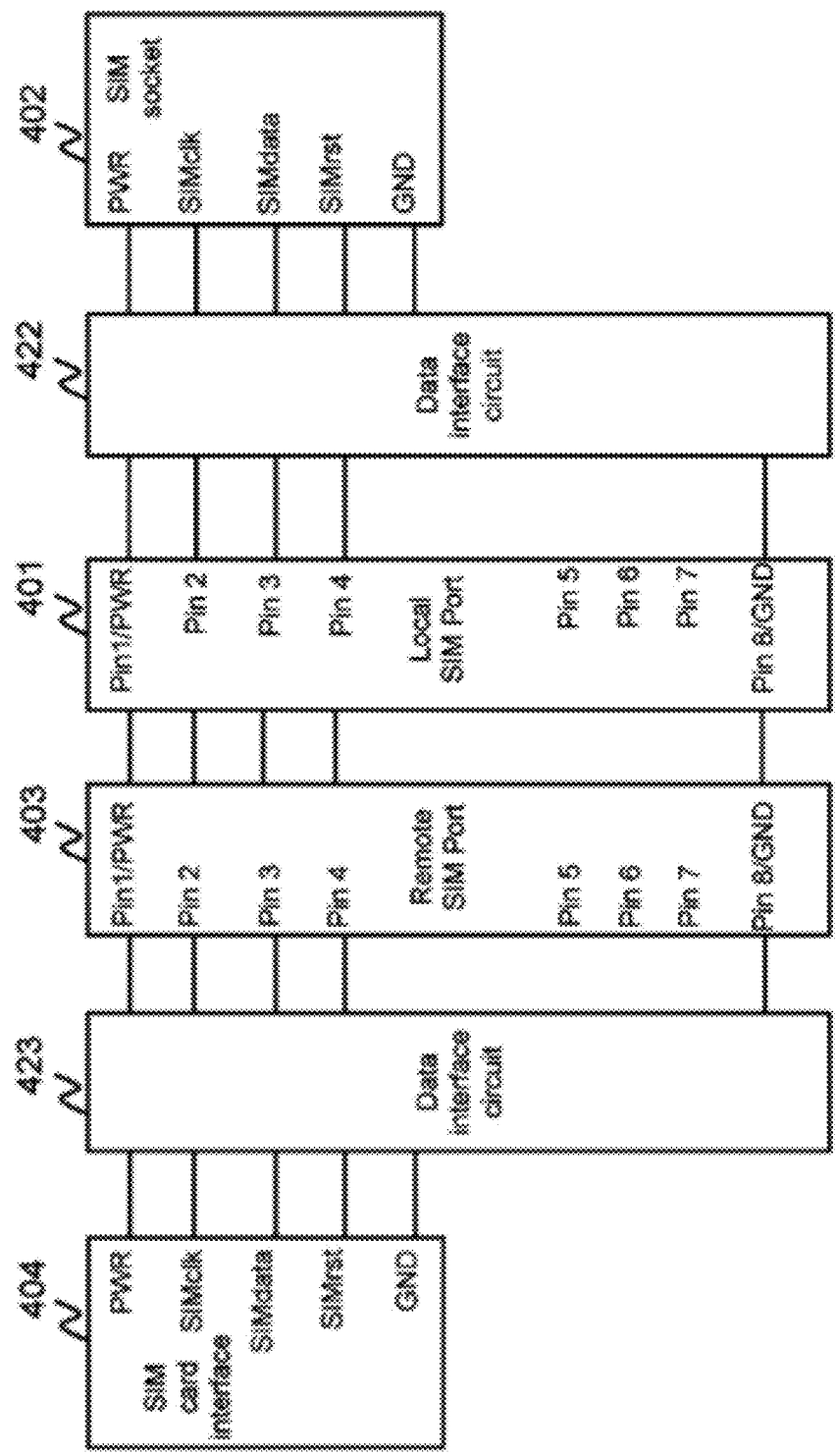
Figure 4A:
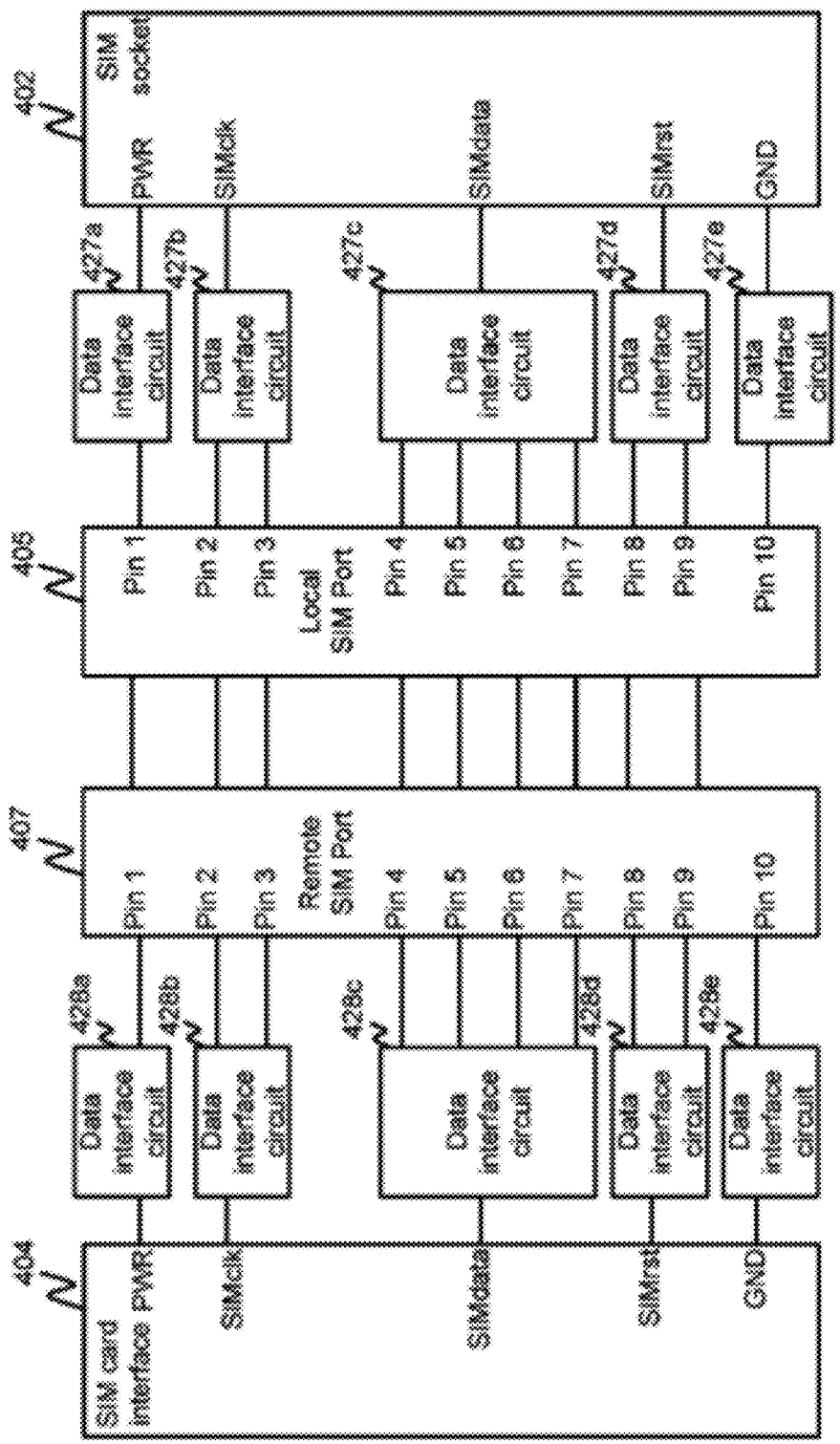
Figure 4A:
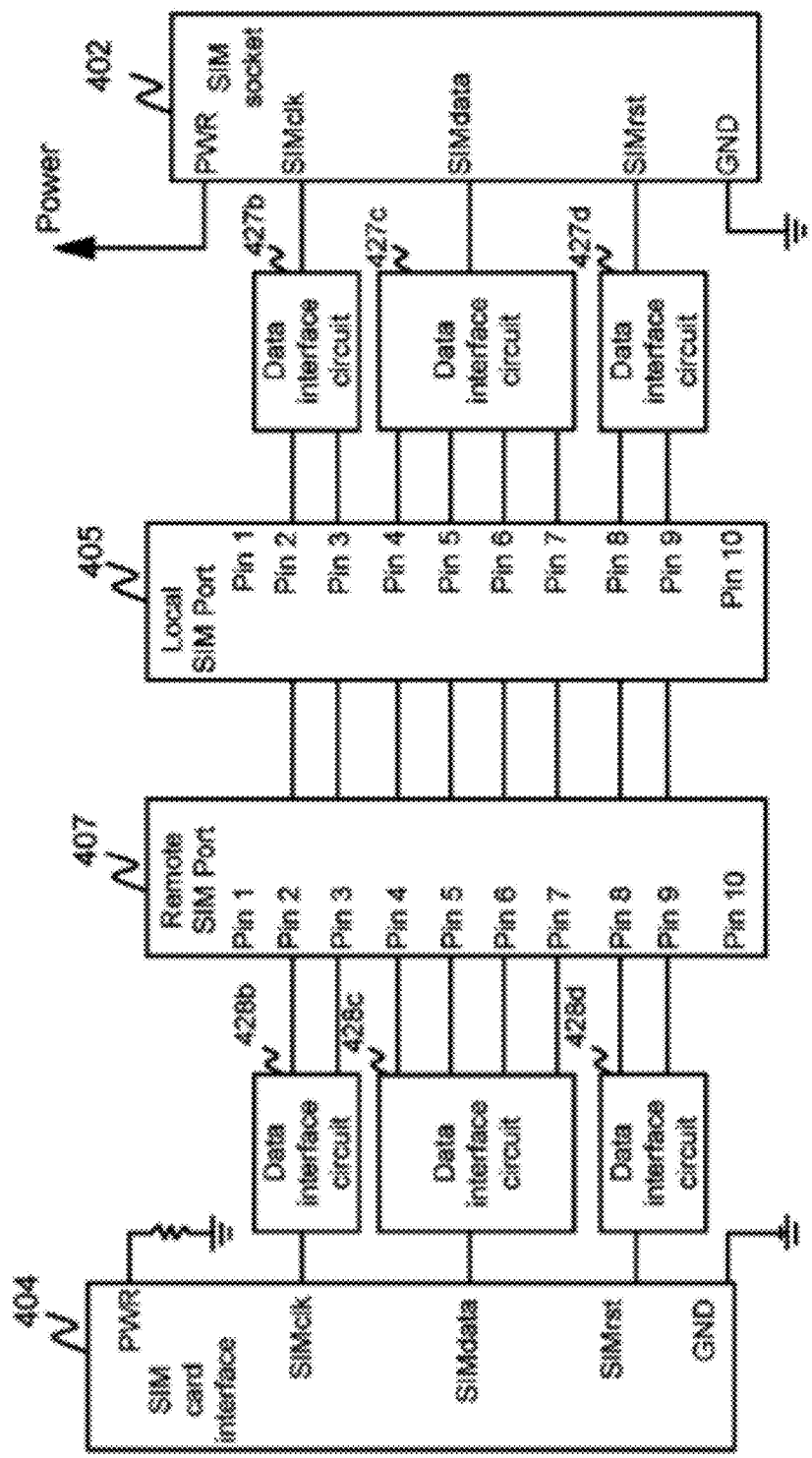
Figure 4B:
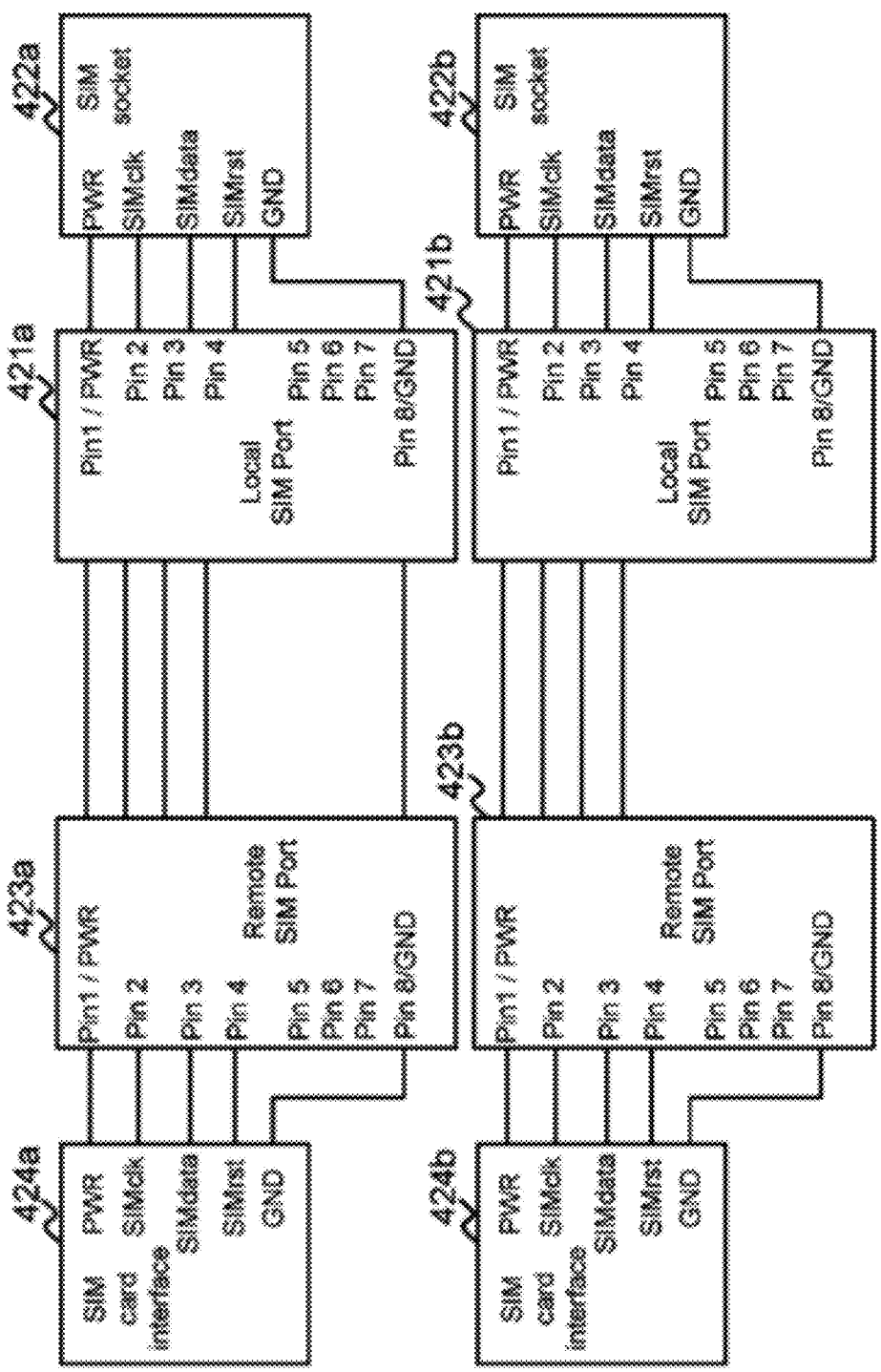
FIG. 4BA is a diagram illustrating connections between two SIM sockets and two SIM card interfaces without data interface circuits using ten wires.
Figure 4B:
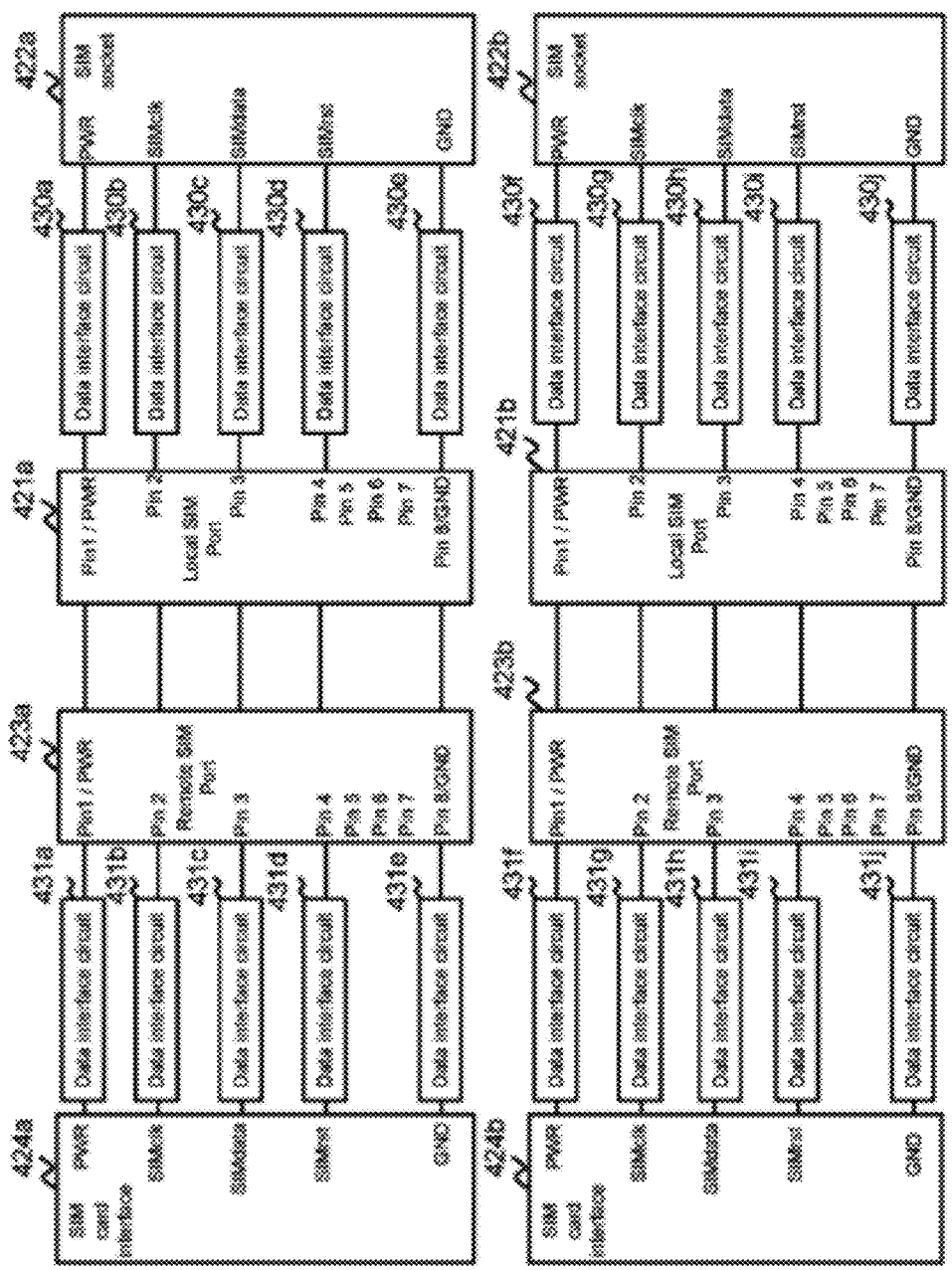
Figure 4B:
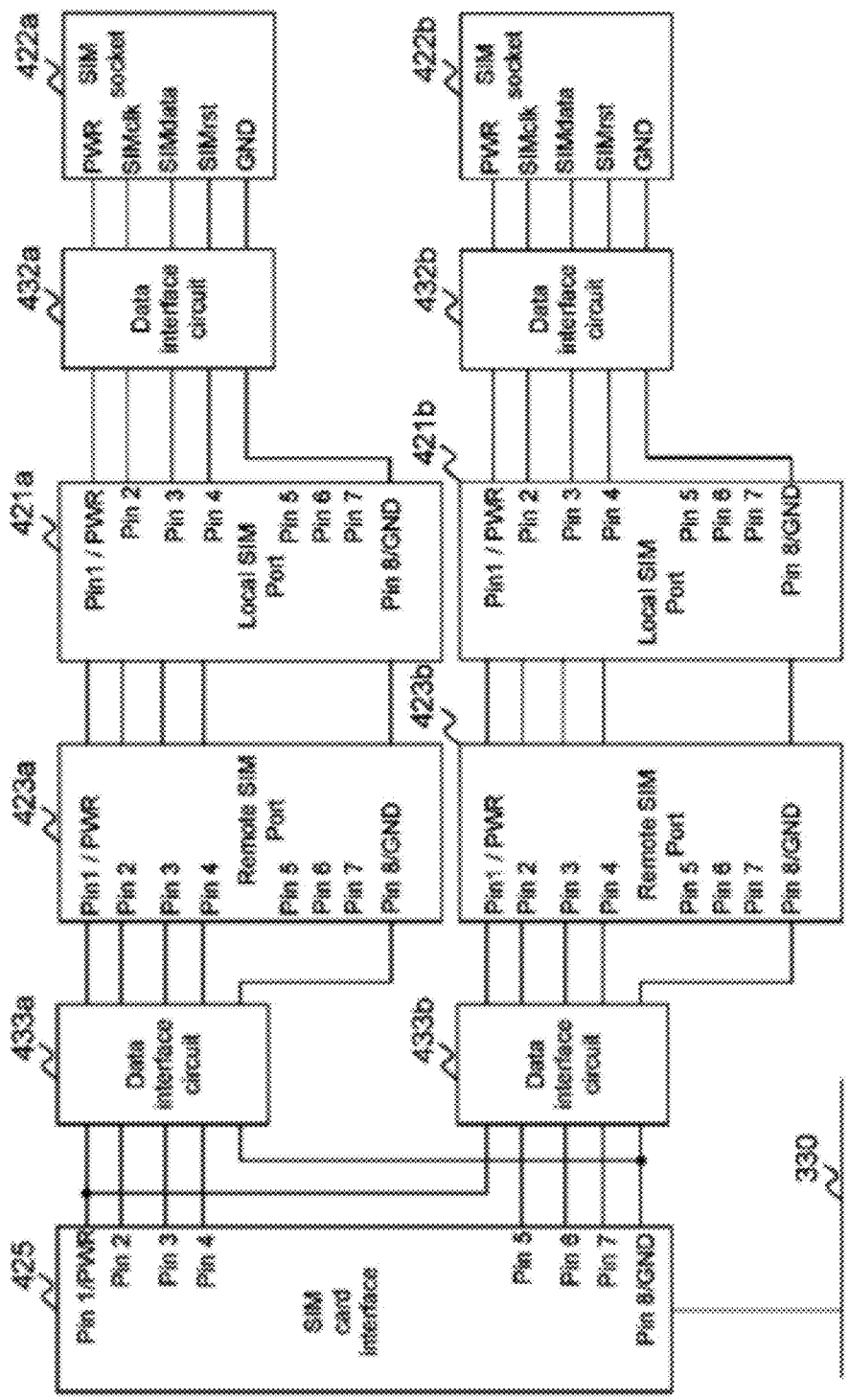
Figure 4C:
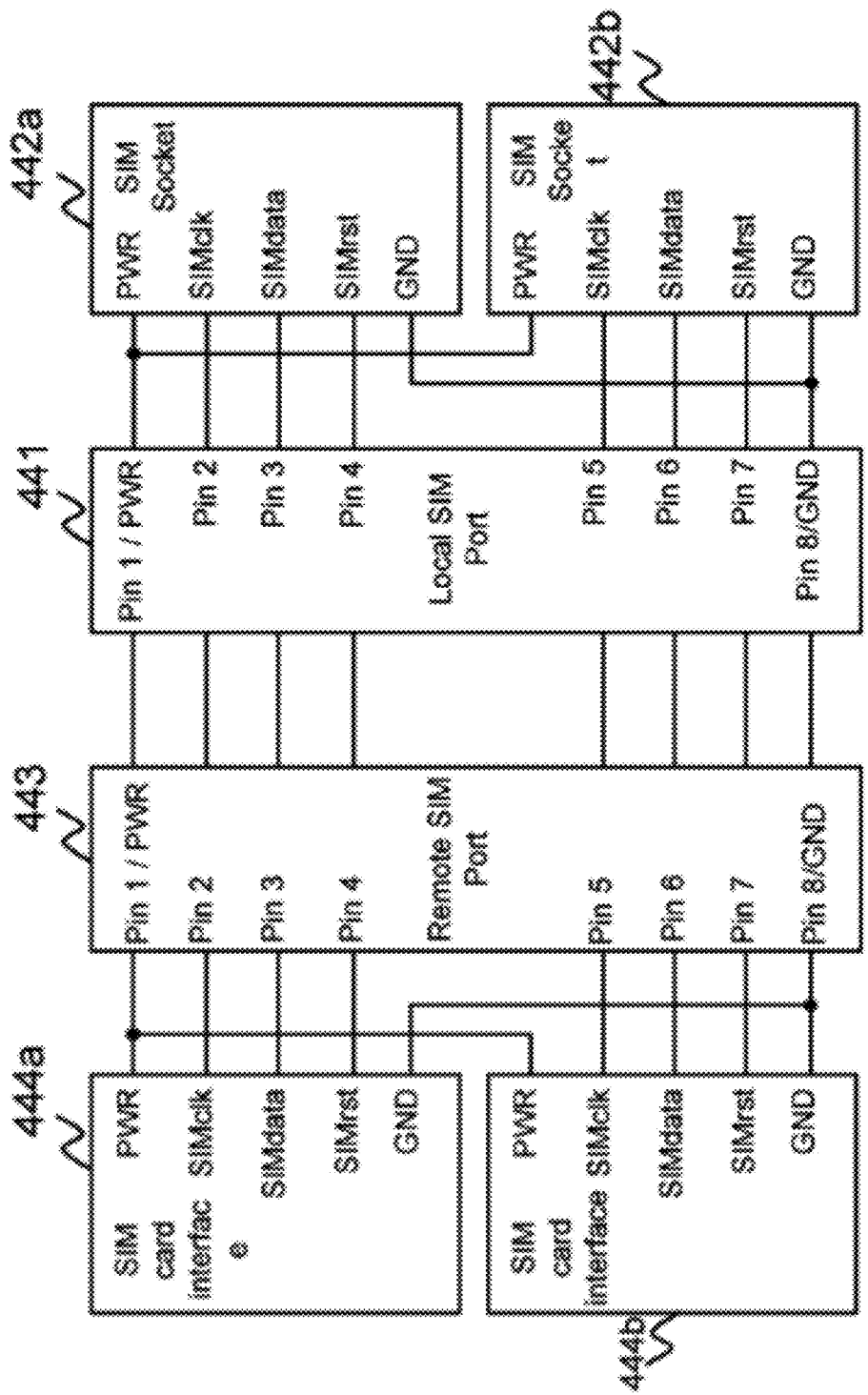
FIG. 4CA is a diagram illustrating connections between two SIM sockets and two SIM card interfaces without data interface circuit using eight wires.
Figure 4C:
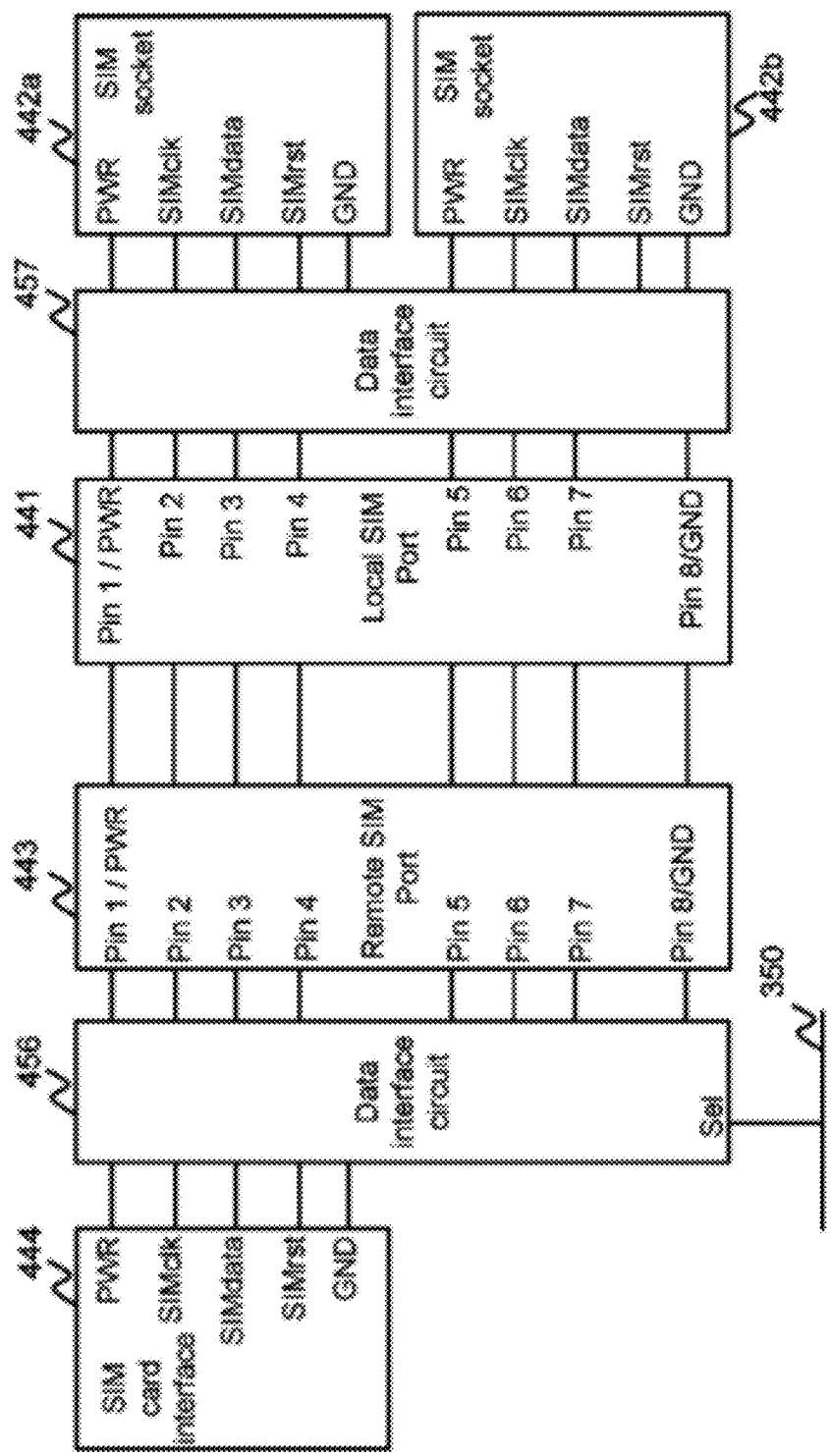
Figure 4C:
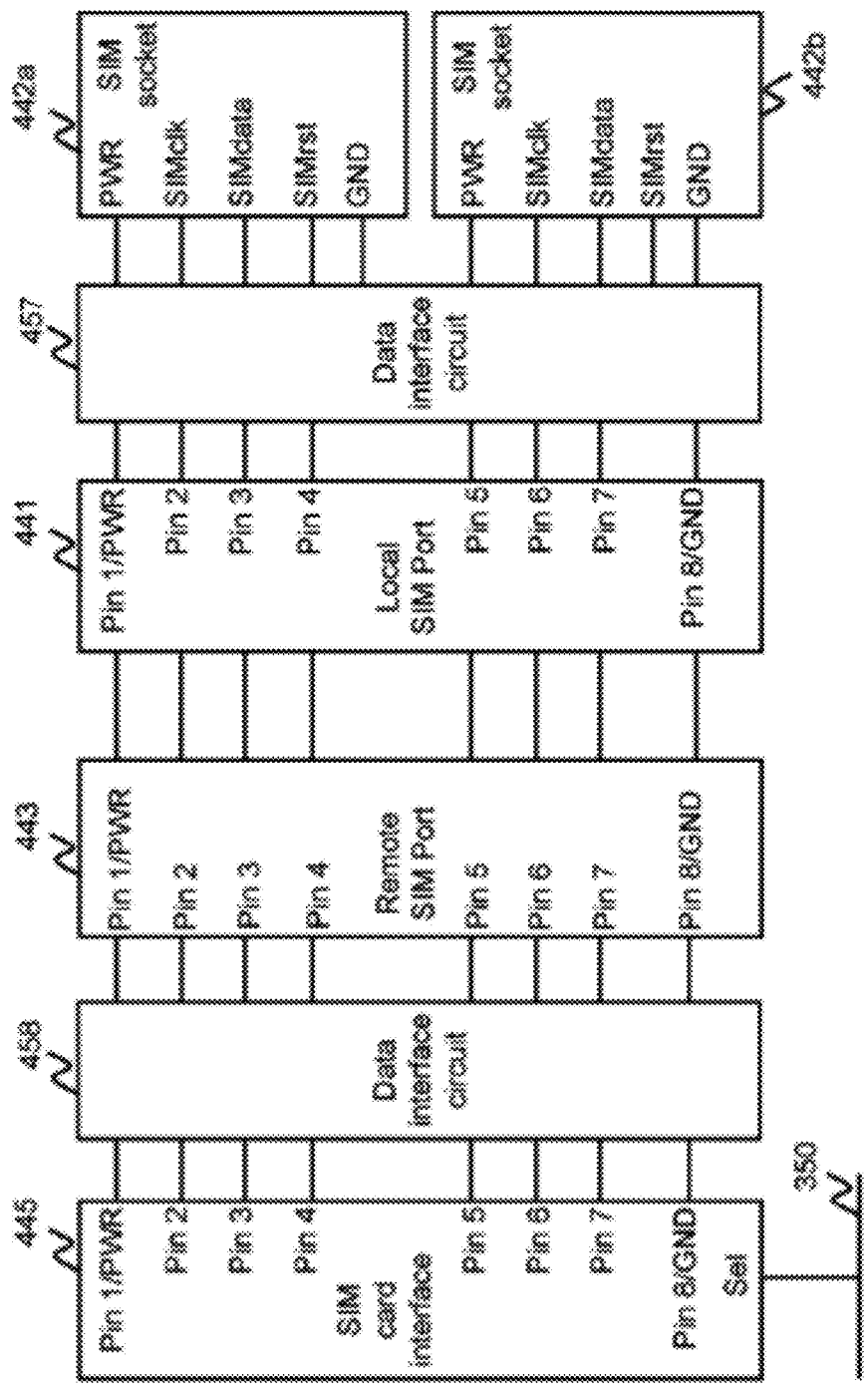
Figure 4E:
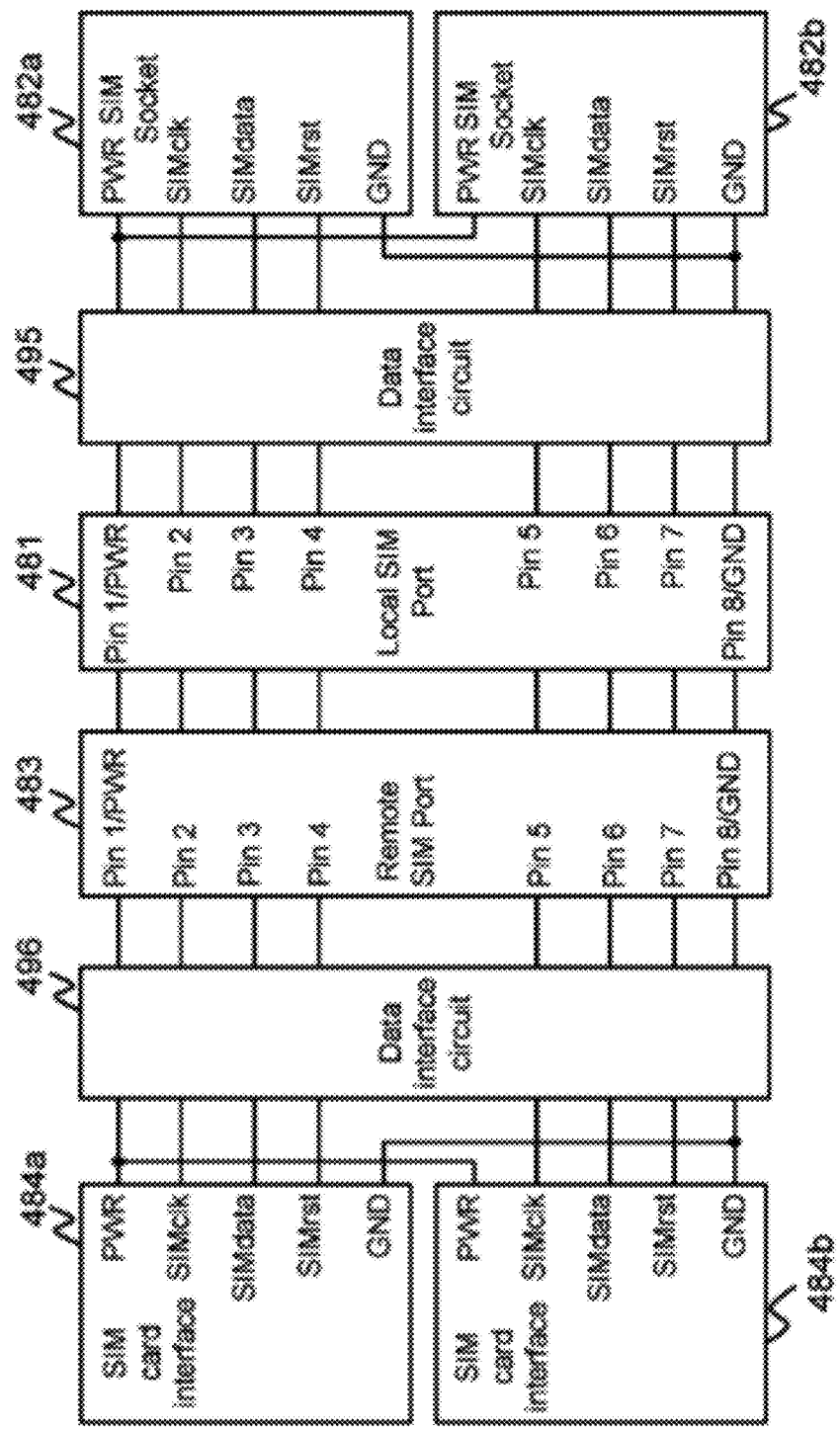
FIG. 4E is a diagram illustrating connections between two SIM sockets and two SIM card interfaces with two data interface circuits using eight wires.
Figure 5:
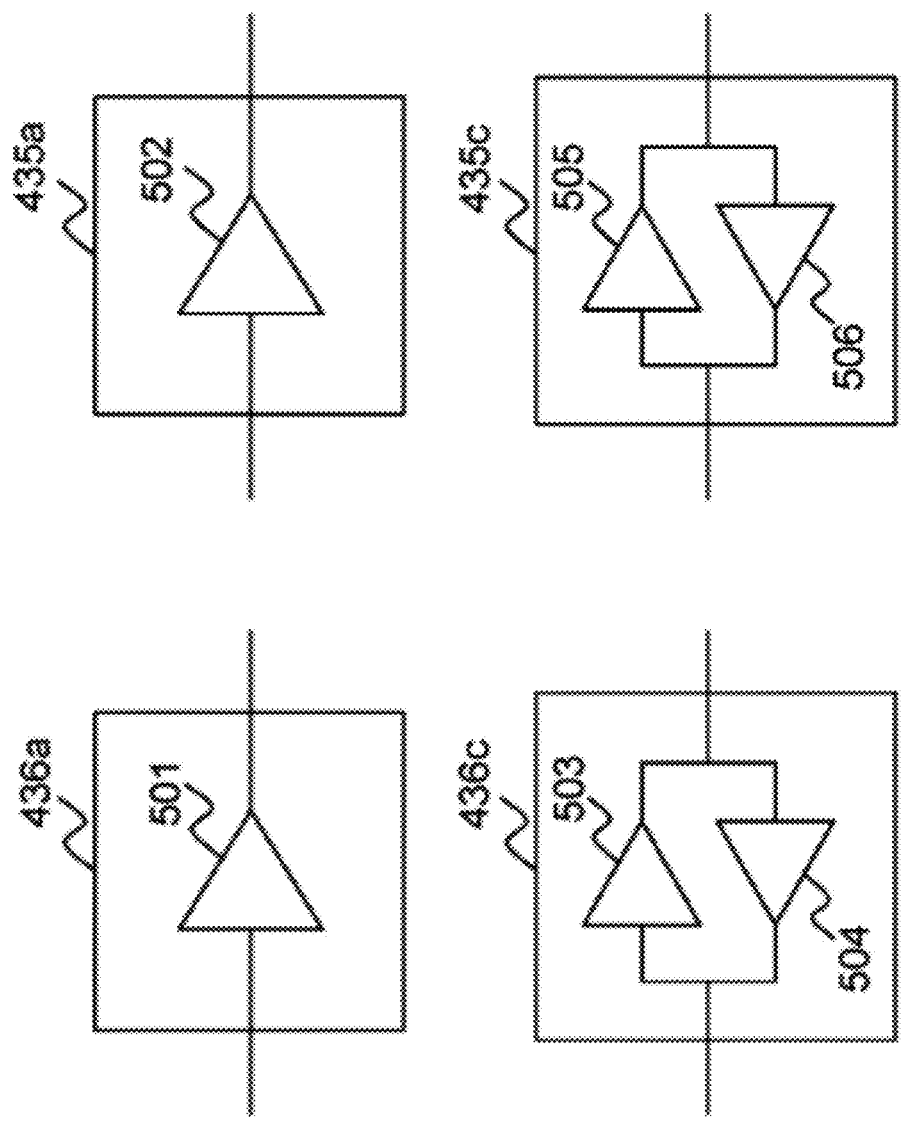
FIG. 5 is a diagram illustrating the architecture and operation of data interface circuits as shown in FIG. 4AB.
Figure 6A:
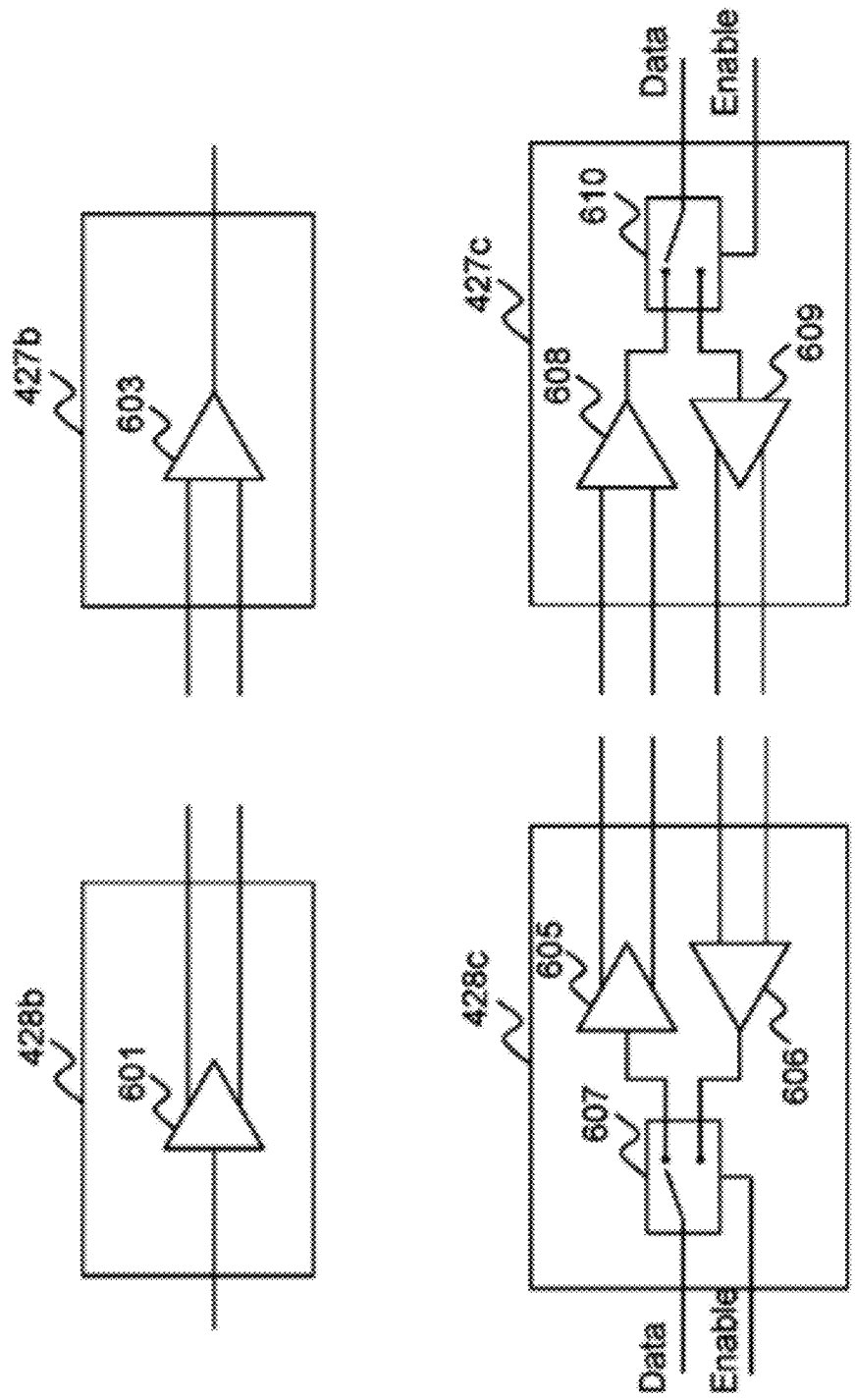
FIG. 6A is a diagram illustrating the architecture and operation of data interface circuits as shown in FIG. 4AD and FIG. 4AE.
Figure 6B:
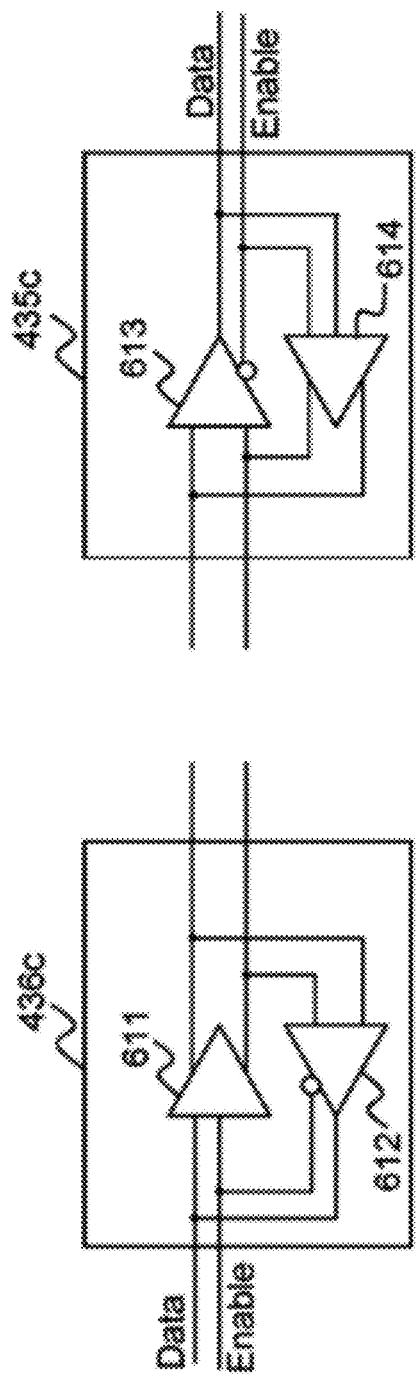
FIG. 6B is a diagram illustrating the architecture and operation of data interface circuits as shown in FIG. 4AB.
Figure 9A:
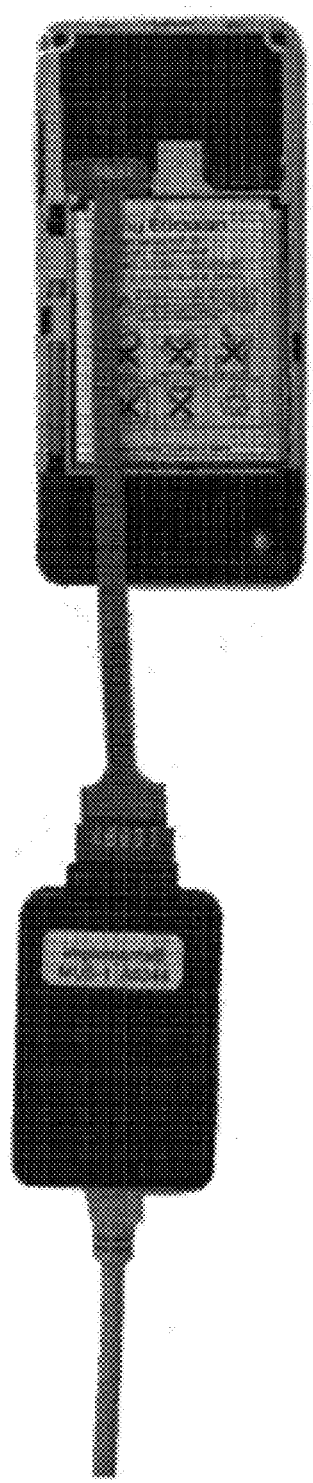
FIG. 9A illustrates a prior art of SIM card emulator.
Figure 9B:
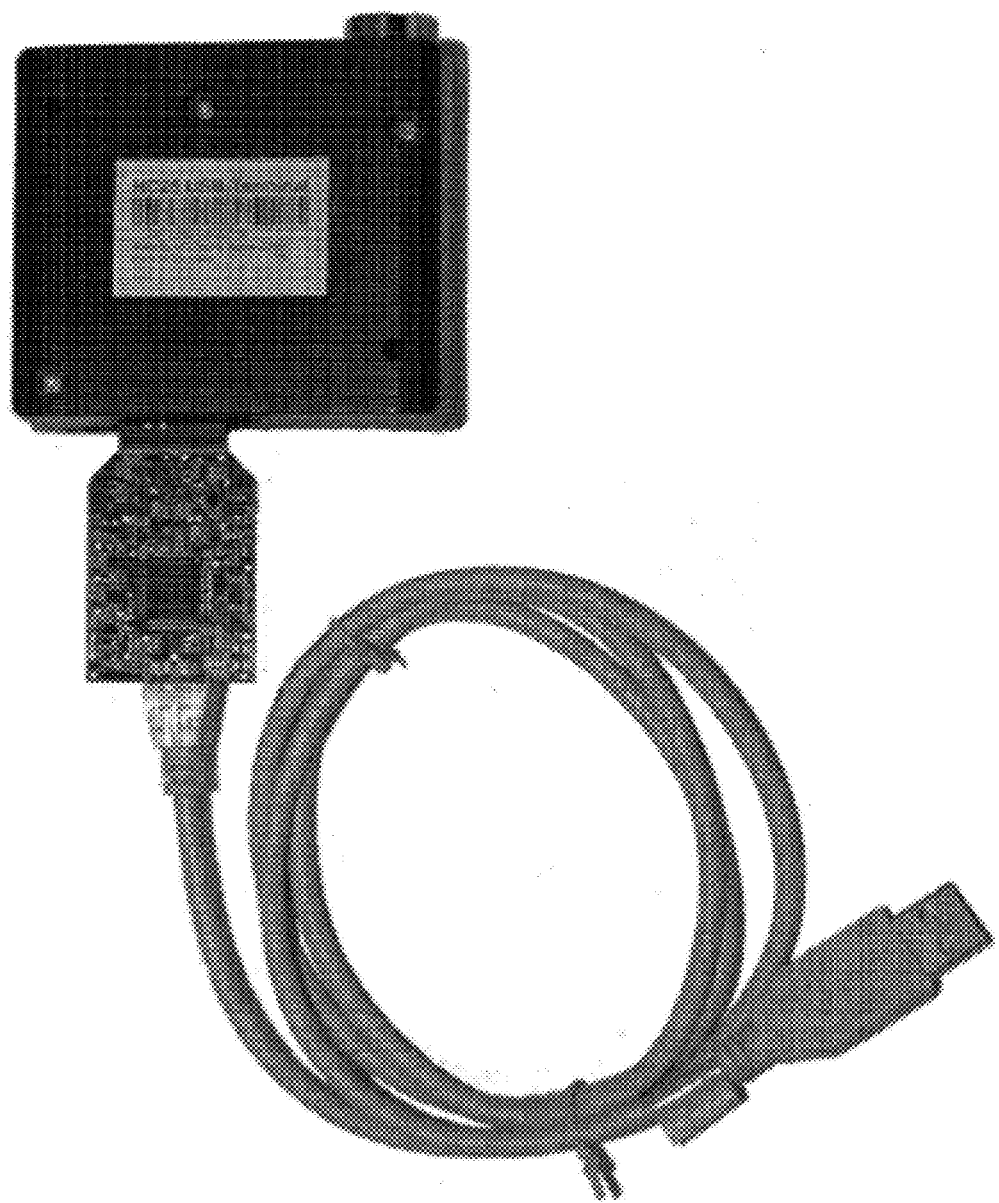
FIG. 9B illustrates another prior art of SIM card emulator.
Figure 10:
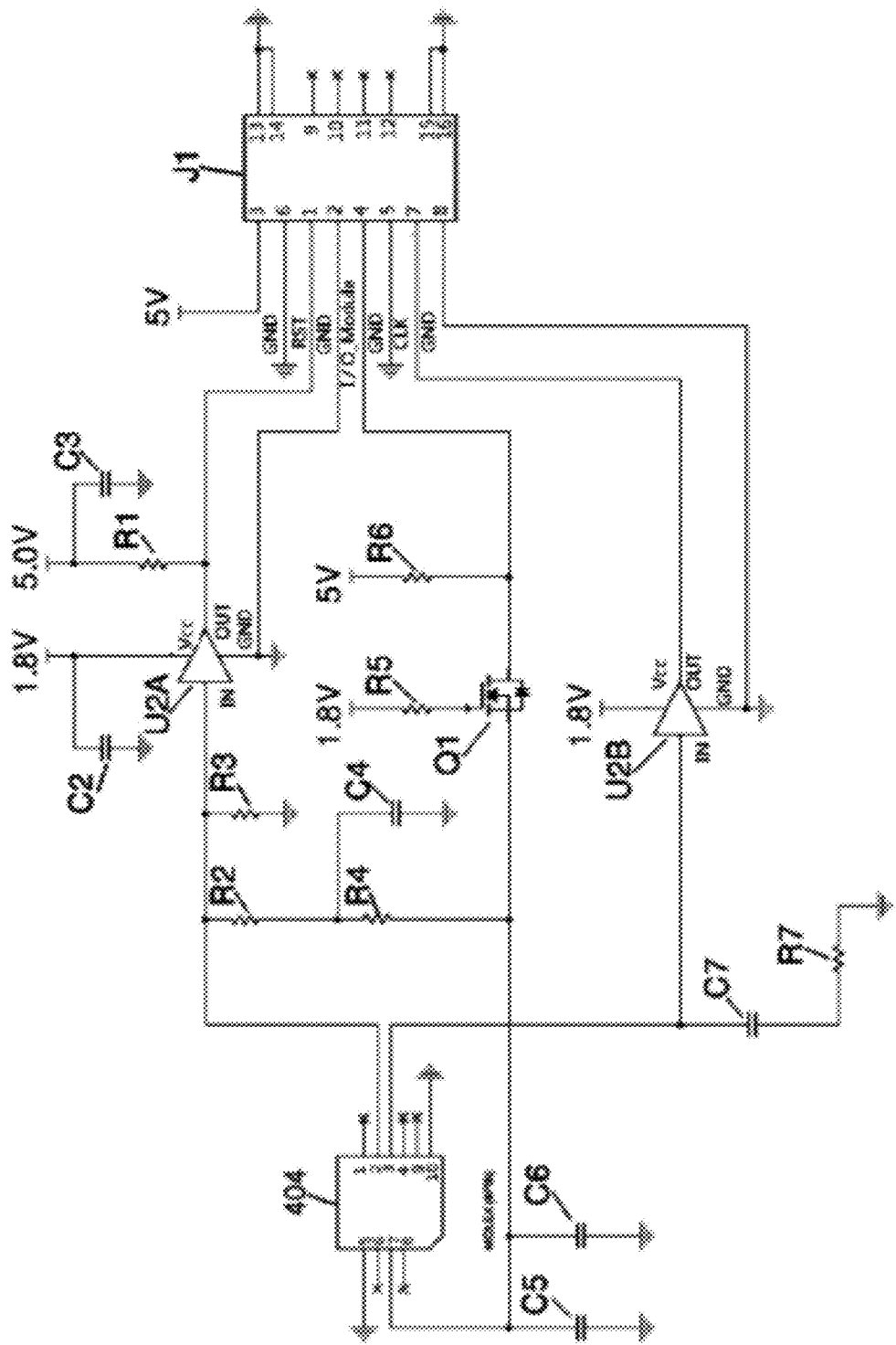
FIG. 10 illustrates a circuitry for data interface circuit at a cellular router.
Figure 11:
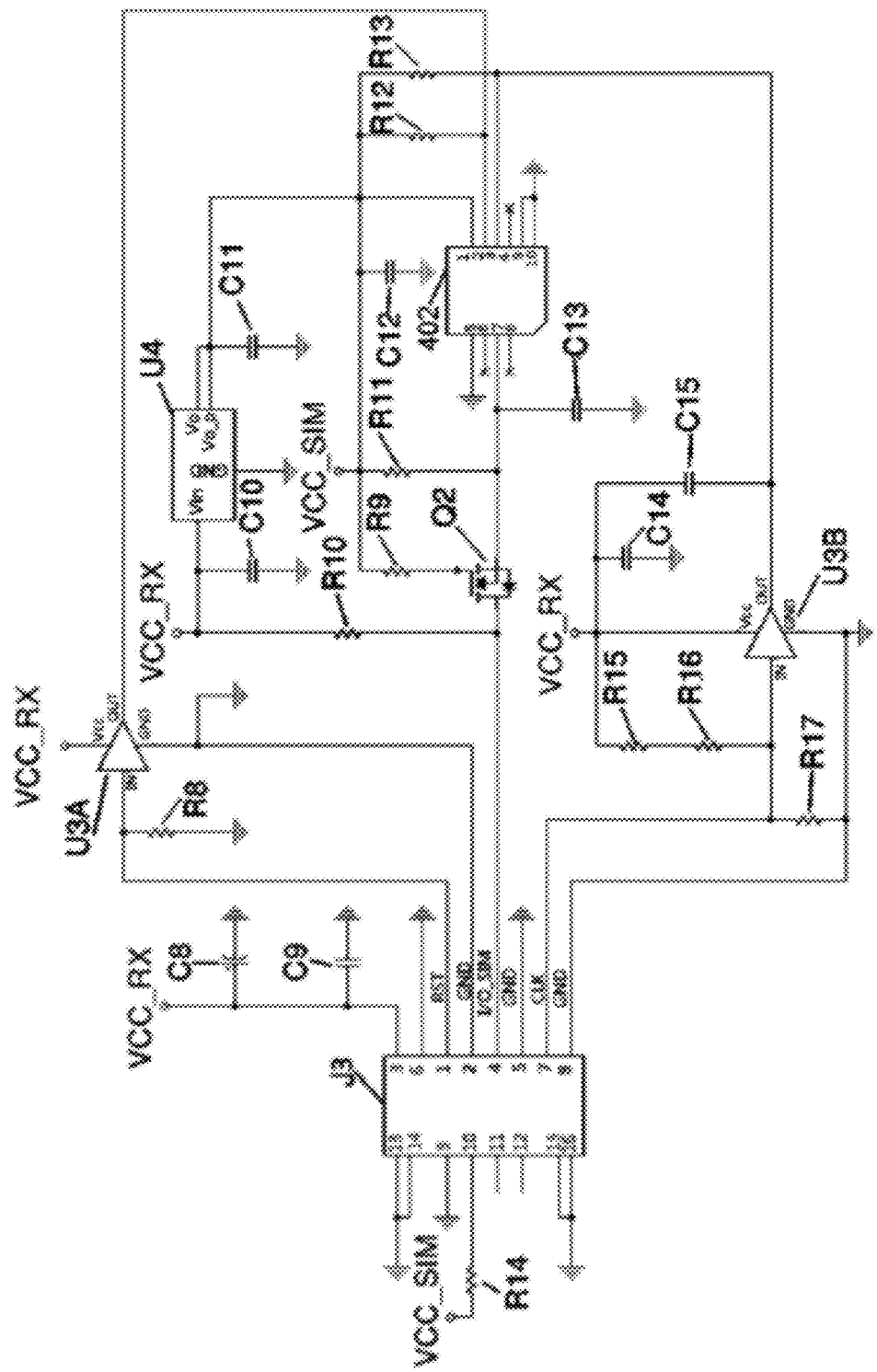
FIG. 11 illustrates a circuitry for data interface circuit at a communication apparatus.
Figure 12:
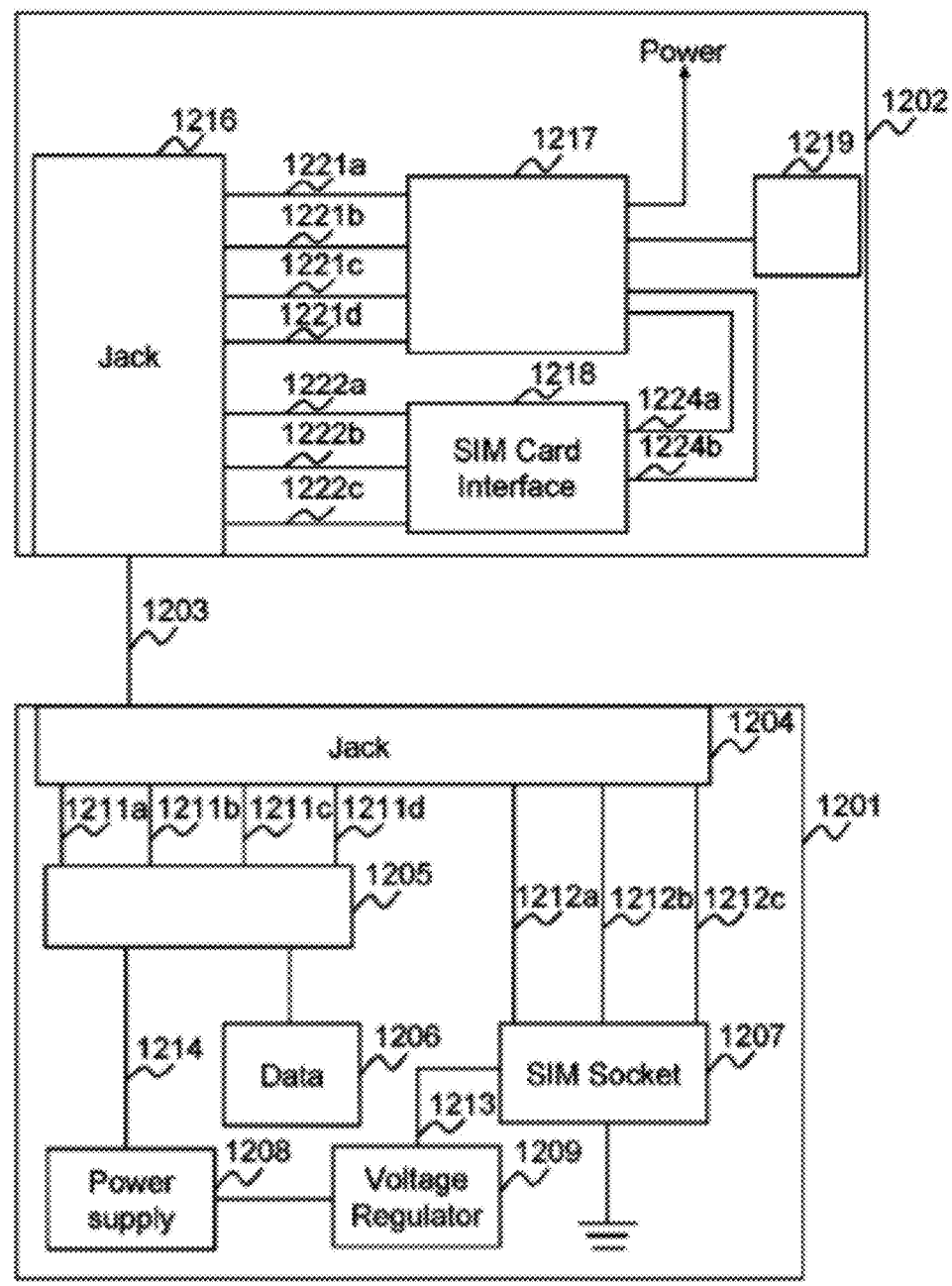
FIG. 12 illustrates a circuitry for using a CAT-5 cable to carry electricity, Ethernet data and SIM card data.

The invention claimed is:

1. A wireless communication system comprising:
   a first network node and a second network node;
   wherein the first network node comprising at least one subscriber identification module (SIM) socket, at least one local data port, and at least one local SIM port, wherein the at least one SIM socket is connected to corresponding local SIM port;
   wherein the second network node comprising at least one SIM card interface, at least one remote data port, and at least one remote SIM port, wherein the at least one SIM card interface is connected to corresponding remote SIM port;
   wherein the at least one local SIM port and the at least one remote SIM port are capable of being coupled to a cable;
   wherein the at least one local SIM port and the at least one remote SIM port are used for exchanging SIM card information between the at least one SIM socket and the at least one SIM card interface; and
   wherein the at least one local data port and the at least one remote data port are used for exchanging data packets between the first network node and the second network node.

2. The wireless communication system of claim 1, wherein the cable comprises at least three wires.

3. The wireless communication system of claim 1, wherein the first network node and the second network node are at least ten centimeters apart from each other.

4. The wireless communication system of claim 1, wherein the cable is a category-5 (CAT-5) cable.

5. The wireless communication system of claim 1, wherein electricity is provided by the first network node to the second network node through one of the at least one local data port and one of the at least one remote data port.

6. The wireless communication system of claim 1, wherein the at least one local SIM port and the at least one remote SIM port use RS-485 standard for communication.

7. The wireless communication system of claim 1, wherein the first network node further comprising:
   at least one first processing unit;
   at least one first memory;
   at least one first storage unit; and
   at least one first local area network (LAN) interface.

8. The wireless communication system of claim 1, wherein the first network node further comprising a first data interface circuit; and
   wherein the at least one SIM socket and the corresponding local SIM port are connected via the first data interface circuit.

9. The wireless communication system of claim 8, wherein the first data interface circuit connects to a data pin of the at least one SIM socket.

10. The wireless communication system of claim 1, wherein the second network node, comprising:
    at least one second processing unit;
    at least one second memory;
    at least one second storage unit;
    at least one RF transceiver; and
    at least one antenna.

11. The wireless communication system of claim 1, wherein the second network node further comprising a second data interface circuit; and
    wherein the at least one SIM card interface and the corresponding remote SIM port are connected via the second data interface circuit.

12. The second network node of claim 11, wherein the second data interface circuit connects to a data pin of the at least one SIM card interface.

13. The wireless communication system of claim 1, wherein the at least one SIM card interface is connected to a first buffer, a second buffer, and a first bi-directional level shifter, wherein the first buffer is for stepping up voltage for transmitting SIM card clock signal, wherein the second buffer is for stepping up voltage for transmitting SIM card reset signal, wherein the first bi-directional level shifter connecting is for stepping up voltage for carrying SIM card data signal and to step down voltage for receiving SIM card data signal;
    wherein the at least one SIM socket is connected to a third buffer, a fourth buffer and a second bi-directional level shifter, wherein the third buffer is for stepping down voltage for receiving SIM card clock signal, wherein the fourth buffer is for stepping down voltage for receiving SIM card reset signal; and wherein the second hi-directional level shifter is for stepping up voltage when transmitting SIM card data signal and for stepping down voltage when receiving SIM card data signal.

14. The wireless communication system of claim 13, further comprising a first jack and a second jack;
    wherein the first jack has at least eight pins;
    wherein the second jack has at least eight pins; and
    wherein the first jack and the second jack are capable of allowing a category 5 (CAT-5) cable to be coupled to.

15. The wireless communication system of claim 14, wherein four of the at least eight pins of the first jack and four of the at least eight pins of the second jack are used for data communications using Ethernet protocol.

16. The wireless communication system of claim 14, wherein the four of the at least eight pins of the first jack and the four of the at least eight pins of the second jack are used for Ethernet data communications.

17. The wireless communication system of claim 14, wherein four of the eight pins of the first jack and four of the eight pints of the second jack are used for Ethernet data communication, and
    three of the at least eight pins of the first jack and three of the at least eight pins of the second jack are used for SIM card data signal, SIM card reset signal and SIM card clock signal.

18. The wireless communication system of claim 14, wherein a first pin of the first jack is connected to output of the first buffer, a second pin of the first jack is connected to output of the second buffer, a third pin of the first jack is connected to the first bi-directional level shifter, a fourth pin of the first jack is connected to a power supply, and a fifth pin of the first jack is connected to a ground; and
    wherein a first pin of the second jack is connected to input of the third buffer, a second pin of the second jack is connected to input of the fourth buffer, a third pin of the second jack is connected to the second bi-directional level shifter, a fourth pin of the second jack is connected to input of a voltage regulator, and a fifth pin of the second jack is connected to a ground.

19. The wireless communication system of claim 14, wherein four of the eight pins are used to carry electricity and Ethernet data communication.

20. The wireless communication system of claim 13, wherein the at least one SIM card interface and the at least one SIM socket are at least ten centimeters apart from each other.

* * * * *